(12) United States Patent
Kolls

(10) Patent No.: US 6,505,095 B1
(45) Date of Patent: Jan. 7, 2003

(54) SYSTEM FOR PROVIDING REMOTE AUDIT, CASHLESS PAYMENT, AND INTERACTIVE TRANSACTION CAPABILITIES IN A VENDING MACHINE

(75) Inventor: H. Brock Kolls, Pottstown, PA (US)

(73) Assignee: USA Technologies, Inc., Wayne, PA (US)

( * ) Notice: Subject to any disclaimer, the term of this patent is extended or adjusted under 35 U.S.C. 154(b) by 42 days.

(21) Appl. No.: 09/884,755

(22) Filed: Jun. 19, 2001

(51) Int. Cl.⁷ .............................................. G06F 17/00
(52) U.S. Cl. ...................... 700/244; 700/236
(58) Field of Search ................ 700/231, 236, 700/244; 221/9, 2

(56) References Cited

U.S. PATENT DOCUMENTS

| | | | |
|---|---|---|---|
| 5,844,808 A | * 12/1998 | Konsmo et al. | ....... 379/100.05 |
| 5,959,869 A | * 9/1999 | Miller et al. | ................... 221/9 |
| 6,119,053 A | * 9/2000 | Taylor et al. | ................ 370/364 |
| 6,181,981 B1 | 1/2001 | Varga et al. | |
| 6,339,731 B1 | * 1/2002 | Morris et al. | ................ 700/236 |
| 6,457,038 B1 | * 9/2002 | Defosse | ....................... 700/231 |

* cited by examiner

*Primary Examiner*—Khoi H. Tran
(74) *Attorney, Agent, or Firm*—H. Brock Kolls

(57) ABSTRACT

The present invention relates to a system that is scalable and configurable to include vending equipment audit capabilities, a card reader assembly having a card reader processor interface board for accepting card identification data as payment for items vended, an interactive interface and protocol for interconnecting the system to a computing platform, and support for a plurality of communication options that include wired, point-to-point wireless, and wireless WAN solutions. In addition, the present invention also relates to a system and method of effectuating a payment device for accepting card ID data, authorizing the validity of the card ID data, facilitating a vending transaction, settling the transaction to effect payment for the vended goods and services, gathering DEX and MDB audit data from the vending equipment, and data communicating with a plurality of remote locations.

30 Claims, 26 Drawing Sheets

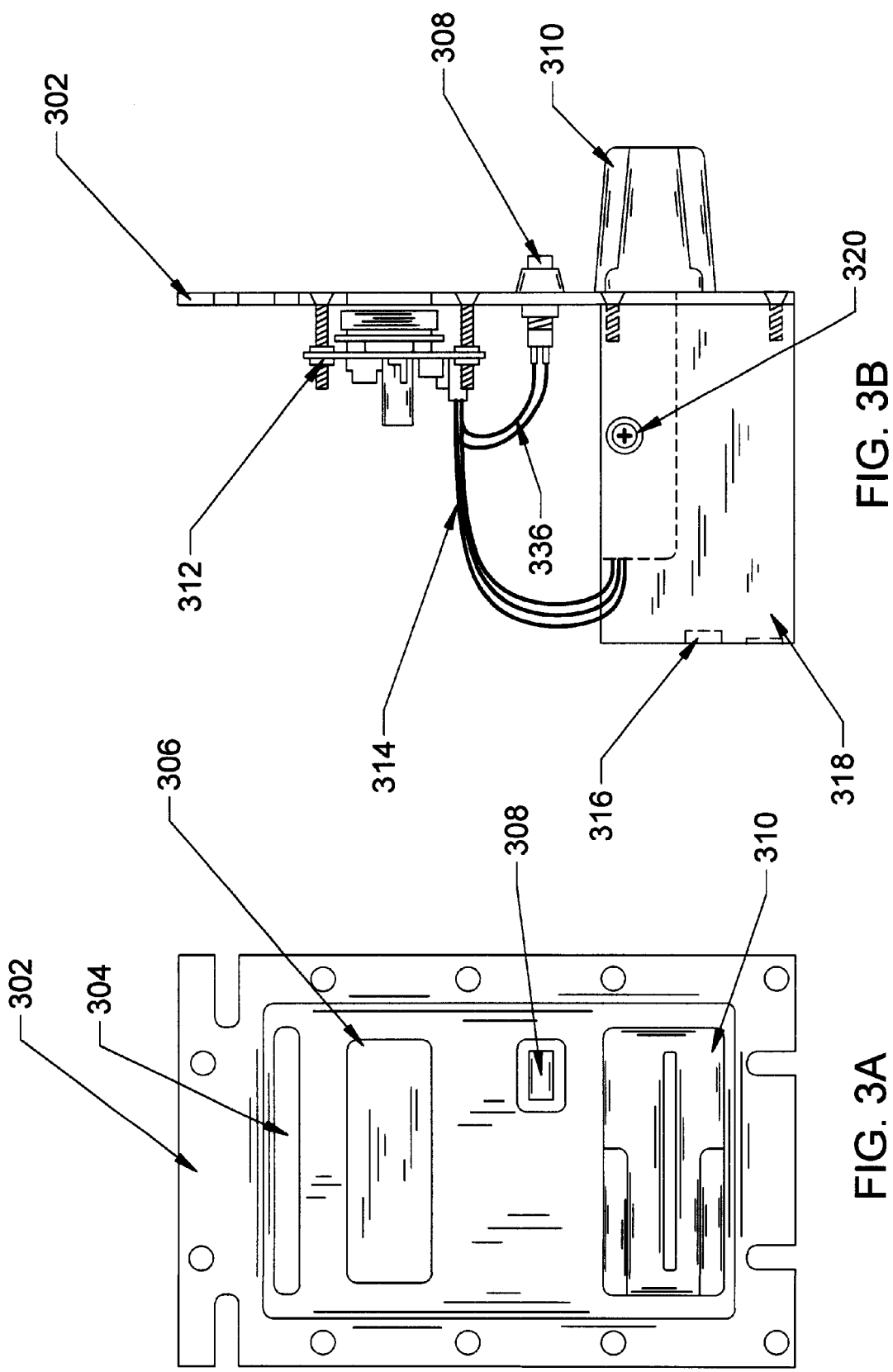

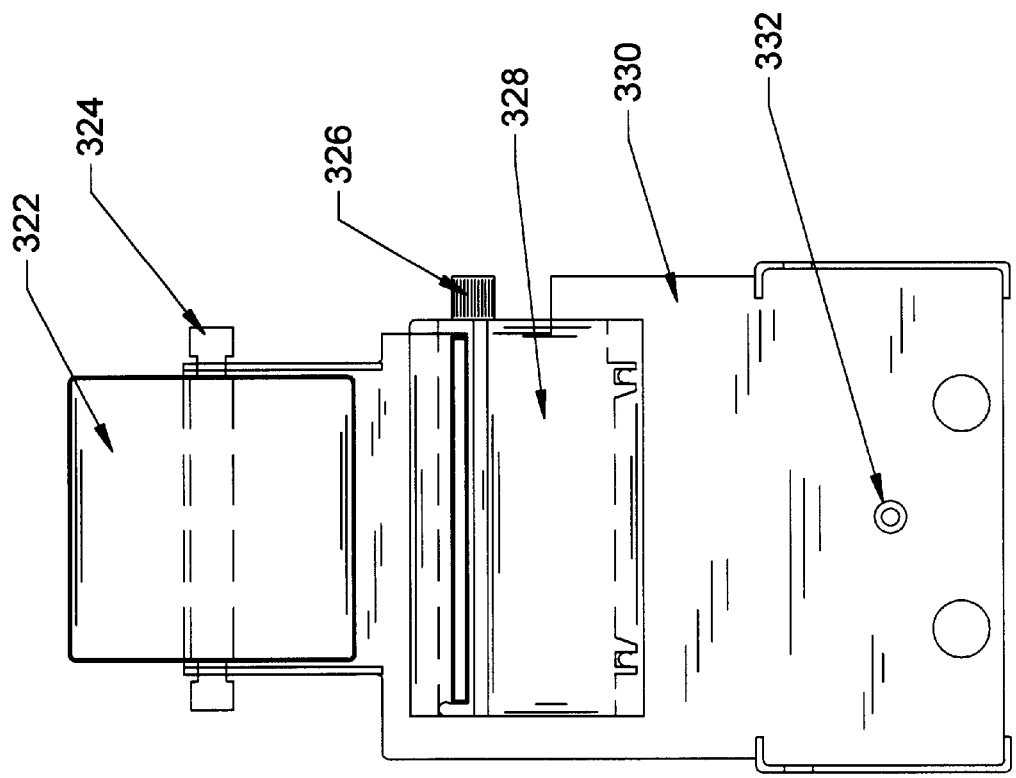
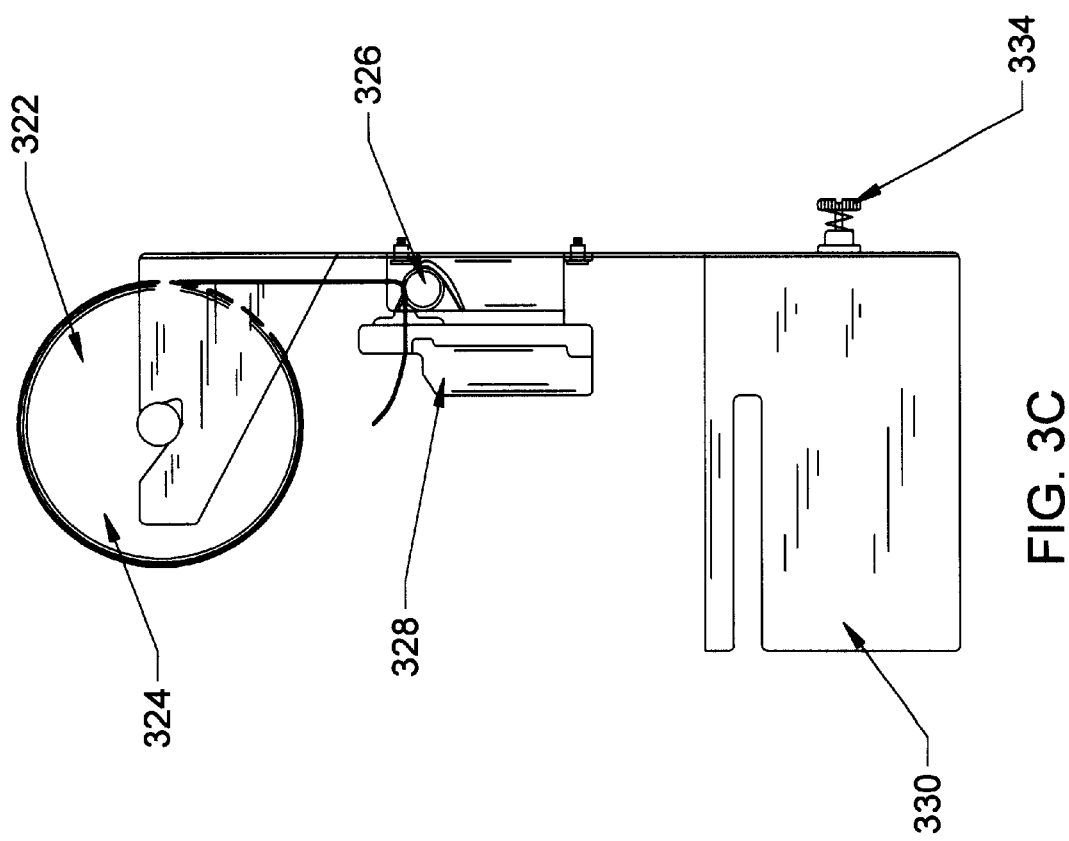

500

600

600

1000

1000

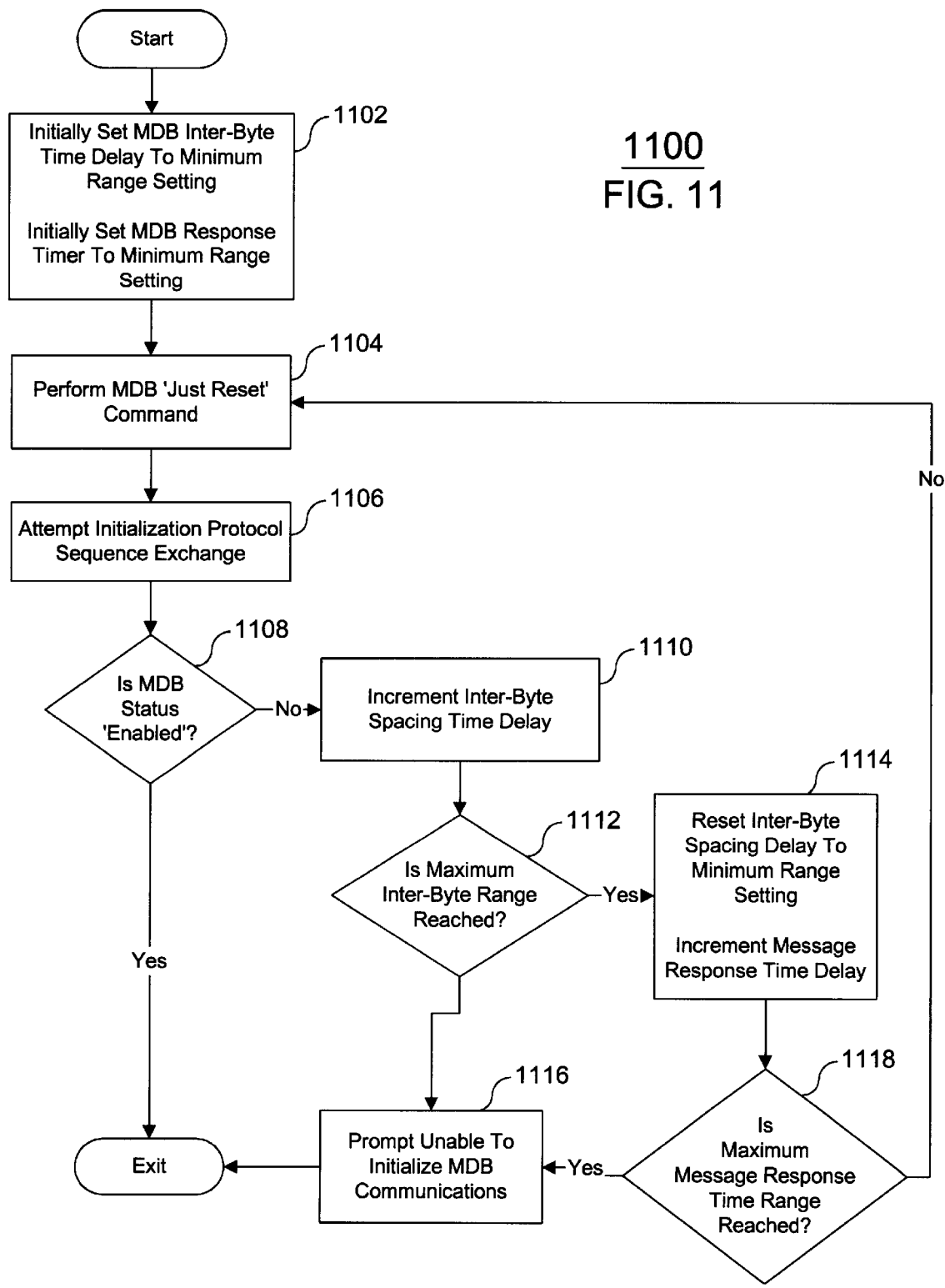

1200

SYSTEM FOR PROVIDING REMOTE AUDIT, CASHLESS PAYMENT, AND INTERACTIVE TRANSACTION CAPABILITIES IN A VENDING MACHINE

TECHNICAL FIELD OF THE INVENTION

The present invention relates to a system that is scalable and configurable to include vending equipment audit capabilities, a card reader assembly having a card reader processor interface board for accepting card identification data as payment for items vended, an interactive interface, and protocol for interconnecting the system to a computing platform, and support for a plurality of communication options that include wired, point-to-point wireless, and wireless wide area networked (WAN) solutions. In addition, the present invention also relates to a system and method of effectuating a payment device for accepting card ID data, authorizing the validity of the card ID data, facilitating a vending transaction, settling the transaction to effect payment for the vended goods and services, gathering DEX and MDB audit data from the vending equipment, and data communicating with a plurality of remote locations.

BACKGROUND OF THE INVENTION

Recent trends in the vending industry have been to offer higher priced items out of vending equipment at traditionally unattended vending location. Higher priced item offers can result from the desire to vend larger portions of products such as the twenty-ounce soda bottle verse the twelve-ounce soda can. In other cases the higher priced items can be items that until recently may not have been considered for sale through vending equipment such as phone cards, disposable cameras, and frozen food entrees to name a few.

The vending industry's desire to vend higher priced items has given rise to issues related to currency and inventory. For example, with the shift to vending twenty-ounce bottles many of the vending sales now involve more that one currency note, as an example two one-dollar bills to make a purchase. As a result the bill validator can fill to capacity with currency notes before all the items in the vending equipment have been sold. With a bill acceptor filled to capacity the vending equipment may not be able to transact another vending sale and place itself out-of-service. As a result vending operators can typically find themselves restocking vending equipment that still has product available for sale but because of the inability to take additional currency notes the vending equipment could not sell the inventory.

In addition, with many beverage type vending machines the shift from the twelve-ounce can to the twenty-ounce bottle created coin mechanism issues. In moving to the larger size beverage the average price can move from typically slightly less than a dollar where little change was required when a dollar note was used for payment to slightly more than a dollar where the better part of a dollar in change can be required when two one-dollar notes are used for payment for a vend. Resultant from this price move not only do the bill validators fill to capacity faster and stop working sooner, but the coin mechanism can be required to supply a customer with more change on each vend depleting a coin mechanism coin supply faster. Once the coin change supply is depleted the vending machine may be rendered out-of-service.

In addition to the new burden on bill acceptors and coin mechanism resultant from the sale of higher priced items other issues related to the vending of higher priced items can arise. Once such issue can be that a customer may not have enough money on-hand to effectuate the vending purchase. In the case of phone cards, cameras, and frozen food vend prices may range from several dollars to forty dollars, fifty dollars, or more. In many cases the customer may have the desire to purchase the high priced item but simply lacks the amount of currency required to effectuate the purchase. In other cases the customer may be reluctant to trust the vend worthiness of the vending equipment with what the customer considers to be a significant amount of money.

As the proliferation of higher priced vend items continues to become more pervasive in today's society the vending industry has become increasingly concerned about tracking inventory and the operational status of the vending equipment remotely. It is considered a general belief within the vending industry that remotely monitoring vending equipment can optimize a route driver's daily activity and reduce operational costs associated with the sales and delivery of products to the vending equipment.

To date auditing devices have been designed to be placed inside the vending equipment or held in the hand of a route collector for the purpose of gathering vending equipment inventory and operational data which can later be downloaded to a computer. These devices however have been costly to manufacture, install, maintain, and operate. As such the total cost of the technology verse the savings on the operational costs associated with the sales and delivery of products to date have not made for a sound or compelling business model. As a result the vending industry has been slow to adopt 'audit' only technology.

The cost benefit model of the 'audit' hardware may not be the only issue hampering the proliferation of 'audit' only device. Data communication costs, the costs of getting the data back to a central computer center can be a significant limitation on getting vending equipment remotely 'audit' capable or as it is commonly referred to in the vending industry as 'online'.

Such telecommunication costs can include the cost of running a telephone line to the vending equipment. In many cases the vending equipment may be in a location not conducive to having a dedicated phone line installed proximate to the vending equipment, such as in a concrete basement, on a golf course, in a shopping mall, or on a university campus to name a few. Once a telephone line is installed there can be monthly service charges incurred from the telecommunication company providing the service. These costs alone can in effect nullify the savings of having the vending equipment 'online'.

To avoid the high expense of running dedicated telephone lines to vending equipment the vending industry has pursued wireless wide area network (WAN) options. Implementing a wireless WAN has typically involved purchasing additional wireless hardware, and trying to integrate the wireless hardware with the 'audit' hardware. If the integration effort was successfully the hardware, service and maintenance costs of the combined solution were typically significantly increased compared to the 'audit' device only solution costs. In addition, the service and maintenance required for the combined wireless system is typically different then the non-wireless 'audit' device only solution.

In addition to the increased hardware costs for the wireless WAN solution, the wireless communication service fees paid to the wireless network provider can be more then those fees charged by the communication companies providing telephone line service. A technology solution and service fee structure that could effectively nullify the anticipated sales and delivery savings from having the vending equipment 'online'.

In part a long felt need for a solution related to a cost effective system and method for remotely auditing vending equipment, and for providing additional payment options at the point of sale for goods and services vended from vending equipment, coupled with the industries short coming in these areas, some of which were mentioned above give rise to the present invention.

SUMMARY OF THE INVENTION

The present invention relates to a system that is scalable and configurable to include vending equipment audit capabilities, a card reader assembly having a card reader processor interface board for accepting card identification data as payment for items vended, an interactive interface and protocol for interconnecting the system to a computing platform, and support for a plurality of communication options that include wired, point-to-point wireless, and wireless WAN solutions.

The present invention also relates to a system and method which effectuates an interactive interface and protocol for interfacing the system to and data communicating with a computing platform, wherein the computing platform can elect to control by way of the interactive interface and protocol the vending transaction cycle or alternatively elect to monitor the system by way of the interactive interface and protocol allowing the system to control the vending transaction cycle.

The present invention also relates to a system and method of effectuating a payment device for accepting card ID data, authorizing the validity of the card ID data, facilitating a vending transaction, settling the transaction to effect payment for the vended goods and services, gathering DEX and MDB audit data from the vending equipment, and data communicating with a plurality of remote locations.

The present invention also relates to a system having a plurality of configurable communication options for data communicating to a plurality of remote locations. Such communication options include local area network connection, telephone line, wireless point-to-point where the system data communicates wirelessly to a local transceiver base unit which has access to a telephone line thereby giving the system wireless access to a telephone line, and wireless network data communication access, wherein a data modem connects the system to a WAN for data communication access to a plurality of remote locations.

The present invention also relates to a system and method for implementing an MDB protocol gateway for the purpose of supporting a plurality of peripheral devices each of which may be implementing a different version of MDB protocol then the vending equipment's vending machine controller (VMC).

The present invention also relates to a system and method for authorizing and settling card transactions with a processing bureau where the authorization process can be performed by the system locally eliminating the need for data communication with a remote processing bureau, and for processing international card transactions from a single country, wherein international currency conversion processing fees are minimized.

The present invention also relates to a store and forward data network system and method, wherein data gathered at a central server from a plurality of remote systems installed in a plurality of vending equipment is converted as required and made available to a plurality of other servers for the purpose of using the data to manage a vending business and or supplying data to a backend management system.

The present invention also relates to the system 500 being packaged in a semiconductor creating a single chip system 500 solution.

BRIEF DESCRIPTION OF FIGURES

The present invention is best understood from the following detailed description when read in connection with the accompanying drawings. Included in the drawings are the following Figures:

FIG. 3A there is shown a front view of a card reader assembly,

FIG. 3B there is shown a left side view of a card reader assembly;

FIG. 3C there is shown a right side view of a printer assembly;

FIG. 3D there is shown a front view of a printer assembly;

FIG. 11 there is shown an MDB initialization tuning routine 1100;

DETAILED DESCRIPTION OF THE INVENTION

Figure 1:
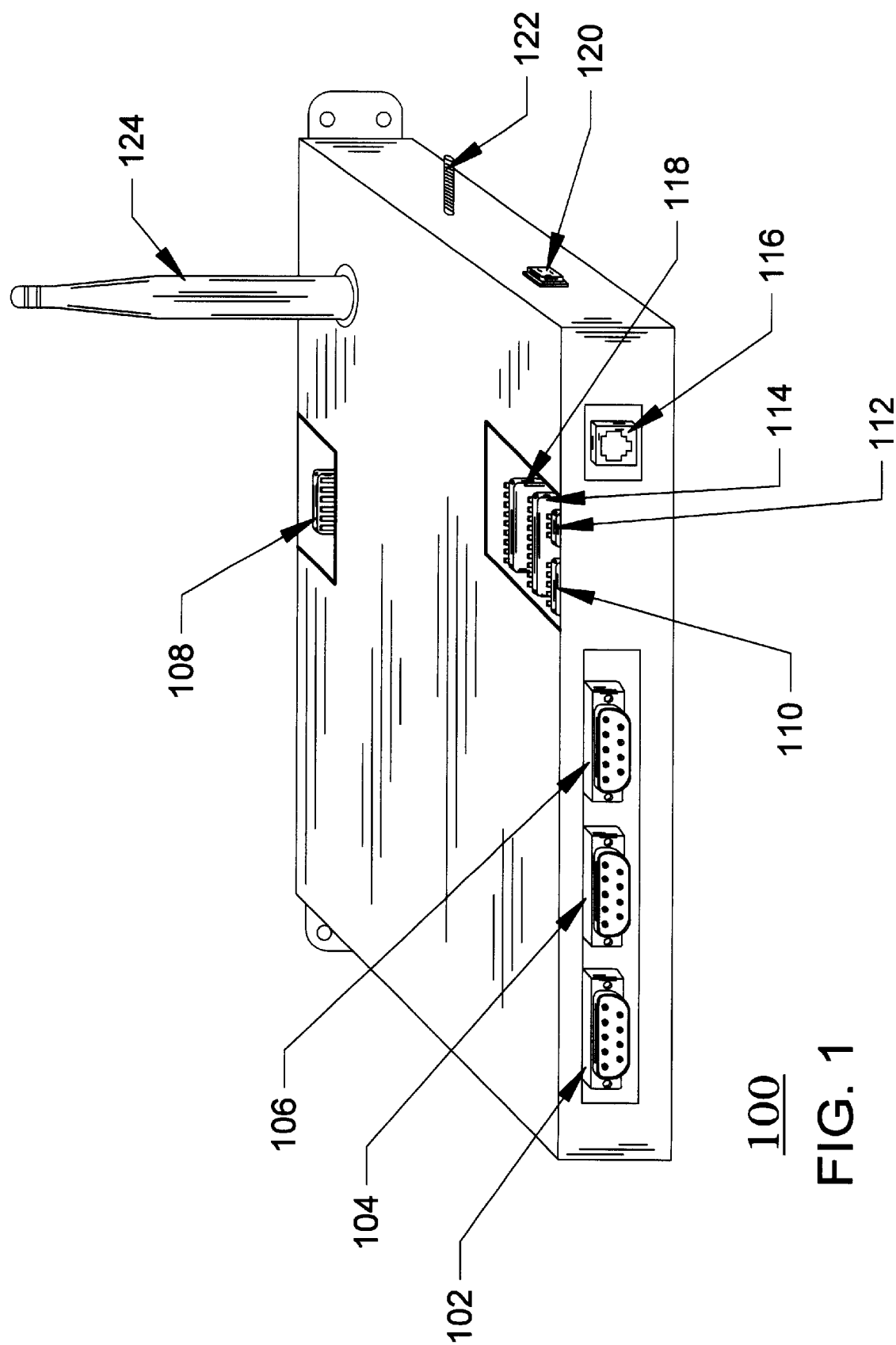
FIG. 1 there is shown a vending interface unit 100.

Referring to FIG. 1 there is shown a vending interface unit (VIU) 100. The VIU 100 is a control system that interfaces to a plurality of different kinds of vending machines by way of a plurality of different interface ports. One such interface port can be the NATIONAL AUTOMATED MERCHANDISING (NAMA) vending industry MULTI-DROP-BUS (MDB) interface. Other MDB interfaces can include derivative MDB bus specifications, where a derivative MDB bus specification can be one that support less than all the NAMA standard, or augments the NAMA standard with additional protocol commands and or features. A second such interface port can be the EUROPEAN VENDING ASSOCIATION'S vending industry DATA EXCHANGE INTERFACE (DEX) interface. Additional interface ports include serial and pulse style bill validators, and coin mechanism interfaces.

Vending machine types suitable for interconnection to and operation with the VIU 100 include vending beverage and snack machines, value adding equipment, and dispensing equipment that operate in connection with or make available an MDB bus interface, or DEX interface, or a bill acceptor interface, or a coin mechanism interface. Such vending machines include for example and not limitation those manufactured by or for COKE-A-COLA, PEPSI, MARS, VENDO, ROYAL, DIXIE NARCO, GPL, CRANE NATIONAL, AUTOMATED PRODUCTS, CAVALIER, MARCONI or other similar vending machines. Such value adding equipment and dispensing equipment can include for example and not limitation those manufactured by or for ACT, XCP, SCHLUMBERGH, DAYNL, GILBARCO, MARCONI, COPICO, PRE-PAID EXPRESS, or other similar value adding equipment and dispensing equipment.

For purposes of disclosure the term vending machine, value adding machine, and value dispensing machine can be referred to as a vending machine, vending equipment, and or vender.

Audit-credit-interactive system 500 electronics are included within the VIU 100. Many of the electrical interfaces, ports, and connectors shown in FIG. 1 are actually electrical connection to the audit-credit-interactive system 500.

The vending interface unit (VIU) 100 includes an interactive interface port 102. The interactive interface port 102 provides an electrical connection to the interactive interface 532. In an exemplary embodiment the interactive interface port 102 enables other computing platforms to interface to and operational work with the vending interface unit 100. A computing platform is a microprocessor based system and can include the card reader interface processor board 312, the card reader and user interface system 600, or personal computer (PC) based systems. In addition a computing platform can include INTEL, MOTOROLA, MICROCHIP, UBICOM, IBM brand or other similar microprocessor based systems. A computing platform can operate on a plurality of operating systems including, assembler based, proprietary systems, MICROSOFT, LINUX, QNX, WIND RIVER, JAVA VIRTUAL MACHINE (JVM) based or other similar or suitable operating system.

VIU 100 also includes auxiliary interface port 104 and 106. Though general purpose in nature in an exemplary embodiment ports 104, and 106 provide electrical connections to printer interface 532, and external modem interface 528 respectively. The ports 104, and 106 can be RS232, RS484, or other desirable type of communication interface port. Furthermore ports 104, and 106 can be configured for use as required by the desired application. In an exemplary embodiment auxiliary interface port 104 can be used for interfacing to a serial style printer and port 106 can be used to interface to external communication equipment such as data modem, CDMA modems, CDPD modem, wireless transceivers, wireless systems, or other types of communication devices. In an exemplary embodiment an AES wireless transceiver can be used to provide data communication to and from the VIU 100 as well as serve as repeater to receive and re-transmit data communication to and from other VIU 100 types of devices in the geographical area.

The VIU 100 includes a MULTI-BUS-DROP (MDB) interface port 108, and a DATA EXCHANGE INTERFACE (DEX) 112. MDB port 108 and the DEX port 112 provide electrical connections to the MDB interface 518, and the DEX interface 520 respectively. The electrical characteristics and operation of the MDB port 108 are detailed in the NATIONAL AUTOMATED MERCHANDISING ASSOCIATIONS industry specification entitled MDB/ICP INTERFACE PROTOCOL Version 1.0 and version 2.0. The electrical characteristics and operation of the DEX port 1112 are detailed in the EUROPEAN VENDING ASSOCIATIONS EVA-DTS specification version 4.0, and 5.0.

The MDB interfaces allow the VIU 100 by way of the MDB interface 518 and MDB port 108, to be original equipment manufactured (OEM) into or retrofitted into vending, valuing, and dispensing equipment that provide an MDB bus interface. Furthermore, the VIU 100 by way of the DEX interface 520 and the DEX port 112, can be original equipment manufactured (OEM) into or retrofitted into vending, valuing, and dispensing equipment that provide a DEX interface.

VIU 100 includes card reader interface ports 110, and 114. The card reader ports 110, and 114 provide electrical connection to the card reader interface 526. Card reader interface ports interface to industry standard bit strobe, and serial style track 1, 2, and 3 card readers. Such card readers include for example and not limitation those manufactured for or by XICO, NEURON, MAGTEK, as well as compatible card readers manufactured by other companies.

The VIU 100 also includes an RJ11 jack 116. The RJ11 jack provides electrical connections to the modem 522. In an exemplary embodiment the RJ11 jack 116 interconnects the VIU 100 to a telecommunication line, wherein data communication can occur between the VIU 100 and a plurality of remote hosts networks and locations.

VIU 100 also includes a general-purpose input-output interface 118. The general-purpose input-output interface provides electrical connections to the bill and coin interlace 506. In an exemplary embodiment the VIU 100 can be interconnected with vending, valuing, and dispensing equipment by way of the hoot equipment's bill acceptor or coin interface port. This allows the VIU 100 by way of the bill and coin interface 506 and interface 118 to be original equipment manufactured (OEM) into or retrofitted to vending, valuing, and dispensing equipment that utilize a serial or pulse style bill acceptor, or a coin mechanism interface. Serial and pulse style bill acceptors include for example and not limitation those manufactured for or by MARS, COINCO, CONLUX, ARDAK, or other similar bill acceptor and manufacturers of bill acceptors.

The VIU 100 includes a service button 120 and a ground terminal 122. The service button provides one of a plurality of electrical connections to the keypad and button inputs 510. The ground terminal 122 provides, as may be required, electrical connection to the VIU 100 enclosure.

Antenna 124 passes through the VIU 100 enclosure. The antenna 124 provides an antenna electrical connection to the transceiver 524, data modem 514, or optionally an antenna electrical connection to an external modem interconnected with auxiliary interface port 106.

Figure 2A:
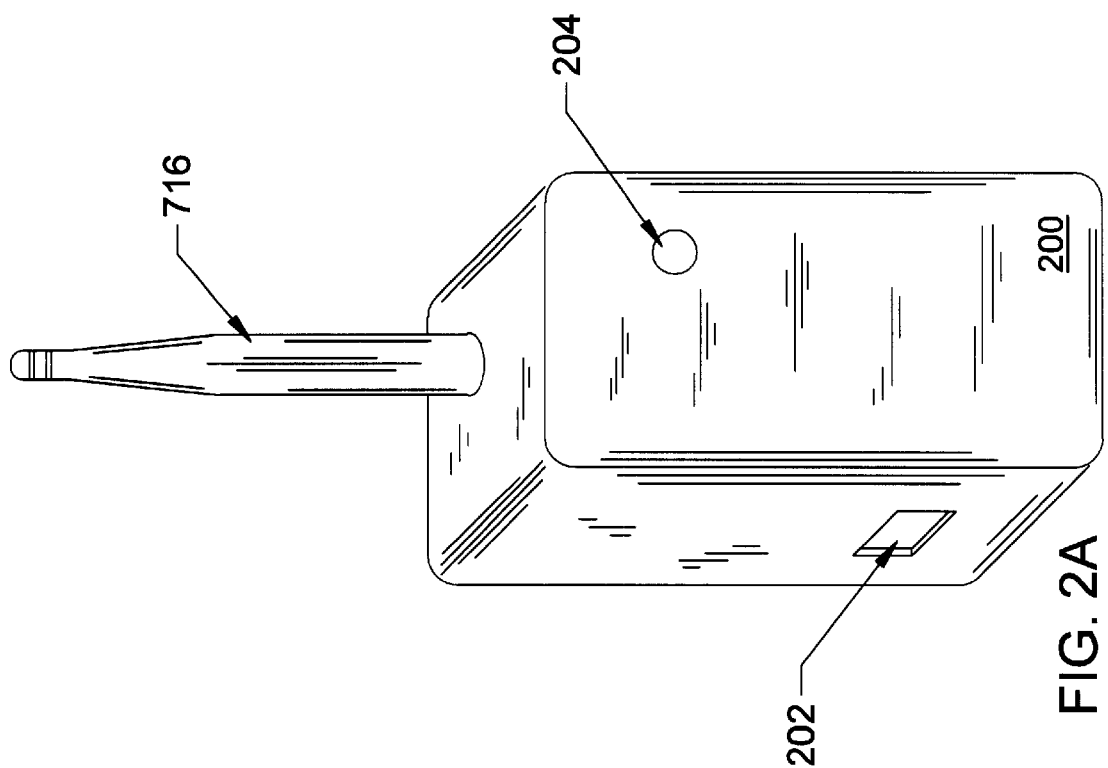
FIG. 2 there is shown a transceiver and modem base unit 200.
Figure 2B:
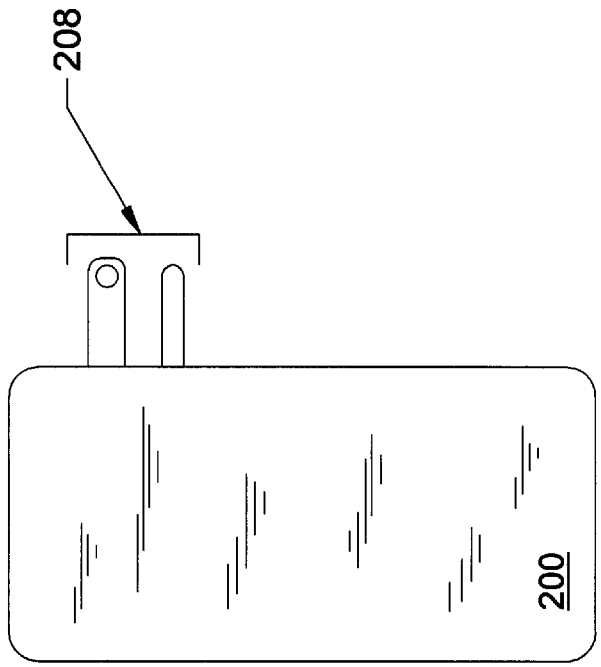

Referring to FIG. 2 there is shown a transceiver and modem base unit 200. Transceiver and modem base unit 200 includes transceiver unit 700 built in. The transceiver unit 200 with transceiver unit 700 data communicates wirelessly with the VIU 100 and by way of a modem data communicates with a remote location. In an exemplary embodiment the VIU 100 with system 500 and transceiver unit 200 with transceiver unit 700 form a wireless data link, which has access to a modem for data communicating with a remote location. In this regard, the reliance on having a telecommunication line in proximity to the VIU 100 or more generally in proximity to the vending equipment the VIU 100 is installed in is greatly reduced.

The transceiver unit 200 has incorporated into it a system 700 control system. FIG. 2 shows a telecommunication access port 202 in the side on the transceiver unit 200. The telecommunication access port 202 provides access by way of a plurality of electrical connections to the modem 704. A telecommunication access port 202 can be an RJ11 style, or similar telecommunication connector.

Attached to the transceiver unit 200 is an antenna 716. The antenna 716 provides an antenna electrical connection to the transceiver 708. The antenna 716 can be an antenna manufactured by the ANTENNA FACTOR, or other similar or suitable antenna.

An indicator lamp is also viewable through an indicator port 204 in the transceiver unit 200 enclosure. An indicator lamp can be part of the transceiver system 700. Such an indicator lamp being viewable through indicator port 204 can be utilized to inform a user of correct operation of the transceiver unit 700.

The transceiver system 700 located inside the transceiver unit 200 enclosure can obtain power for operation from an electrical connection by way of AC connection 208. In an exemplary embodiment the AC connection 208 can be plugged into a standard 115VAC wall outlet.

Referring to FIGS. 3A and 3B there is shown a card reader assembly. FIG. 3A shows a front view of the card reader assembly. FIG. 3B shows a left side view of the card reader assembly. In an exemplary embodiment the card reader assembly can be installed in a vending machine. A user having access to the front of the card reader assembly can insert cards, view display information, use a push button to provide system input and if equipped with a printer assembly obtain a receipt, coupon, or other print information dispensed to the user.

A faceplate 302 is shown fastened to a support bracket 318. The faceplate 302 is sized to fit the industry standard bill validator opening, which can be found on most brands and models of vending equipment. The faceplate 302 has a plurality of holes to allow fastening of the card reader assembly into the vending equipment.

Faceplate 302 also has a paper exit slot 304 to allow receipt printer 328 to dispense a printed receipt to a user of the system. Faceplate 302 also has a display slot 306 which allows display 606 mounted on the card reader interface board 312 to be viewable from its mounting location behind the front surface of faceplate 302. Faceplate 302 also contains a plurality of threaded studs for mounting the card reader interface processor board 312.

In addition, faceplate 302 can be fastened to a bracket 318. Bracket 318 has a plurality of threaded inserts 320 for fastening a card reader 310 to the card reader assembly. The bracket 318 also has a threaded insert 316 located in the rear of the bracket 318. Threaded insert 316 can receive thumbscrew 334 in order to facilitate the fastening of the printer assembly bracket 330 to the card reader assembly.

A push button switch 308 can be fastened to the faceplate 302 and electrically connected to the card reader interface board 312 by way of cable assembly 336. In addition, card reader 310 can be electrically connected to the card reader interface board 312 by way of cable assembly 314.

Referring to FIGS. 3C and 3D there is shown a printer assembly. FIG. 3C shows a right side view of the printer assembly. FIG. 3D shows the front view of the printer assembly. In an exemplary embodiment the printer assembly can be slid onto the card reader assembly (see FIG. 3F) and secured to the card reader assembly by way of the thumbscrew 334. A card reader assembly having been equipped with a printer assembly can now print receipts, coupons and other print information for a user of the system.

At the top of printer bracket 330 there is a cutout for receiving a paper holder rod 324. The paper holder rod 324 is typically inserted through a roll of paper, such as paper roll 322. Printer bracket 330 also has a plurality of mounting holes to secure printer the mechanism 328 to the printer bracket 330. Printer bracket 330 has a threaded thumbscrew 334 secured to the bracket 330.

The printer mechanism 328 has a paper advance knob 326. The paper advance knob 326 can be used to position the paper.

Figure 3E:
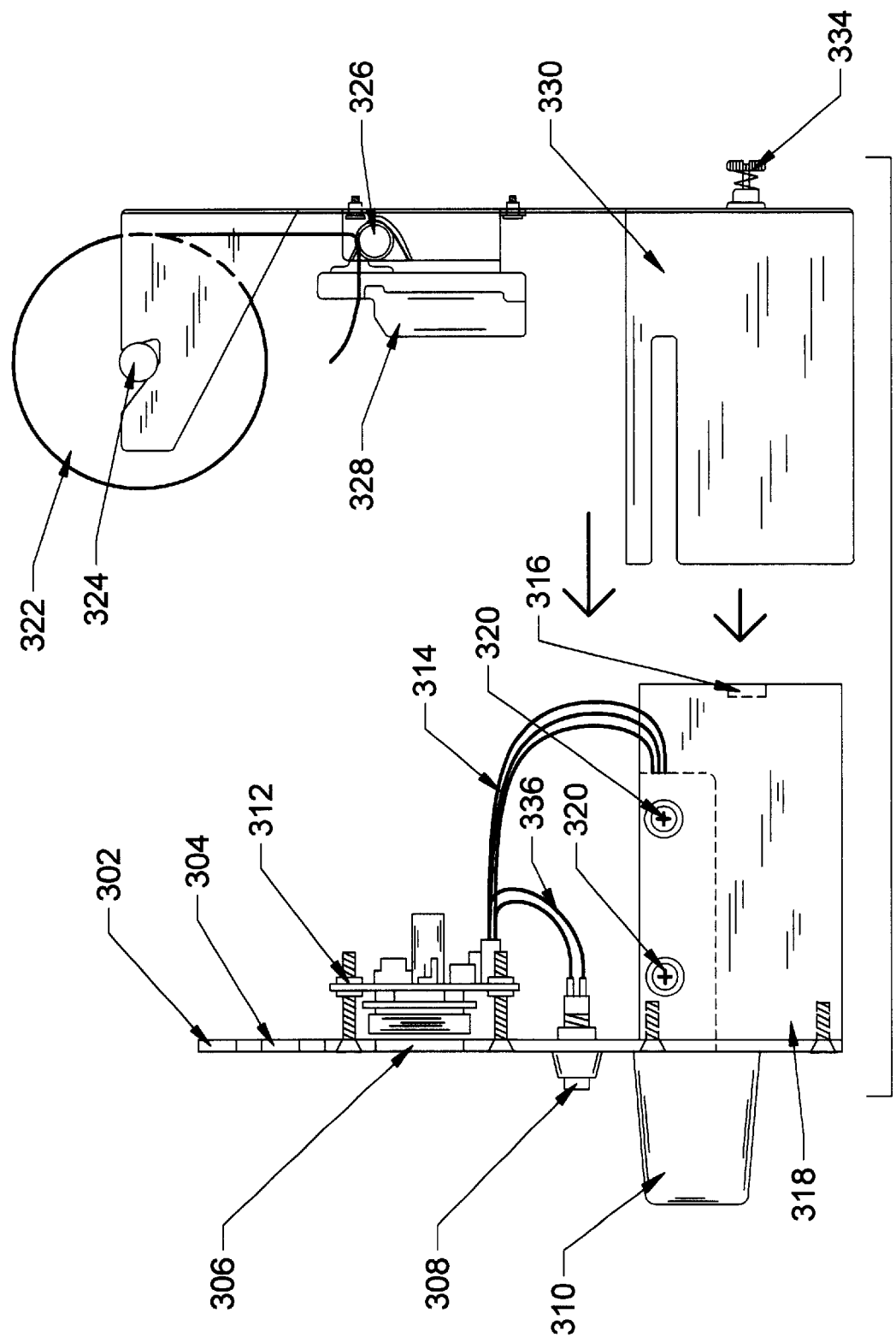
FIG. 3E there is shown a right side view of a card reader assembly and a right side view of a printer assembly being aligned for assembly together.

Referring to FIG. 3E there is shown a right side view of a card reader assembly and a right side view of a printer assembly being aligned for assembly together. In an exemplary embodiment a user of the card reader assembly can choose to add the ability to print receipts, coupons, and other print information by sliding the printer assembly onto the card reader assembly and making the appropriate electrical connections. Furthermore, the printer assembly can be securely fastened to the card reader assembly by way of thumbscrew 334.

Figure 3F:
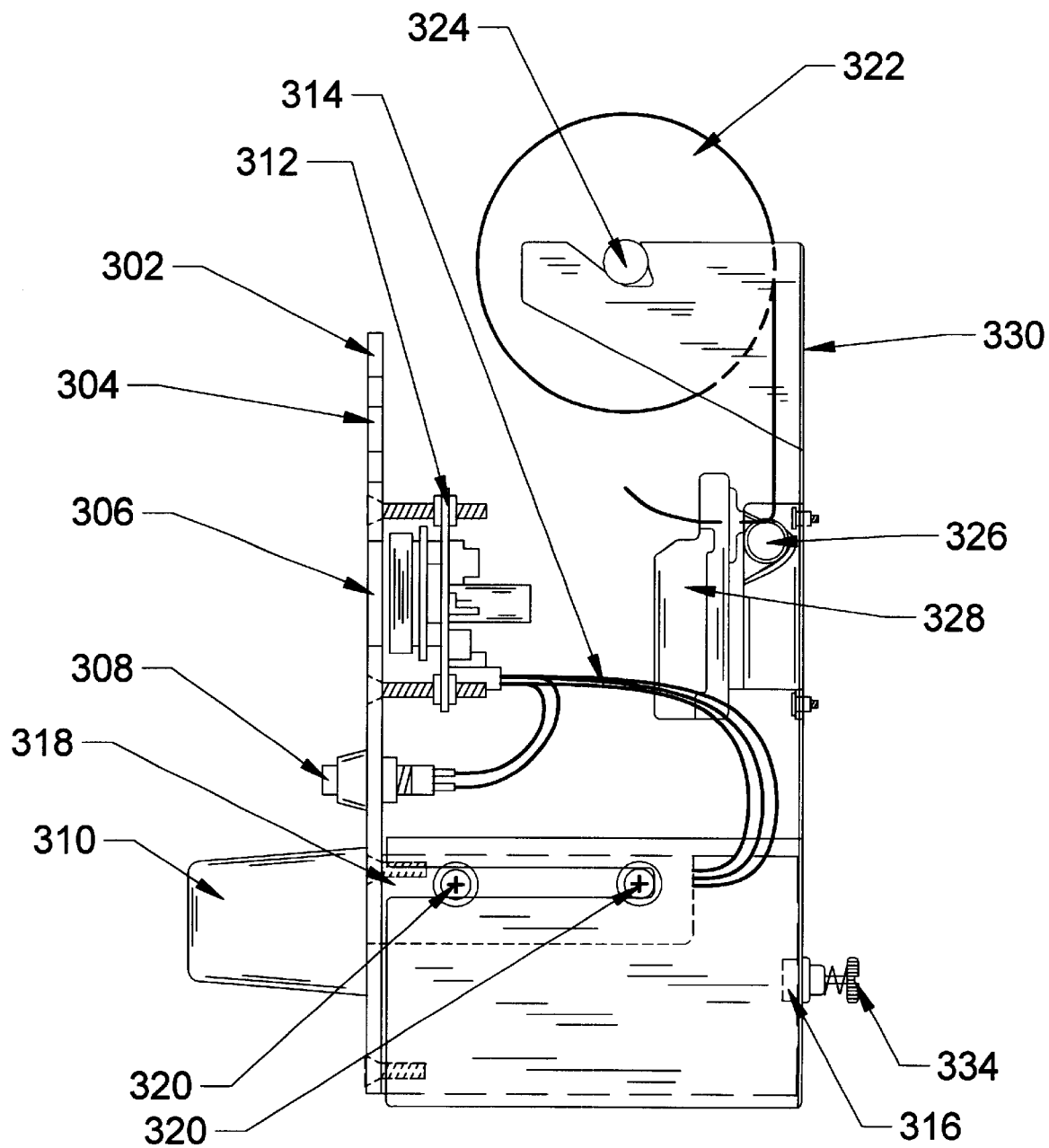
FIG. 3F there is shown a right side view of the assembled card reader and printer assembly.

Referring to FIG. 3F there is shown a right side view of the assembled card reader and printer assembly.

Figure 4:
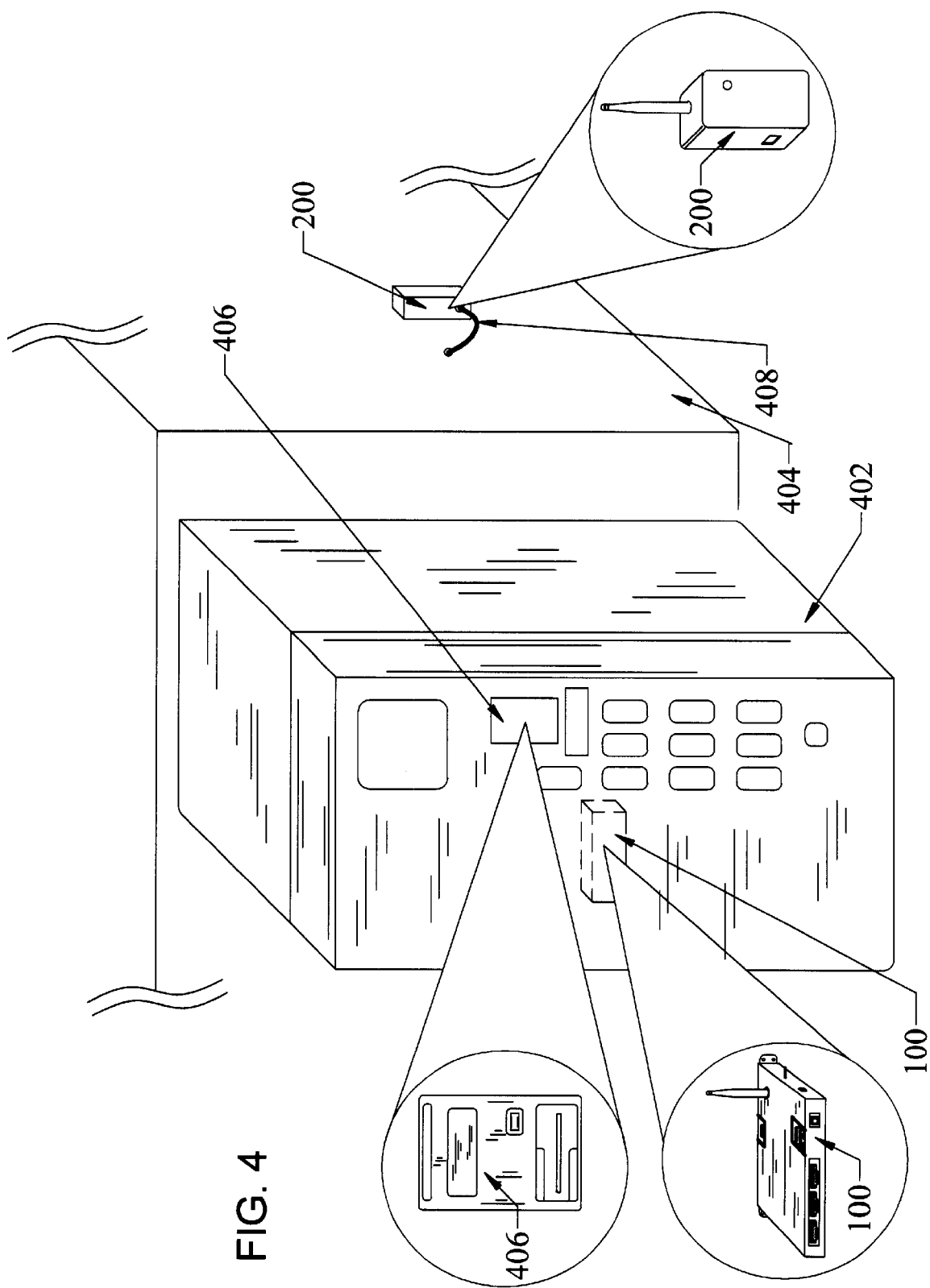
FIG. 4 there is shown a vending machine, vending interface unit, card reader and printer assembly, and transceiver and modem base unit.

Referring to FIG. 4 there is shown a vending machine 402, vending interface unit 100, card reader with optional printer assembly 406, and transceiver and modem base unit 200.

In an exemplary embodiment a VIU 100 can be located inside the vending equipment, such as vending equipment 402. In addition, the card reader assembly with optional pointer assembly can be mounted inside the vending equipment in such a way that a user has access to the card reader assembly. During operation a communication line can be interconnected directly with the VIU 100. Alternatively the VIU can wireless data communicate with a transceiver base unit 200. There is shown in FIG. 4 a transceiver unit 200 plugged into an electrical outlet on wall 202. Also shown is a telecommunication line 408 interconnect with transceiver unit 200.

Figure 5:
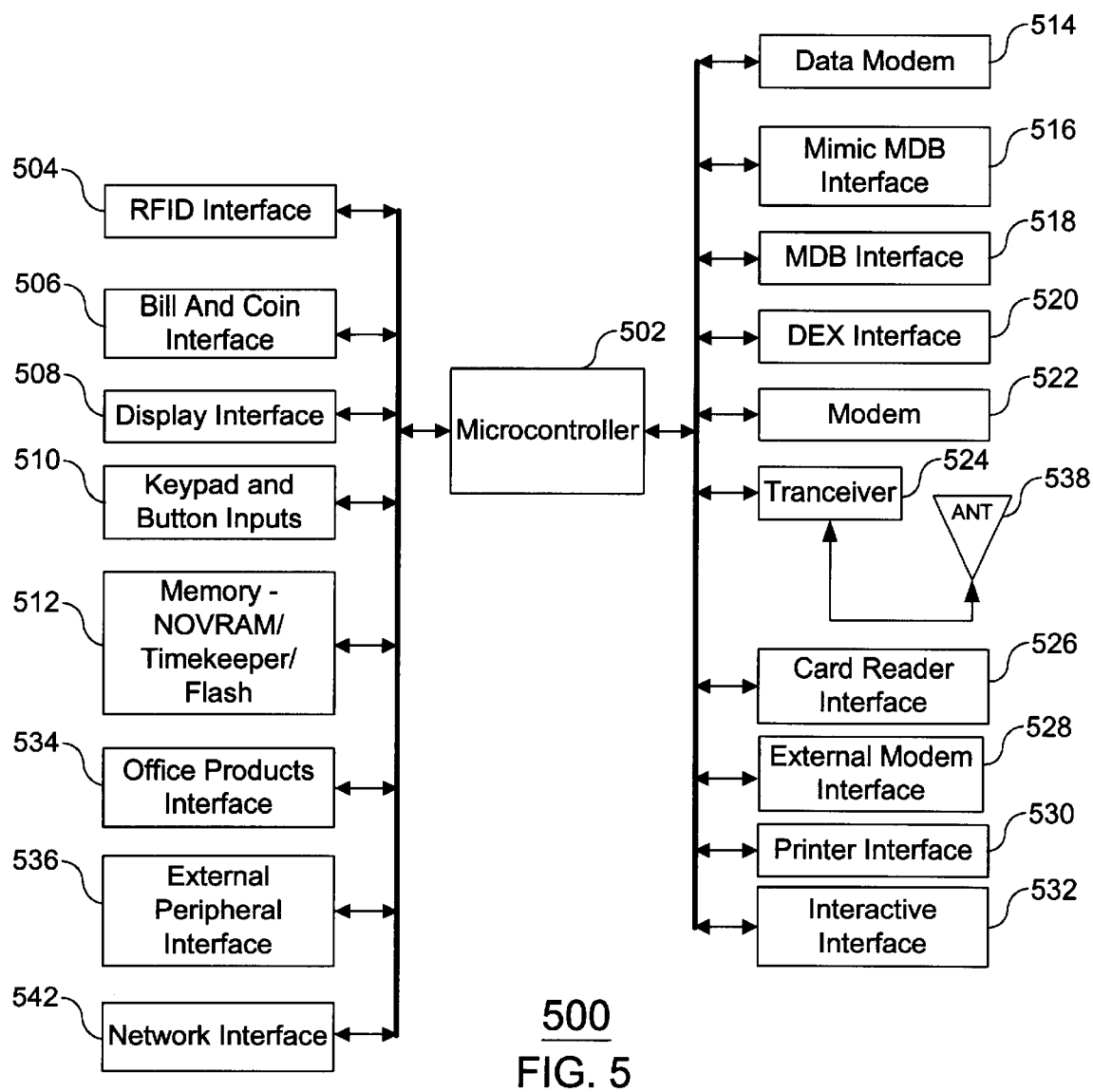
FIG. 5 there is shown an audit-credit-interactive system 500.

Referring to FIG. 5 there is shown an audit-credit-interactive system 500. In an exemplary embodiment the audit-credit-interactive system 500 electronics can be located in the VIU 100. A VIU 100 having an audit-credit-interactive system 500 can be referred to as a MDB controller, a computing platform, a USA TECHNOLOGIES E-PORT, or a USA TECHNOLOGIES G4 E-PORT.

The audit-credit-interactive system 500 provides three major components of functionality. As an audit device the audit-credit-interactive system 500 can audit inventory, sales, operational and other vending machine performance by way of the MDB and DEX interfaces. This gathering and forwarding to a plurality of remote locations of the DEX and or MDB data can be referred to as vending equipment telemetry, or as telemetry data.

When the card reader assembly is added to the system the audit-credit-interactive system 500 provides audit and card processing functionality. The card functional allows cashless vending transactions to occur. Cashless vending transactions are effectuated by allowing various forms of identification (ID), and payment medium to be accepted as or for payment at the vending equipment. Other forms of ID can include, for example and not limitation, smart and magnet cards, radio frequency (RF) ID devices (RFID), user personal identification numbers (PIN) numbers or accounts, or wireless data communication access by way of wireless phone, Bluetooth, or 802.11B protocols or devices. For purposes of disclosure cashless vending refers to non-coin and non-cash transactions.

The audit-credit-interactive system 500 includes numerous mutually exclusive interfaces and control means. In a plurality of customer specifications and where customer cost considerations demand, there may arise a situation where an audit-credit-interactive system 500 may be manufactured in such a way as to not contain or require the use of certain features, junctions, interfaces, and or control means. Accordingly, an audit-credit-interactive system 500 can easily be manufactured to include or exclude a specific combination of features, functions, interfaces, and or control means to produce the desired system performance at a desirable cost to a customer. For example and not limitation, a customer may desire to operate an audit-credit-interactive system 500 without an RFID interlace 504. In such a case, an audit-credit-interactive system 500 could be manufactured with the omission of the RFID interface 504. In any combination, the same inclusion or exclusion of features, functions, interfaces and or control means can be applied to other audit-credit-interactive system 500 features, functions, interfaces, and or control means.

Interconnected with microcontroller 502 can be an RFID interlace 504. The RFID interface 502 can data communicate with wired or wireless devices that are proximate to the RFID interface 504. In an exemplary embodiment these wired and wireless devices include, for example and not limitation, touch devices from DALLAS SEMICONDUCTOR, and wireless devices such as the MOBIL SPEED PASS, or other similar or suitable wired or wireless RFID devices. Microcontroller 502 can be any suitable microcontroller, or microprocessor. In an exemplary embodiment a microcontroller 502 can be a ZILOG Z8038220FSC.

Interconnected with microcontroller 502 can be bill acceptor and coin mechanism interface 506. The bill acceptor and coin mechanism interface 506 emulate industry standard bill acceptor and coin mechanism interfaces. In this regard, the audit-credit-interactive system 500 can be interconnected to vending equipment by way of the interface 506. The audit-credit-interactive system 500 mimicking industry standard bill acceptor and coin mechanism electrical control system and signal timing can then operate the vending equipment. Industry standard bill acceptors include serial and pulse style. Serial style bill acceptors utilize INTERRUPT, SEND, ACCEPT ENABLE, and DATA control signal lines. Pulse style bill acceptor and coin mechanism send electrical pulses to an attached control system to indicated the receipt of coin and currency. Serial and pulse style bill acceptors and coin mechanisms can include for example and not limitation MARS, COINCO, CONLUX, or other similar bill acceptors and or coin mechanisms.

Interconnected with microcontroller 502 can be a display interface 508. A display interface 508 can be a liquid crystal display (LCD), an RS232 connection, and or an electrical interface for driving a display. In an exemplary embodiment display interface 508 can be, for example and not limitation, an RS232 serial connection. Such a serial connection can be utilized to data communicate display data as well as other types of data to a card reader interface board 312.

Interconnected with microcontroller 502 can be a plurality of keypad and button inputs 510.

Interconnected with microcontroller 502 can be memory 512. Memory 512 can be a plurality of different types of memory. In an exemplary embodiment memory 512 can comprise non-volatile random access memory (NOVRAM), flash memory, and serial flash memory. In addition, the NOVRAM can include a timekeeper function for maintaining date and time. NOVRAM can be a DALLAS SEMICONDUCTOR DS1644, DS1646, or DS1647, or other similar or suitable RAM. Flash memory can be an ATMEL or STS brand AT29E010 or other similar style, different size, other brand, or suitable substitute. The serial flash memory can be an ATMEL brand AT45D081, a MICROCHIP 93LC66, or other similar style, different size, other brand, or suitable substitute.

In an exemplary embodiment the timekeeper feature can be effectuated to time and date stamp the transactions as they occur. From the vending equipment's MDB interface CASH VEND transactions, if supported by the VMC, as well as cashless vend transactions can be monitored and recorded. Adding a time and date time stamp to the each transaction as they occur can result in a detailed inventory utilization record showing the date and time the products were vended.

Interconnected with microcontroller 502 can be an office product interface 534. An office product interface 534 can include, for example and not limitation, an optoisolator for counting pulses generated by a fax machines, copy machine, and other office product equipment. In addition, office product interface 534 can include, for example and not limitation, a DTMF decoder for decoding telephone touchtones and subsequently billing for the use of a telephone line. DTMF decoding can be used in connection with a fax machine to bill for usage based in part on local, long distance, and international dialed locations.

Interconnected with microcontroller 502 can be an external peripheral interface 536. The external peripheral interface 536 includes a plurality of configurable input and output lines for interfacing to external peripheral devices. External peripheral interface 536 can support serial peripheral interfaces (SPI), serial interfaces such as RS232, RS485, $I^2C$, and other types of peripheral interface, and communication protocols and standards.

Interconnected with microcontroller 502 can be a network interface 542. A network interface 542 can be an Ethernet, token ring, FIREWIRE, or other similar or suitable type of network interface.

A data modem 514 can be interconnected with microcontroller 502. A data modem 514 can effectuate wired and wireless data communications with a plurality of remote locations. Wireless data modems include, for example and not limitation, MOTOROLA, ERICKSON, and NOKIA brands of data modems, as well as SPRINT PCS, CDMA, CDPD, or other similar or suitable brands or types of wireless data modem.

A multi-drop-bus (MDB) interface 518 is interconnected with microcontroller 502. In an exemplary embodiment an MDB interface 518 electrically interconnects with the vending equipment's MDB bus.

In accordance with NAMA and other derivative MDB specifications the MDB interface 518 operates in the slave mode being responsive to the vending machine controller (VMC). The VMC tropically resides in the vending equipment and operates as the vending equipment's control system. Interconnection with the MDB bus in combination with NAMA and other derivative MDB standard data communications allows the audit-credit-interactive system 500 to reside as a peripheral device to the vending equipment's control system in an auditing and payment device mode of operation.

In an exemplary embodiment the audit-credit-interactive system 500 is implemented as a cashless reader device on the MDB bus. As a cashless reader the system 500 can audit and transact cashless vending transactions.

A mimic MDB interface 516 can be interconnected with microcontroller 502. Mimic MDB interface 516 unlike MDB interface 518 can operate in both the master and slave modes of operation in accordance with the NAMA and other derivative MDB specifications. The mimic MDB interface 516 can support peripheral devices.

One advantage of this dual mode of operation is that the mimic MDB interface 516 can support proprietary or different versions of MDB protocol and appear to a peripheral device as a VMC. In this regard peripheral devices that are not compatible with the vending equipment's VMC control system can be interconnected with system 500's mimic MDB bus 516. Through software resident on the system 500 the peripheral device by way of the mimic MDB interface 516 can data communicate with the system 500 and or through the system 500's (with protocol interpolation) MDB interface 518, over the vending equipment's MDB bus to the vending equipment's VMC control system.

A second advantage of the dual mode of operation of the mimic MDB interface 516 is that features supported by a peripheral resultant from the implementation of a derivative MDB specification can be utilized by data communication first to the system 500 by way of the mimic MDB interface 516. If the MDB protocol command is a command supported by the vending equipment's VMC controller the system 500 can then relay the message received from the peripheral device to the VMC control system by way of the system 500's MDB interface 518. In this regard the system 500 essentially acts as a MDB interface gateway sending and receiving non-VMC support portions of a peripheral's implement MDB specifications. In addition, the MDB gateway implemented by the system 500 can allow the peripheral device data communication access to the VMC controller for portions of the peripheral implemented MDB specification supported by the vending equipment's VMC controller.

A data exchange (DEX) interface 520 is interconnected with microcontroller 502. The DEX interface 520 is a serial connection interface for interfacing the system 500 to the VMC control system. In an exemplary embodiment the DEX interface conforms to the EVA-DTS version 4.0 and version 5.0 specifications. In this regard the system 500 can 'DEX' vending equipment and obtain marketing, sales, and operational data as well as other types of data related to the vending equipment operation and performance. In addition, the DEX interface 520 can be utilized to program the VMC control system. VMC programming can include setting prices and parameters, setting operational data, clearing error codes or messages, and programming the VMC firmware.

A modem 522 can be interconnected with microcontroller 502. Modem 522 can be a utilized to data communicate to a plurality of remote locations. Modem 522 can include CERMETEK, XECOM, ZILOG, or other similar brands and types of modems and modem chip sets.

A transceiver 524 can be interconnected with microcontroller 502. In an exemplary embodiment transceiver 502 can effectuate wireless data communication between system 500 and a plurality of remote locations by way of transceiver unit's 200 system 700. A transceiver 524 can be a LINX, or MAX STREAM 430 Mhz, 800 Mhz, 900 MHZ, 2.4 Ghz, single frequency or spread spectrum RF module, and or other similar or suitable type of transceiver modules.

Additionally, transceiver 524 can be interconnected with antenna 538. Antenna 538 can be any suitable antenna configured to perform optimally with the selected transceiver and frequency. Antenna 538 can be an ANTENNA FACTOR brand antenna or similar or suitable antenna.

Interconnected with microcontroller 502 can be a card reader interface 526. Card reader interface 526 can support a variety of card reader interfaces and protocols including for example and not limitation bit strobe type of card readers. Bit strobe type of card readers read predefined tracks of data from a magnetic card. To read track data the card reader can incorporate a plurality of DATA lines and DATA CLOCK lines to transfer magnetic card data. Card reader interface 526 can also support serial communication style card readers. Serial communication style card readers can incorporate TRANSMIT, RECEIVE, CLEAR TO SEND, and REQUEST TO SEND control lines to transfer card data to system 500. Such magnetic card readers can include those manufactured for or by XICO, MAGTEK, NEURON, or other similar or suitable card reader.

In addition to accepting magnet cards card reader interface 526 can implement a smart card reader interface. In this regard, system 500 by way of card reader interface 526 can read, write, and execute embedded applications on a plurality of types and brands of smart cards.

An external modem interface 528 can be interconnected with microcontroller 502. In an exemplary embodiment an external modem interface 528 can be an RS232 serial communication interface for interfacing to a plurality data modems, transceivers, and other communication type peripheral. Such data modems, transceivers, and other communication type peripherals can include for example and not limitation MOTOROLA, ERICKSON, NOKIA, SPRINT, AT&T, LINX, MAX STREAM, or other similar or suitable data communication devices.

A printer interface 530 can be interconnected with microcontroller 502. A printer interface 530 can be a serial communication style or Centronic style interface. In an exemplary embodiment printer interface 530 can be utilized to print receipts, coupons, and other print data.

An interactive interface 532 can be interconnected to microcontroller 502. The interactive interface 532 can be utilized in combination with the interactive interface communication protocol shown in the table below to interconnect the system 500 to a computing platform. The card reader assembly having a card reader interface board 312, which is implementing a card reader user interface system 600, is a computing platform. In addition, PC based devices, handheld devices, and other microprocessor-based devices are also computing platforms.

In an exemplary embodiment for example and not limitation a computing device can be interfaced to a system 500 by way of the interactive interface 532. In this regard the two interconnected devices can data communicate by way of an interactive device interface protocol. This protocol can be implement in and exemplary embodiment as disclosed in the following table where a system 500 can be referred to as a MDB controller or G4, and host network center 808 can be referred to as USALive:

MDB Controller/G4 E-port/E-port (System 500)
Interface Protocol And Specification MDB Controller/G4:

The MDB controller is the microcontroller-based system, which can interfaces to the vending machines MDB interface and to a computing platform. Such computing platforms include E-port. Certain versions of the E-port may incorporate the MDB controller and computing platform into a single board solution. In such a case serial communications between the computing platform and the MDB microcontroller occur over the devices serial peripheral interface (SPI) or other similar or suitable communication interface.

The G4 (system 500) version of E-port can utilize a single microcontroller to serve as an MDB controller as well as a cashless payment system platform. The G4 device incorporates an RS232 serial interface by which other computing platforms can interface to and control the functionality of the G4 and associated vending equipment. The G4 version can operate in two modes of operation. In a first mode of operation the G4 provides all the MDB interface control, audit/cashless payment support, and network connectivity. In this mode a computing platform can interact with the G4 in a hybrid role to monitor a string of user text prompts (see DISPLAY PROTOCOL) as well as execute NON-MDB-CONTROL types of commands (see table below).

In a second mode of operation the G4 can be configured and serve as an MDB controller (system 500) only. In this mode both the MDB-CONTROL and NON-MDB-CONTROL commands can be executed. While in this mode of operation the computing platform operates as a master device controlling the operation and process now of the system. While in this mode the G4 serves as a slave device interfacing to the vending machine and managing the control of the MDB interface.

COMMUNICATION INTERFACE details the electrical interconnections required to allow the G4 to data communicate with a computing platform.

Communication Parameters:

The MDB controller/G4 communicates to a computing platform by way of serial communications. In this regard a set of commands issued from the computing platform implement a level of control via the MDB controller/G4 and the MDB/ICP protocol to transact a cashless transaction and obtain DEX data information.

Serial communications between the computing platform and the MDB controller/G4 are set at 9600 baud, 8 data bits, no parity, and 2 stop bits. Required serial port communications lines include transmit (Txd), Receive (Rxd) and Ground (Gnd).

MDB CONTROLLER/G4 COMMAND
PROTOCOL

Protocol Exchange:

The "master" computing platform can initiate any '@' command listed in the command tables below. In response to a complete command the MDB controller/G4 will process and return the result string. The result string shall start with a start character (STX) hex $02, and conclude with an ETX character hex $03. A LRC check byte will immediately follow the ETX character.

| Protocol Exchange Characters | |
| --- | --- |
| STX | hex $02 |
| ETX | hex $03 |
| <esc> | ESCAPE character hex $1B |
| LRC | all bytes XORed excluding the STX character and including the ETX character. |

It is recommended that the '@' commands be executed by inserting a leading space prior to the '@'. For example sending '@<esc>H' instead of '@<esc>H' the differencing being a leading space. The leading space will decrease command communication errors by allowing the MDB Controller/G4 to sync on the leading space.

MDB-Control-Commands

Command Description:

@<esc>T-REQUEST FOR CARD READER DATA.

If no card reader data is available then the result string will return:

STX+[CARD-NOCARDDATA]+ETX+LRC

Else the result string will return:

STX+[CARD-][UPTO 37 BYTES MAX OF CARD DATA]+ETX+LRC

Example of valid card data:

STX+[CARD-41324132413243132=91827389374637643 72]+ETX+LRC

@<esc>Z-CLEAR CREDIT CARD DATA. The credit card buffer will be cleared and The result NOCARDDATA will be inserted in the buffer and returned in response to the @<esc>T command. The result string will return.

STX+[OK-Z]+ETX+LRC

@<esc>V-REQUEST FOR MDB TRANSACTION STRING DATA. The result string will return:

STX+[S]+[xxxxxx Field #1 6 bytes]+[xxxxxx Field #2 6 bytes]+[xxxx Field #3 4 bytes]+[F]+ETX+LRC Where 'xxx . . . ' denotes fixed length fields. These fields should be right justified and have leading zeros added to fix the length of each field. For example $1.50 should be represented as 000150.

The 'S' field is the state current MDB state. Valid states include:

| Valid Vending States | |
| --- | --- |
| State | Description |
| I | Inactive |
| D | Disable |
| E | Enabled |

-continued

Valid Vending States

| State | Description |
|---|---|
| S | In Session |
| V | Vend |

Field #1 is the MAX VEND PRICE as reported by the vending machine controller (VMC) during the MDB initialization process. This is a 6-byte field.

Field #2 is the SALE PRICE. The SALE PRICE is determined in the MDB protocol for the VEND-Request Command (See. NAMA Multi Drop Bus (MDB)/Internal Protocol Version 1.0, and 2.0 specifications).

Field #3 is the COLUMN information. The COLUMN information is determined in the MDB protocol for the VEND-Request Command (See. NAMA Multi Drop Bus (MDB)/Internal Protocol Version 1.0, and 2.0 specifications).

The 'F' field is the MDB transaction condition flag. Valid flag states include:

Valid Flag States

| State | Description |
|---|---|
| C | Clear |
| $ | Currency vend has occurred |
| P | Vend pending |
| V | Cashless vend has occurred |
| F | Vend fail |

The 'C' flag is set when the MDB transaction string is cleared. The '$' flag is set when a VEND CASH MDB transaction occurs. The 'P' flag is set when a VEND-APPROVED MDB command is issued and remains valid until the VEND SUCCESSFUL or VEND FAIL MDB command is issued. The 'F' flag is set when a VEND FAILS.

Examples of MDB transaction strings:

STX+[E0001500000000000C ]+ETX+LRC->Enabled, MAX Vend price $1.50, transaction string in cleared state STX+[S0001500000000000C]+ETX+LRC->In session, MAX Vend price $1.50, transaction string in cleared state STX+[V0001500001000002P]+ETX+LRC->Vend state, MAX Vend price $1.50, sale price $1.00, vend from column 2, vend pending STX+[E0001500001000002V]+ETX+LRC->Enable state, MAX Vend price $1.50, sale price $1.00, vend from column 2, vend complete STX+[E0001500001250003$]+ETX+LRC->Enable state, MAX Vend price $1.50, sale price $1.25, vend from column 3, cash vend IMPORTANT NOTE: The MDB microcontroller/G4 MDB interface will continuously manage the changes to the MDB transaction string. For example as the MDB state changes, the MDB state field will automatically be updated. There are however two scenarios that require the execution of the @<esc>C-CLEAR MDB TRANSACTION STRING DATA command. These two scenarios include when a currency vend has occurred the 'F' field has been set to '$', and when a cashless vend has occurred and the 'F' field has been set to 'V'. In both these cases the @<esc>C command will have to executed to clear the MDB TRANSACTION STRING before a new cash transaction can be tracked or a new cashless vending session can be started.

If the G4 is used in the VEND ACTIVE 'ON' mode the above does not apply in that the G4 will clear the MDB TRANSACTION string as appropriate. If the G4 is used in the G4 VEND ACTIVE 'OFF' the above will apply.

@<esc>C-CLEAR MDB TRANSACTION STRING DATA. The MDB controller/G4 will clear the SALE PRICE field, COLUMN information field, and the transaction condition flag is set to 'C'. The result string will return:

STX+[OK-C]+ETX+LRC

<esc>H-HYBRID COMMAND FOR SEND CARD DATA AND MDB STRING. The MDB controller/G4 will send both the card reader data (see @<esc>T above) followed by the MDB string (see @<esc>V). The result string will return:

STX+[@<esc>T response]+ETX_LRC+STX+[@<esc>V RESPONSE]+ETX+LRC

@<esc>S-BEGIN A SESSION COMMAND. The MDB controller/G4 will begin an MDB session (see NAMA MDB specification V1.0, V2.0 for BEGIN SESSION command). The result string will return:

STX+[OK-S]+ETX+LRC

The G4 must have the MDB state set to 'E' for ENABLED in order to start a session. If a session cannot be started the result string will return:

STX+[UNABLE-S]+ETX+LRC

@<esc>X-END A SESSION COMMAND. The MDB controller/G4 will END an MDB session (see NAMA MDB specification V1.0, V2.0 for SESSION CANCEL command). The result string will return:

STX+[OK-X]+ETX+LRC

@<esc>F-SET MDB CONTROLLER STATE TO INACTIVE. The MDB controller/G4 will set the MDB state to Inactive. The result sting will return:

STX+[OK-F]+ETX+LRC

@<esc>D-SET MDB CONTROLLER STATE TO DISABLE. The MDB controller/G4 will set the MDB state to Disable. The result sting will return:

STX+[OK-D]+ETX+LRC

@<esc>E-SET MDB CONTROLLER STATE TO ENABLE. The MDB controller/G4 will set the MDB state to Enable. The result sting will return:

STX+[OK-E]+ETX+LRC

@<esc>K-PERFORM A HARDWARE MDB CONTROLLER RESET. The MDB controller/G4 will return the result string and then go through a hardware reset. The result sting will return:

STX+[OK-K]+ETX+LRC

<esc>I-TOGGLE INTERRUPT MODE. The MDB controller/G4 will return the result string below toggling between 'ON' and 'OFF' of the interrupt mode.

STX+[ON-I]+ETX+LRC->When toggling into the interrupt mode STX+[OFF-I]+ETX+LRC->When toggling out of the interrupt mode While in the interrupt mode the MDB controller/G4 will send the result string for the @<esc>T and the @<esc>V commands shown above each time the respective data fields change.

For example, while in the interrupt mode the MDB controller/G4 will send the @<esc>T result string on the successful read of a magnetic card.

In addition, while in the interrupt mode the MDB controller/G4 will send the @<esc>V result string each time any field in the MDB transaction string changes.

Default: The default condition on microcontroller reset is 'OFF'.

@<esc>1-TOGGLE MDB CODE CAPTURE MODE. The MDB controller/G4 will return the result string below toggling between 'ON' and 'OFF' of the MDB CODE CAPTURE mode. This command is for diagnostic purposes only and should not be used during normal G4 operation. The intended purpose for this command is to diagnosis MDB related transaction issues during development and or testing.

STX+[ON-I]+ETX+LRC->When toggling into the MDB code capture mode.

STX+[OFF-I]+ETX+LRC->When toggling out of the MDB code capture mode

When the MDB code capture mode is switched to the 'ON' mode the following sequence of events begins:
1. The NOVRAM memory dedicated to the storage of vending transaction is cleared. All data (transactions) currently being stored will be erased to make room for the MDB bus codes.
2. The G4 will begin record both the received MDB codes from the vending machine controller (VMC) and the sent MDB codes from the G4. There is RAM room for approximately 15 seconds of recording time.

When the MDB code capture mode is switched to the 'OFF' mode the G4 will stop recording the MDB bus codes. A buffer dump of the MDB codes exchanged between the G4 and the VMC can be viewed by executing @<esc>2 the MDB CAPTURED CODE BUFFER DUMP command.

Two important notes:
1. When you are ready to return the G4 system to the normal operation mode you should 1) insure that the MDB CODE CAPTURE mode is 'OFF' and 2) Execute the @<esc>J CLEAR MAIN MEMORY command to clear and reset the G4 main memory. The CLEAR MAIN MEMORY command is important in that the MDB codes captured are stored in the NOVRAM area and may interfere with the G4 normal record management procedures.
2. When the MDB capture mode is switched to 'ON' the G4 will stay in this state until either 1) the buffer area for MDB codes if filled (about 15 seconds) or 2) the MDB capture mode is switched to 'OFF'. Even if the G4 is powered 'OFF' or the @<esc>K HARDWARE RESET command is issued the MDB capture mode state will not change. The reason for this is to allow the MDB capture mode to be turned 'ON' and remain 'ON' capturing MDB transaction codes between the vending machine and the G4 while the vending machine and or G4 go through a power up or reset procedure.

If the G4 is in a vending transaction the TOGGLE MDB CODE CAPTURE MODE command cannot be executed to turn 'ON' the MDB capture feature. If the TOGGLE MDB CODE CAPTURE MODE command is executed during a vending session the MDB capture mode will be turned 'OFF' and result string will return:

STX+[OFF-1]+ETX+LRC

Default: The default condition on microcontroller reset is 'OFF'

@<esc>2-MDB CAPTURE MODE BUFFER DUMP. The MDB controller/G4 will return the result string below dumping the MDB codes passed between the G4 and the vending machine controller (VMC). The output will be formatted to indicate which codes were transmitted by the VMC and which codes were transmitted by the G4. This command is for diagnostic purposes only and should not be used during normal G4 operation. The intended purpose for this command is to diagnosis MDB related transaction issues during development and or testing.

STX+[MDB]+->Header

[VMC-]+VMC transmitted data->Data transmitted by the VMC

[G4-]+G4 transmitted data->Data transmitted by the G4

. . .

ETX+LRC

Command Description:

@<esc>$-SIMULATE CASH VEND TRANSACTION. The G4 will simulate a CASH VEND transaction (see MDB spec V1.0 for CASH VEND command). The result sting will return:

STX+[OK-$]+ETX+LRC

To simulate the CASH VEND the MDB transaction string will be set to the following:

STX+[E0005000001250001$]+ETX+LRC

If the G4 is in a vending transaction a SIMULATE CASH VEND transaction cannot be executed. If a SIMULATE CASH VEND transaction cannot be executed the result string will return:

STX+[UNABLE-$]+ETX+LRC

@<esc>#-SIMULATE CASHLESS VEND TRANSACTION. The G4 will simulate a CURRENCY VEND transaction (see NAMA MDB spec V1.0 and V2.0 for VEND REQUEST and VEND APPROVED commands). The result sting will return:

STX+[OK-#]+ETX+LRC

To simulate the CASHLESS VEND the MDB transaction string will be set to the following:

STX+[E0005000001250001V]+ETX+LRC

If the G4 is in not in a vending transaction a SIMULATE CASHLESS VEND transaction cannot be executed. If a SIMULATE CASHLESS VEND transaction cannot be executed the result string will return:

STX+[UNABLE-#]+ETX+LRC

@<esc>M-TOGGLE MODEM COMMUNICATION ACCESS. The G4 will switch the serial communication ports being utilized by the computing platform to the MDB controller/G4 communication port. In this regard the computing platform can utilize the communication port (modem and or wireless) of the MDB controller/G4. The result sting will return:

STX+[ON-M]+ETX+LRC->When toggling into the communication mode-allowing the computing platform to use the MDB controller/G4 communication port. A communication hardware reset will also be invoked in the G4 to prepare the communication device to receive data.

STX+[OFF-M]-ETX+LRC->When toggling out of the communication mode

IMPORTANT NOTE: The communication parameters between the G4 are outlined in above as 9600, no parity, 8 data bits, and 2 stop bits. Upon executing the @<esc>M command 'ON' the G4 switches direct access to the communication device. If for example, a 2400 baud modem is being used the device issuing the @<esc>M command will have to first change its baud rate to 2400 before the G4 modem can respond to the requests. Furthermore, upon the conclusion of a communication session before the @<esc>M command can be issued and interrupted by the G4 to switch the communications 'OFF' the baud rate of the device issuing the @<esc>M command should change its baud rate back to 9600 N, 8, 2.

Default: The default condition on microcontroller reset is 'OFF'

@<esc>Q-SEND CURRENT TRANSACTION RECORD. The G4 will return the current transaction record. The current transaction record is a fixed length record. The parsed fields are a list below. The result sting will return:
STX+[RECORD NUMBER-TRANSACTION RECORD]+ETX+LRC If the G4 is not in a vending transaction a SEND CURRENT TRANSACTION RECORD transaction cannot be executed. If a SEND CURRENT TRANSACTION RECORD transaction cannot be executed the result string will return:
STX+[UNABLE-Q]+ETX+LRC Where the parsed [record number-transaction record] fields are as follows:

STX+[UNABLE-W]+ETX+LRC

@<esc>R-TOGGLE VERBOSE TEXT PROMPTS ON/OFF. The G4 will switch between providing a stream of text prompts (see DISPLAY PROTOCOL) when the, VERBOSE mode is turned 'ON' and disabling the transmission of the text prompts when the VERBOSE mode is 'OFF'. The result sting will return:
STX+[ON-R]+ETX+LRC->When toggling into the VERBOSE mode.
STX+[OFF-R]+ETX+LRC->When toggling out of the VERBOSE mode Default: The default condition on microcontroller reset is 'ON'

@<esc>Y-TOGGLE G4 VEND ACTIVE MODE ON/OFF. The G4 can operate in two modes of operation. In the

| Transaction Record Format | | |
|---|---|---|
| RECORD TYPE | BYTES | DESCRIPTION |
| RECORD NUMBER | 4 bytes | Current transaction record number |
| SEPARATOR | 1 byte | Field separator '-' |
| CARD DATA/ID DATA | 37 bytes | Card data or Dial-A-Vend data |
| MERCHANT ID REFERENCE | 1 byte | Merchant ID Prefix (G4 specific typically set to '1') |
| SALE AMOUNT | 5 bytes | Transaction sale amount |
| APPROVAL CODE | 8 bytes | Transaction approval code (typically starts with AP) |
| CAPTURE ID FLAG | 1 byte | Transaction Capture Flag/Transaction ID |
| | | 0 = DO NOT CAPTURE TRANSACTION |
| | | 1 = CREDIT CARD TRANSACTION |
| | | 2 = SETTLEMENT DATA |
| | | 3 = ERROR RECORD |
| | | 4 = SETTLED CREDIT CARD TRANSACTION |
| | | 5 = PRIVATE SYSTEM TRANSACTIONS |
| | | 6 = NOT USED |
| | | 7 = EMAIL TRANSACTION |
| START TIME | 8 bytes | Transaction Start Date and Time (MMDDHHMM) |
| COUNT 1 | 4 bytes | Event counter #1 i.e. copy or print count (XXXX) |
| STOP TIME | 8 bytes | Transaction Stop Date and Time (MMDDHHMM) |
| COUNT 2 | 4 bytes | Event counter #2 i.e. copy or print count (XXXX) |
| INVENTORY TOTAL | 2 bytes | Total vended inventory count |
| ITEM COLUMN 1 | 2 bytes | Vended item #1 column data |
| ITEM COLUMN 2 | 2 bytes | Vended item #2 column data |
| ITEM COLUMN 3 | 2 bytes | Vended item #3 column data |
| ITEM COLUMN 4 | 2 bytes | Vended item #4 column data |
| ITEM COLUMN 5 | 2 bytes | Vended item #5 column data |
| ITEM COLUMN 6 | 2 bytes | Vended item #6 column data |
| ITEM COLUMN 7 | 2 bytes | Vended item #7 column data |
| ITEM COLUMN 8 | 2 bytes | Vended item #8 column data |
| ITEM COLUMN 9 | 2 bytes | Vended item #9 column data |
| ITEM COLUMN 10 | 2 bytes | Vended item #10 column data |
| SPARE DATA | 2 bytes | Not Implemented |
| LRC CHECK BYTE | 1 byte | LRC check byte |

@<esc>W-SEND ALL TRANSACTION RECORDS. The MDB controller/G4 will return all the transaction records beginning with 0000. The G4 will return the message 'DONE' when complete. The transaction records are a fixed length records and follow the format shown above in the @<esc>Q command. The result sting will return:
STX+[0000-TRANSACTION RECORD]+ETX+LRC
. . .
. . .
. . .
STX+[xxxx-TRANSACTION RECORD]+ETX+LRC
DONE Where '0000' is the first transaction record and 'xxxx' is the last transaction record.

If the G4 is in a vending transaction a SEND ALL TRANSACTION RECORDS transaction cannot be executed. If a SEND ALL TRANSACTION RECORDS transaction cannot be executed the result string will return:

VEND ACTIVE 'ON' mode of operation the G4 provides all the MDB interface control, audit/cashless payment support, and network connectivity. In this mode a computing platform can interact with the G4 in a hybrid role to monitor a string of user text prompts (see DISPLAY PROTOCOL) as well as execute the NON-MDB-CONTROL commands.

In the VEND ACTIVE 'OFF' mode of operation the G4 can be configured and serve as an MDB controller only. In this mode both the MDB-CONTROL and NON-MDB-CONTROL commands can be executed. While in this mode of operation the computing platform operates as a master device controlling the operation and process flow of the system, and the G4 serves as a slave device interfacing to the vending machine and managing the control of the MDB interface. The result sting will return:
STX+[ON-R]+ETX+LRC->When toggling into the VEND ACTIVE mode.
STX+[OFF-R]+ETX+LRC->When toggling out of the VEND ACTIVE mode Default: The default condition on microcontroller reset is 'ON'

@<esc>U-RETURN TO DEFAULT CONDITIONS. The G4 will return all settings to the power on/system reset default condition. The result sting will return:
STX+[OK-U]+ETX+LRC
Reset Default Conditions Include:
INTERRUPT MODE='OFF'
VERBOSE MODE='ON'
VEND ACTIVE MODE='ON'

@<esc>P-RETURN G4 TIME AND DATE STAMP. The G4 will return the current time and date. The time and date are set by the USALive (host network center 808) server each time the G4 communicates with the network servers. The result sting will return:
STX+[TIME-HHMMSS-MMDDYY]+ETX+LRC
Where 'HHMMSS' is the current hour, minute, and seconds, and 'MMDDYY' is the current month, day, and year.

@<esc>G-PRINT A RECEIPT FOR CURRENT TRANSACTION. The G4 will internally call the print receipt routine to print a receipt for the current transaction. The result sting will return:
STX+[OK-G]+ETX+LRC @<esc>J-CLEAR MAIN MEMORY TRANSACTIONS. The G4 main memory will be cleared. The result sting will return:
STX+[OK-J]+ETX+LRC @<esc>N-FEND A BLANK RECORD. The G4 finds and sets active the next available blank transaction record. The result sting will return:
STX+[OK-N]+ETX+LRC
The G4 must have the MDB state set to 'E' for ENABLED in order to find a blank record. A new record cannot be started while in a vending transaction. If a FIND BLANK RECORD command cannot execute the result string will return:
STX+[UNABLE-N]+ETX+LRC @<esc>B-START A VEND SESSION. Provided the G4 VEND ACTIVE 'ON' mode is set, the G4 will start a vend session. The sequence to starting a vend session include:
1. G4 finds the next available blank transaction record
2. G4 loads the default data into the transaction record
3. G4 loads as the CARD DATA/ID DATA->'G4-VEND'
4. G4 issues the BEGIN SESSION command to the MDB interface.

The result sting will return:
STX+[OK-B]+ETX+LRC
The G4 must have the MDB state set to 'E' for ENABLED in order to start a session. If a session cannot be started the result string will return:
STX+[UNABLE-B]+ETX+LRC @<esc>A+STX+[ID DATA Up to 30 bytes]+ETX+LRC-START A DIAL-A-VEND SESSION. Provided the G4 VEND ACTIVE 'ON' mode is set, the G4 will start a vend session. The sequence to starting a vend session include:
1. G4 finds the next available blank transaction record
2. G4 loads the default data into the transaction record
3. G4 loads as the CARD DATA/ID DATA the '[DV-]+[ID DATA Up to 30 bytes]' sent as part of the command.
4. G4 issues the BEGIN SESSION command to the MDB interface.

The result sting will return:
STX+[OK-A]+ETX+LRC
The G4 must have the MDB state set to 'E' for ENABLED in order to start a dial-a-vend vending transaction. A new vending transaction cannot be started while in a vending transaction. If a dial-a-vend command cannot execute the result string will return:
STX+[UNABLE-A]+ETX+LRC
If the LRC character does not match, or the correct ETX+LRC combination does not occur at all or in a timely fashion the result string will return:
STX+[NAK-A]+ETX+LRC @<esc>L-REQUEST USALIVE SETTING DATA. The G4 will return a string of USALive setting data. USALive setting data can be referred to as system 500 terminal management data. USALive can be referred to as the host network center 808. The USALive setting data includes terminal configuration, setting, and parameter data maintained on the USALive network and passed to the terminal each time the terminal communicates to the USALive network. Changes to the data are managed on the server. The result sting will return:
STX+[START-]+[USALIVE SETTING DATA]+[-END]+ETX+LRC @<esc>3-TOGGLE DEX CODE CAPTURE MODE (FULL FORMAT). The DEX controller/G4 will return the result string below toggling between 'ON' and 'OFF' of the DEX CODE CAPTURE mode. This command is for diagnostic purposes only and should not be used during normal G4 operation. The intended purpose for this command is to diagnosis DEX related transaction issues during development and or testing. The @<esc>3 command obtains DEX data in a free format capturing the handshake and protocol exchanges (ACK, NAK, DLE, etc.) in addition to the DEX data. At the conclusion of the DEX data transfer the DEX CAPTURE MODE is automatically toggled 'OFF'. In most cases there will be no need to execute a second @<esc>3 command to toggle the DEX modem 'OFF'.
STX+[ON-I]+ETX+LRC->When toggling into the DEX code capture mode
STX+[OFF-I]+ETX+LRC->When toggling out of the DEX code capture mode
When the DEX code capture mode is switched to the 'ON' mode the following sequence of events begins:
1. The NOVRAM memory dedicated to the storage of DEX data is cleared.
2. The G4 will begin recording both the received DEX codes from the vending machine controller (VMC) and the sent DEX codes from the G4. There is RAM room for approximately 6K bytes of recorded DEX data.

When the DEX code capture mode is switched to the 'OFF' mode or automatically switches to the 'OFF' mode at the end of the DEX transfer the G4 will stop recording the DEX bus codes. A buffer dump of the DEX codes exchanged between the G4 and the VMC can be viewed by executing the @<esc>5 the DEX CAPTURED CODE BUFFER DUMP command.

Default: The default condition on microcontroller reset is 'OFF'

@<esc>4-TOGGLE DEX CODE CAPTURE MODE (PARSED FORMAT). The DEX controller/G4 will return the result string below toggling between 'ON' and 'OFF' of the DEX CODE CAPTURE mode. This command is for diagnostic purposes only and should not be used during normal G4 operation. The intended purpose for this command is to diagnosis DEX related transaction issues during development and or testing. The @<esc>4 command obtains DEX data in a parsed, pure format (free from all handshake and protocol exchanges (ACK, NAK, DLE, etc.). At the conclusion of the DEX data transfer the DEX CAPTURE MODE is automatically toggled 'OFF'. In most cases there will be no need to execute a second @<esc>4 command to toggle the DEX modem 'OFF'.

STX+[ON-I]+ETX+LRC->When toggling into the DEX code capture mode

STX+[OFF-I]+ETX+ILRC->When toggling out of the DEX code capture mode

When the DEX code capture mode is switched to the 'ON' mode the following sequence of events begins:

1. The NOVRAM memory dedicated to the storage of DEX data is cleared.
2. The G4 will begin recording both the received DEX codes from the vending machine controller (VMC) and the sent DEX codes from the G4. There is RAM room for approximately 6K bytes of recorded DEX data.

When the DEX code capture mode is switched to the 'OFF' mode or automatically switches to the 'OFF' mode at the end of the DEX transfer the G4 will stop recording the DEX bus codes. A buffer dump of the DEX codes exchanged between the G4 and the VMC can be viewed by executing the @<esc>5 the DEX CAPTURED CODE BUFFER DUMP command.

Default: The default condition on microcontroller reset is 'OFF'.

@<esc>5-DEX CAPTURE MODE BUFFER DUMP. The DEX controller/G4 will return the result string below dumping the DEX codes passed between the G4 and the vending machine controller (VMC). The output will be formatted to indicate the codes transmitted by the VMC and the G4. This command is for diagnostic purposes only aid should not be used during normal G4 operation. The intended purpose for this command is to diagnosis DEX related transaction issues during development and or testing.

STX+[DEX]+->Header

[VMC-]+VMC transmitted data->Data transmitted by the VMC

[G4-]+G4 transmitted data->Data transmitted by the G4

. . .

ETX+LRC

If DEX data is obtained with the @<esc>3 command the DEX data will be parsed to remove all handshake data and VMC/G4 protocol passing. The DEX data will be pure and presented in ASCII format. If the DEX data is obtained with the @<esc>4 command the DEX data will include all the handshaking data and VMC/G4 protocol passes (ACK, NAK, DLE, etc.). The DEX data will be presented in ASCII HEX format.

AAA—END SESSION AND PRINT RECEIPT. A session started when the G4 is in the VEND ACTIVE 'ON' mode is terminated and a receipt optionally printed by send a string of 'AAA . . . '. The correct use of this command should be to send a string of at least six 'A' characters. Though the G4 is only looking for a combination of three consecutive 'A''s sending more is preferred.

G4 TEXT DISPLAY PROMPTS

Text Display Overview

When the G4 is in the VERBOSE 'ON' mode will send text messages out of the serial port to a display device. The display device can be the computing platform. The text messages correspond to the activity of the G4. For example, when the G4 is ready to accept cards a text prompt message of 'Please Swipe', 'A Valid Card' may be displayed.

To simplify the interface and functionality requirements of the computing platform the text prompts from tie G4 can be captured and displayed on the computing platforms display. Doing so alleviates the need for the computing platform to ascertain and or determine what message should be displayed to the user. In addition, allowing the G4 to manage the vending transaction, MDB interface, and text prompts removes the need for the computing platform to get involved in the vending transaction.

The text format display protocol below illustrates how the G4 sends text prompts. The selection of the control characters is consistent with the operating functionality of many text LCD displays.

Communication Interface

Shown below is an external view of the G4. The Display Port provides the interconnectivity to external devices and computing platforms for the purpose of control as outlined above and for display control as outlined in this section and its subsections.

The Display Port is a DB-9 pin male connector. As shown below the port is a hybrid serial port with power tap for low current external devices.

Connector Pin Out

| PIN # | PIN ID | DESCRIPTION |
|---|---|---|
| Pin 1 | Not Used | |
| Pin 2 | Rxd | Receive Input To G4 |
| Pin 3 | Txd | Transmit Output From G4 |
| Pin 4 | Not Used | |
| Pin 5 | GND | |
| Pin 6 | +5VDC | Power 300 ma Max. |
| Pin 7 | CTS | Clear To Send Input To G4 |
| Pin 8 | RTS | Request To Send Output From G4 |
| Pin 9 | Optional + Vprinter | With Additional Power Supply |

The communication pins Rxd, Txd, CTS, and RTS conform to RS232 standards. A minimum of Rxd, Txd, and GND are required to implement serial communication between the G4 and a computing platform. The RTS and CTS lines only come into play from a flow control perspective when receipt data is being sent from the G4. CTS and RTS are implemented in such a way as to allow a receipt printer that has little to no printer buffer to control the flow of data. CTS and RTS have no other purpose in non-print data communications and can be ignored or left unimplemented.

Display and Control Codes

The G4 will send a series of display and control codes to indicate when screen initializing and format could occur. In interpreting the display and control codes the computing device will know when to blank the display area and as appropriate when and where to locate cursor positions.

The display and control codes are sent from the G4 as a string of hex characters. The table of display control codes is as follows:

Table of Display Control Codes

| DISPLAY CONTROL CODES | DESCRIPTION |
|---|---|
| $FE + $FE + $FE | Beep Beeper |
| $FD + $FD + $FD | Indicates print data is to follow (start print data) |
| $FC + $FC + $FC | Indicates print data is concluded (end print data) |
| $FB + $FB + $FB | Indicates a transaction is active - used to start a LED or set a status indicator to reflect a transaction is active. This command can be used to indicate to a user to press an 'END' button to end vend session. |
| $FA + $FA + $FA | Indicates a transaction is NOT active. If a LED or status indicator is 'ON' resultant from the above $FB command this command should be interrupted as negating the $FB command. |

Table of Display Control Codes

| DISPLAY CONTROL CODES | DESCRIPTION |
|---|---|
| $F9 + $F9 + $F9 | Clear display area. If a text LCD is being used this command could indicate when a display initialization process could be started. Such a process has the effect of initializing the LCD and clearing the display area |
| $F7 + $F7 + $F7 | Indicates a transaction is ready to be started. Such is the case when the MDB interface indicates the G4 is ENABLED to conduct a vend, and the G4 is ready to start a transaction. This command can be used to indicate to a user by way of LED or status indicator |

-continued

Table of Display Control Codes

| DISPLAY CONTROL CODES | DESCRIPTION |
|---|---|
| | that the G4 is ready to accept command and or magnetic card to start a vending transaction. |
| $F6 + $F6 + $F6 | Indicates the G4 is not ready to start a vending transaction. If a LED or status indicator is 'ON' resultant from the above $F7 command this command should be interrupted as negating the $F7 command. |

Text Prompt Format

The G4 supplies text prompts in a fixed format. The format supports two lines of text each line being a maximum of 16 characters. The format includes a leading character, which indicates the line (line 1 or 2) the text should be displayed on, up to 16 characters of text to be displayed, and a trailing character to indicate the end of the text message. When possible the text message should be formatted to contain 16 bytes. Leading spaces and trailing spaces can be us;ed to position the text message and format the text string to 16 bytes.

The leading character conforms to the format supported by many text LCD display modules. The leading character will be a hex $80 to indicate the text message should be displayed on line 1 of the display area. A hex $C0 will indicate the text message should be displayed on line 2 of the display area.

The trailing character will be a hex $F8. The trailing character indicates the end of the text message.

Text message format:
 Lead Character=$80-Line 1
  $C0-Line 2
 Trailing Character=$F8
 [Lead Character]+[Up to 16 bytes of text message]+ [Trailing Character]

Example:
 $80+[ Swipe A Valid ]+$F8
 $C0+[ Credit Card ]+$F8

The above will display 'Swipe a Valid' on line 1 of the display area, and 'Credit Card' on line 2 of the display area.

Cursor Display Codes

The G4 uses a series of display codes to locate the position of the cursor. There are a maximum of 32 cursor positions-two rows of 16 characters. In addition there are cursor display codes to turn 'ON' a flashing cursor, turn 'ON' an underline cursor (show cursor), and to turn 'OFF' the cursor (hide cursor). The codes are similar to those used for typical text LCD displays.

To locate the cursor in the display area the table below illustrates the hex code and corresponding cursor location.

| | Column 1 ←  →  Column 16 |||||||||||||||| 
|---|---|---|---|---|---|---|---|---|---|---|---|---|---|---|---|---|
| Row 1 | $80 | $81 | $82 | $83 | $84 | $85 | $86 | $87 | $88 | $89 | $8A | $8B | $8C | $8D | $8E | $8F |
| Row 2 | $C0 | $C1 | $C2 | $C3 | $C4 | $C5 | $C6 | $C7 | $C8 | $C9 | $CA | $CB | $CC | $CD | $CE | $CF |

As an example, if a hex $82 is received from the G4 this would indicate the cursor location is on ROW 1, COLUMN 3.

This 'ON'/'OFF' control corresponds to the view ability and style of the cursor. An 'ON' setting makes the cursor viewable, an 'OFF' setting makes the cursor invisible. The table below shows the various cursor control codes.

Cursor Control Codes

| CURSOR TYPE | CONTROL | HEX CODE |
|---|---|---|
| Show Cursor | ON | Hex $0E |
| Hide Cursor | OFF | Hex $0C |
| Cursor Flash | ON | Hex $0D |

Figure 6A:
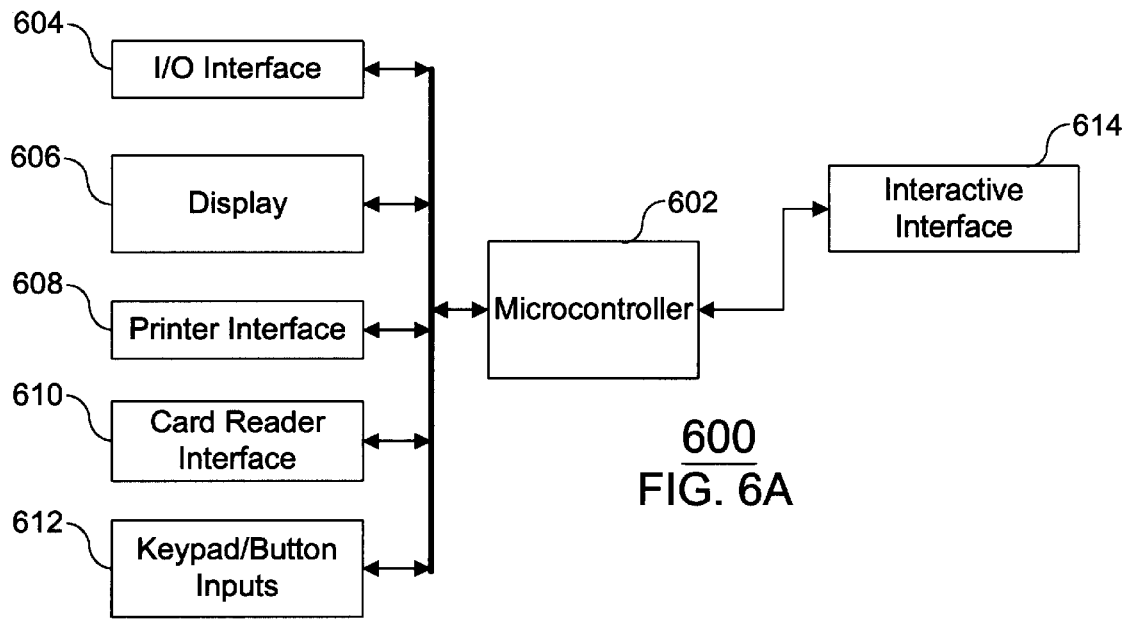
FIG. 6A there is shown card reader and user interface system 600.

Referring to FIG. 6A there is shown a card reader and user interface system 600. The card reader and user interface system 600 can be manufactured into a card reader processor interface board 312 and as shown in FIG. 3B fastened to the card reader assembly. In an exemplary embodiment system 600 is a computing platform that interconnects with system 500's interactive interface 532. In this regard the credit card and user interface 600 provide a user with user interface and display means for transacting a cashless transaction.

Interconnected with microcontroller 602 can be an input and output (I/O) interface 604. I/O interface 604 can be a plurality of data communication lines and or a plurality of communication ports such as RS232, RS485, or other similar I/O interfacing configurations. In an exemplary embodiment I/O interface 604 can be used to implement electrical interface connections to other peripheral devices. Microcontroller 602 can be any suitable microcontroller, or microprocessor. In an exemplary embodiment a microcontroller 602 can be a MICROCHIP PIC16F876-20/SP or PIC16C76-20/SP.

Interconnected with microcontroller 602 can be a display 606. Display 606 can provide message prompts and other visual information to a user. Display 606 can be any suitable display, LCD display, or flat panel display. In an exemplary embodiment a display 606 can be an OPTREX DMC-16202-NY-LY or a 16×2 line LCD character display.

A printer interface 608 can be interconnected with microcontroller 602. A printer interface 608 can be a serial communication style or Centronic style interface. In an exemplary embodiment printer interface 608 can be utilized to print receipts, coupons, and other print data.

Interconnected with microcontroller 602 can be a card reader interface 610. Card reader interface 610 can support a variety of card reader interfaces and protocols including for example and not limitation bit strobe type of card readers. Bit strobe type of card readers read predefined tracks of data from a magnetic card. To read track data the card reader can incorporate a plurality of DATA lines and DATA CLOCK lines to transfer magnetic card data. Card reader interface 610 can also support serial communications style card readers. Serial communication style card reader can incorporate TRANSMIT, RECEIVE, CLEAR TO SEND, REQUEST TO SEND control lines to transfer card data to system 500 via data communication between the interactive interfaces 532 and 614. Such magnetic card readers can include those manufactured for or by XICO, MAGTEK, NEURON, or other similar or suitable card reader.

Interconnected with microcontroller 602 can be a plurality of keypad and button inputs 612. Push button switch 308 can be electrically interconnected with button inputs 612.

An interactive interface 614 can be interconnected to microcontroller 602. The interactive interface 614 operates in similar form and function to interactive interface 532.

Figure 6B:
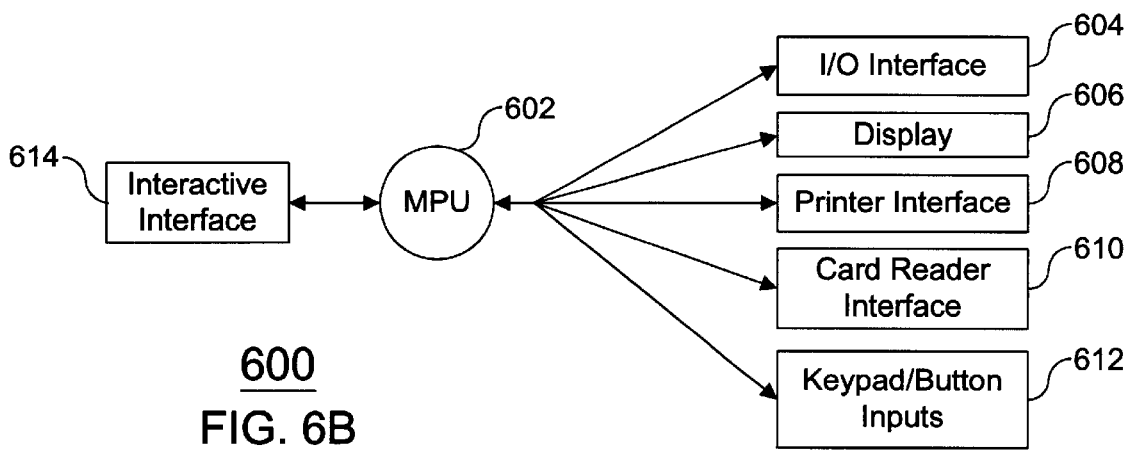
FIG. 6B there is shown a card reader and user interface system 600 data communication routing switch.

Referring to FIG. 6B there is shown a card reader and user interface system 600 data communication routing switch. In an exemplary embodiment system 600 is manufactured onto the card reader and user interface board 312. Furthermore, system 500 is manufactured into VIU 100. The card reader assembly and optional printer assembly are then installed into vending equipment in such a way as to allow user access to the front faceplate 302 of the card reader assembly. Since in many cases there is little room in the vending equipment door area it is more convenient to mount the VIU 100 assembly in a different location within the vending equipment. In order to facilitate correct operation of the card reader assembly it must be electrically connected to the VIU 100. To minimize the number of electrical connection to a single cable connected between the systems 500 and 600 a cable connection between interactive interfaces 532 and 614 can be implemented.

To utilize a single data communication line (transmit line and receive line) a plurality of different types of data need to be combined into a single data stream. To effectuate the combination of data into a single data stream the interactive interface communication protocol shown in the table above can be employed. To decode the data stream and route the data to its correct destination device the data communication routing switch in FIG. 6B can be implemented.

Referring to FIG. 6B there is shown an interactive interface 614 interconnected with microcontroller 602. Microcontroller 602 receives the data communication stream from the system 500's interactive interface 532 and by way of the interactive interface protocol shown in the table above decodes and routes the data to the appropriate peripheral devices. Peripheral devices shown include I/O interface 604, display 606, printer interface 608, card reader interface 610, and keypad and button inputs 612.

For example and not limitation print data can be packaged with the format and control codes outlined in the interactive interface protocol and specification shown in the table above. Upon the data arriving at microcontroller 602, microcontroller 602 can decode that the data is print data, remove any protocol formatting characters to obtain pure print data, and then pass or forward the data to the printer interface 608. Similar processes can occur for the other peripheral devices including I/O interface 604, display 606, and card reader interface 610, and keypad and button inputs 612. Data can also [n]be obtained from each of the peripheral devices and combined into a single data string. The data string can be sent to the system 500 where processing can occur based in part of the data string received.

Figure 7:
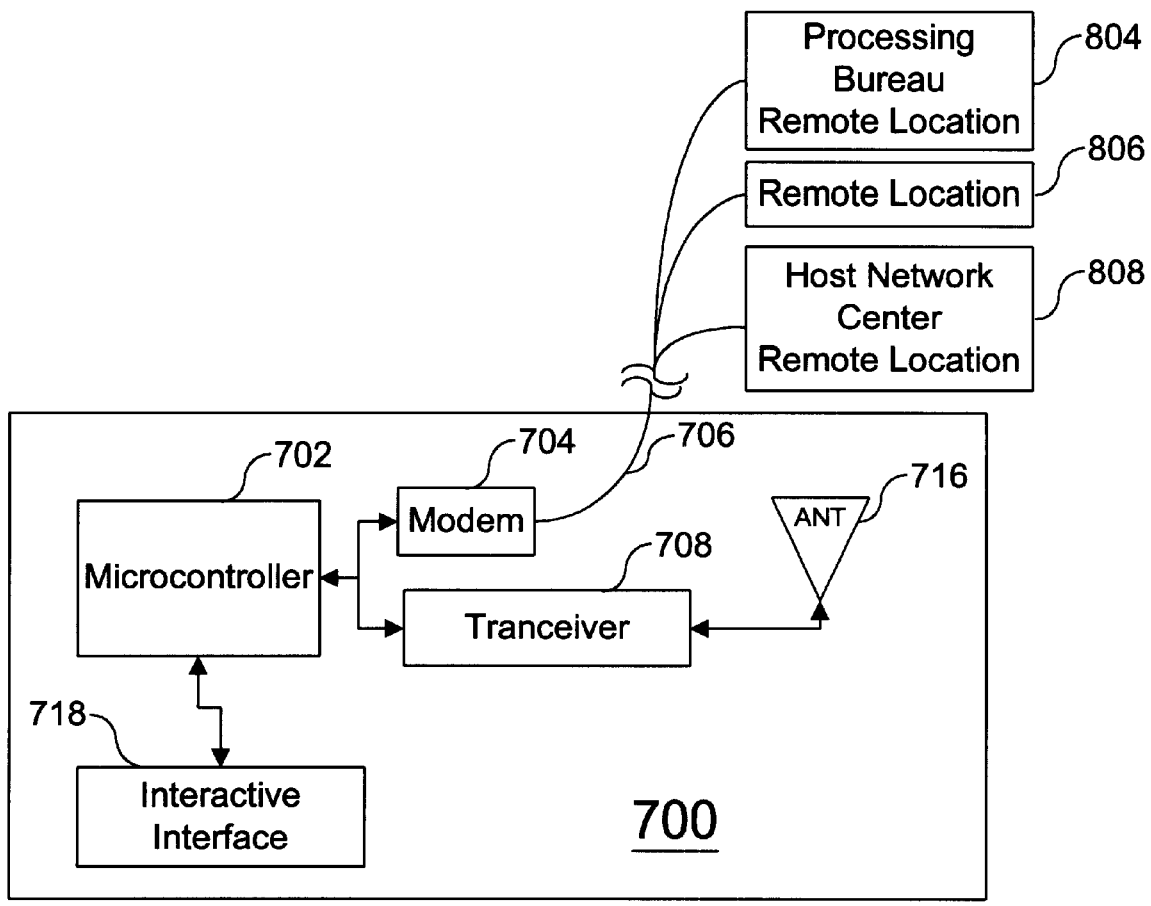
FIG. 7 there is shown a transceiver and modem base unit system 700 and a plurality of remote locations.

Referring to FIG. 7 there is shown a transceiver and modem base unit system 700 and a plurality of remote locations 804, 806, 808. One aspect of equipping vending equipment with a VIU 100 and or a card reader assembly and optional printer assembly is that the VIU 100 devices requires a data communication connection with a plurality of remote locations. In many vending equipment locations it can difficult to connect the VIU 100 to a physical communication line. When connecting the VIU 100 to a physical communication is difficult or undesirable the use of the transceiver and modem base unit 700 can be a better data communication option. A transceiver and modem base unit 700 can be referred to as a transceiver unit 700. Transceiver unit 700 in incorporated into transceiver and modem base unit 200.

In an exemplary embodiment the transceiver unit 700 forms a wireless data link with a VIU 100 having a system 500 incorporated within. In this regard, the requirement of physically connecting the VIU 100 to a communication line can be eliminated. To create a wireless data line the VIU 100 equipped with an audit-credit-interactive system 500 utilizes transceiver 524 to data communicate with transceiver unit 700's transceiver 708. Transceiver 708 is interconnected with microcontroller 702. An antenna 716 is interconnected with transceiver 708. Antenna 716 can be of similar form and function to antenna 538.

Microcontroller 702 receives and decodes data packet information. Data packets can include command data for configuring the transceiver unit 700 and or data intended to be passed or forwarded to a plurality of remote locations by way of modem 704. Microcontroller 702 can be interconnected with modem 704.

A plurality of remote locations can include credit bureaus such as processing bureau 804, host network centers such a host network center 808, and other remote locations such as remote location 806. Processing bureau 804, host network center 808, and remote location 806 can be referred to as a plurality of remote locations or remote locations. Processing bureau 804 can be a credit card processing bureau.

Microcontroller 702 can be any suitable microcontroller, or microprocessor. In an exemplary embodiment a microcontroller 702 can be a MICROCHIP PIC16F876-20/SP or PIC16C76-20/SP. Modem 704 can be similar in form and function to modem 522. Transceiver 708 can be similar in form and function to transceiver 524.

Figure 8:
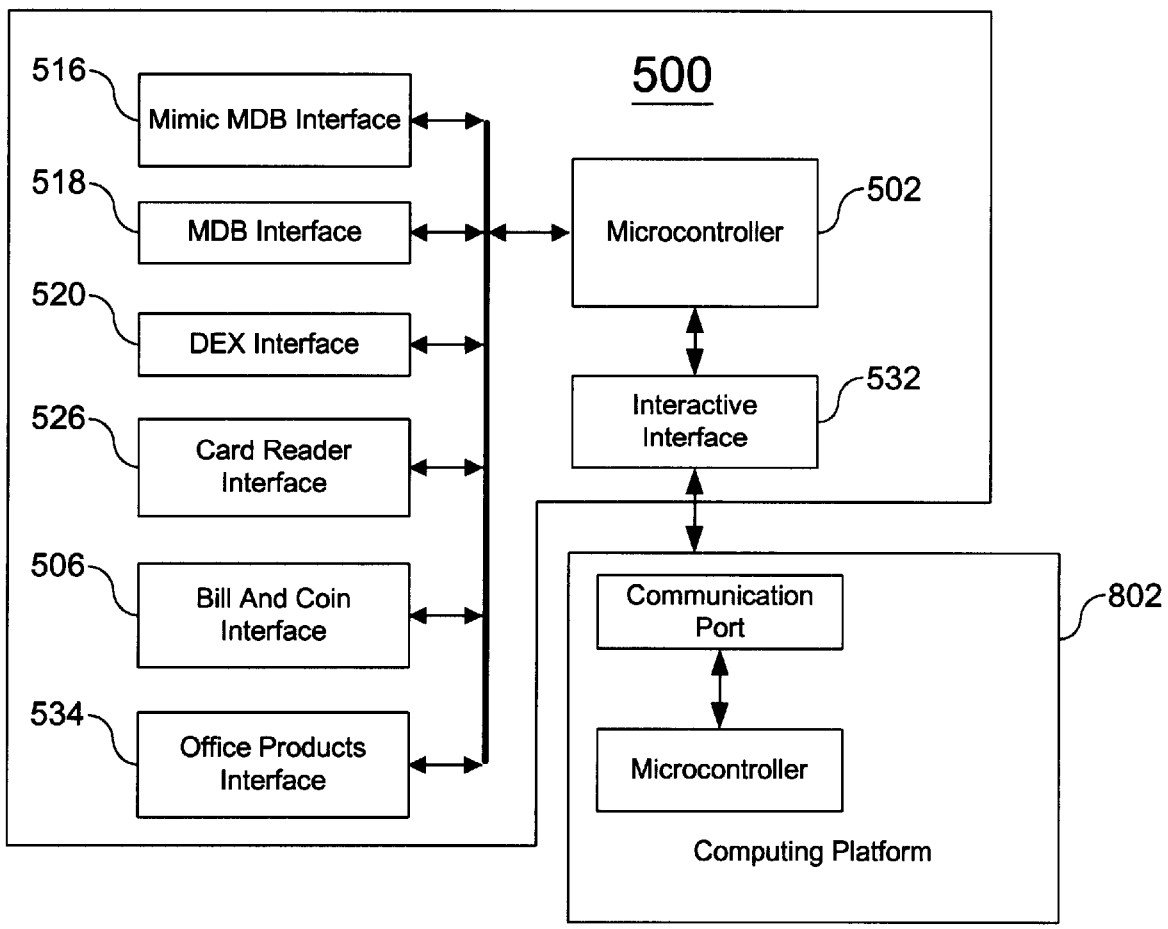
FIG. 8 there is shown an audit-credit-interactive system 500 interfaced to a computing platform.

Referring to FIG. 8 there is shown an audit-credit-interactive system 500 interfaced to a computing platform. FIG. 8 illustrates how a audit-credit-interactive system 500 can be connected to a computing platform 802 by way of system 500's interactive interface 532 and computing platform 802 interactive interface. In similar form and function as 1he interactive interface solution between system 500 and system 600 described above, system 500 and computing platform 802 can interconnect and data communicate as described with the communication specification and protocol shown in the table above.

There can be at least two method of interconnecting a system 500's interactive interface 532 to a computing platform 802. In the first method the system 500 and the computing platform 802 can be mutually exclusive devices that share a data cable connection between the interactive interfaces. In this regard the system 500 could be manufactured separate film the computing platform 802 and later during installation interconnected together with a data cable connection between the interactive interface ports.

This method allows maximum flexibility in the selection of the computing platform 802's form and functional features as well as allowing maximum flexibility in the selection of the system 500's form and functional features.

A second method of interconnecting a system 500's interactive interface 532 to a computing platform 802's interactive interface can be to integrate the system 500 and computing platform 802 into a single circuit design, preferably manufactured into a single circuit board device. In this regard the VIU 100 could comprise an integrated system 500 and computing platform 802 combined. This method of interconnectivity can be desirable, for example and not limitation, when mass-produced VIU 100's with a computing platform option is required, and where cost, unit size, and or ease of installation and service are considerations.

Figure 9A:
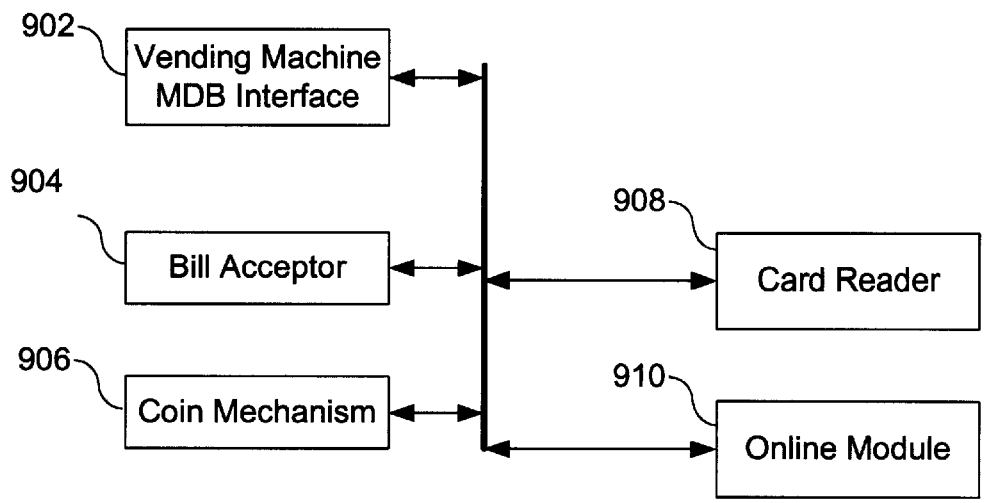
FIG. 9A there is shown a vending machine MDB interface with a plurality of peripheral devices.

Referring to FIG. 9A there is shown a vending machine MULTI-DROP-BUS interface with a plurality of peripheral devices interconnected thereto. In typical vending equipment that operates with a VMC having a vending machine MDB interface 902 that supports the NAMA MDB specification, peripheral device can be interconnected to the vending equipment's common MDB bus. Once the peripherals are connected to the MDB bus the VMC is designated to operate as the master device and each of the peripheral devices are designated as slave peripheral devices. Such slave peripheral devices can include bill acceptor 904, coin mechanism 906, card reader 908, and online module 910. Bill acceptor 904 and coin mechanism 906 can be of a type for example and not limitation manufactured for or by MARS, COINCO, CONLUX, or other similar bill acceptor and coin mechanism type or manufacturer. Card reader 908 can be of a type for example and not limitation manufactured by or for USA TECHNOLOGIES, MARS, MARCONI, DEBITEK, SCHLUMBERGH, ACT, COINCO, or other similar card reader type. Online module can be of a type for example and not limitation manufacture for or by USA TECHNOLOGIES, MARCONI, MARS, COINCO, or other similar online module type.

A limitation on peripheral devices can be that they must support a compatible version of the MDB protocol specification to operate correctly. This requirement of having to support the version of MDB protocol the VMC supports can limit the selection of compatible peripheral devices as well as limit the range of functionality of the peripheral devices.

For example and not limitation if the VMC MDB protocol version does not support obtaining audit information from a peripheral device the audit information contained within the peripheral device will go unutilized. If in another example the bill acceptor is able to report it's functional operation information and the VMC does not support a MDB protocol version to obtain this information the data in the bill acceptor will not be retrieved and the benefits of having such informational data will not be realized.

Figure 9B:
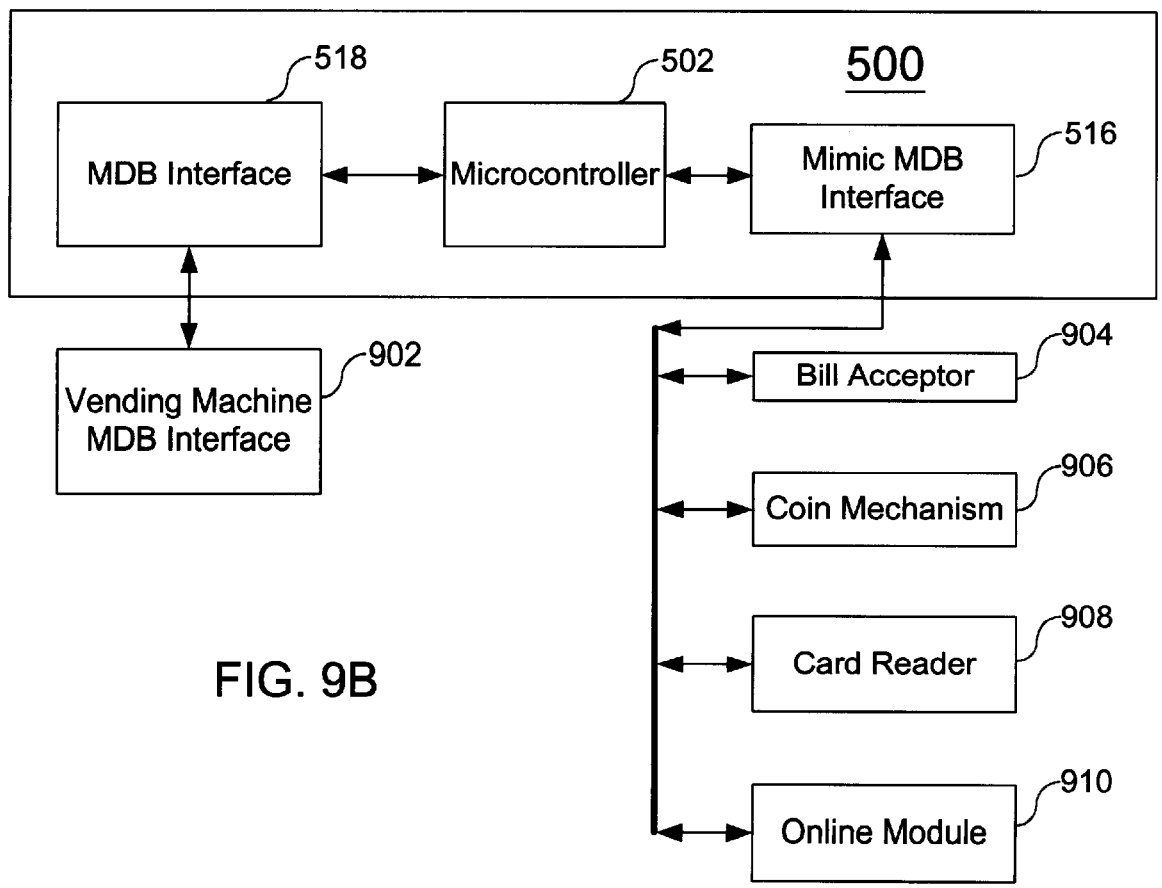
FIG. 9B there is shown an audit-credit-interactive system 500 interfacing to a vending machine MDB bus and interfacing to a plurality of peripheral devices by way of a system 500 mimic MDB bus.

FIG. 9B illustrates how an audit-credit-interactive system 500 can be configured in series with the vending machine MDB interface 902. In this regard the peripheral devices can be supported by the system 500's mimic MDB interface 516. The advantage off this network configuration is that the system 500 can support multiple versions and derivative versions to the NAMA MDB protocol specification. Furthermore, the system 500 can provide peripheral message emulation and message passing to effectuate the VMC's ability to data communicate to each peripheral by way of the system 500's MDB interface 518 and mimic MDB interface 516.

In an exemplary embodiment the VMC can data communicate with each peripheral device at the MDB version level of the VMC. In addition, system 500 can data communicate with the VMC and each peripheral device at the VMC version level and each peripheral MDB version or derivative version level. In this regard features supported by a peripheral device's MDB version or derivative MDB version can be utilized. In addition, data communication between the system 500 and each peripheral device effectuates the ability to remotely monitor and manage each peripheral. In this type of peripheral support system 500 servers as a data communication gateway for each peripheral device. System 500 ability to data communicate with a plurality of remote location and with each peripheral device effectuates the ability of each peripheral device to data communicate with a plurality of remote locations.

Referring to FIG. 9B there is shown a system 500's MDB interface 518 interconnected with the VMC vending machine interface 902. In this relationship the system 500 can support the version of MDB protocol that the VMC firmware supports. Each of the peripheral devices including bill acceptor 904, coin mechanism 906, card reader 908, and online module 910 can then be interconnected with the system 500's mimic MDB interface 516. In this regard the system 500 can support any number of NAMA MDB protocol versions and or derivative versions of the NAMA MDB protocol.

For example and not limitation if the VMC supports NAMA MDB version 1.0 and an online module 910 supports a derivative version of the NAMA MDB protocol called advanced version 3.0 both the VMC and the online module 910 can be interconnect to a system 500 and operate correctly. In this relationship system 500 by way of MDB interface 518 and mimic MDB interface 516 data communicates with both the VMC and online module 910. The system 500 interrupts and emulates the correct device protocols as to allow the VMC to data communicate with the online module 910. In addition, the system 500 can data communicate with the online module for the purpose of effectuating MDB command messages not supported by the VMC's MDB version. The system 500 can then selectively data communicate, to a plurality of remote locations, data related to the peripheral devices including the online module 910. Furthermore, by way of system 500 the peripheral devices interconnected with the system 500's mimic MDB bus 516 can data communicate with a plurality of remote locations.

Figure 9C:
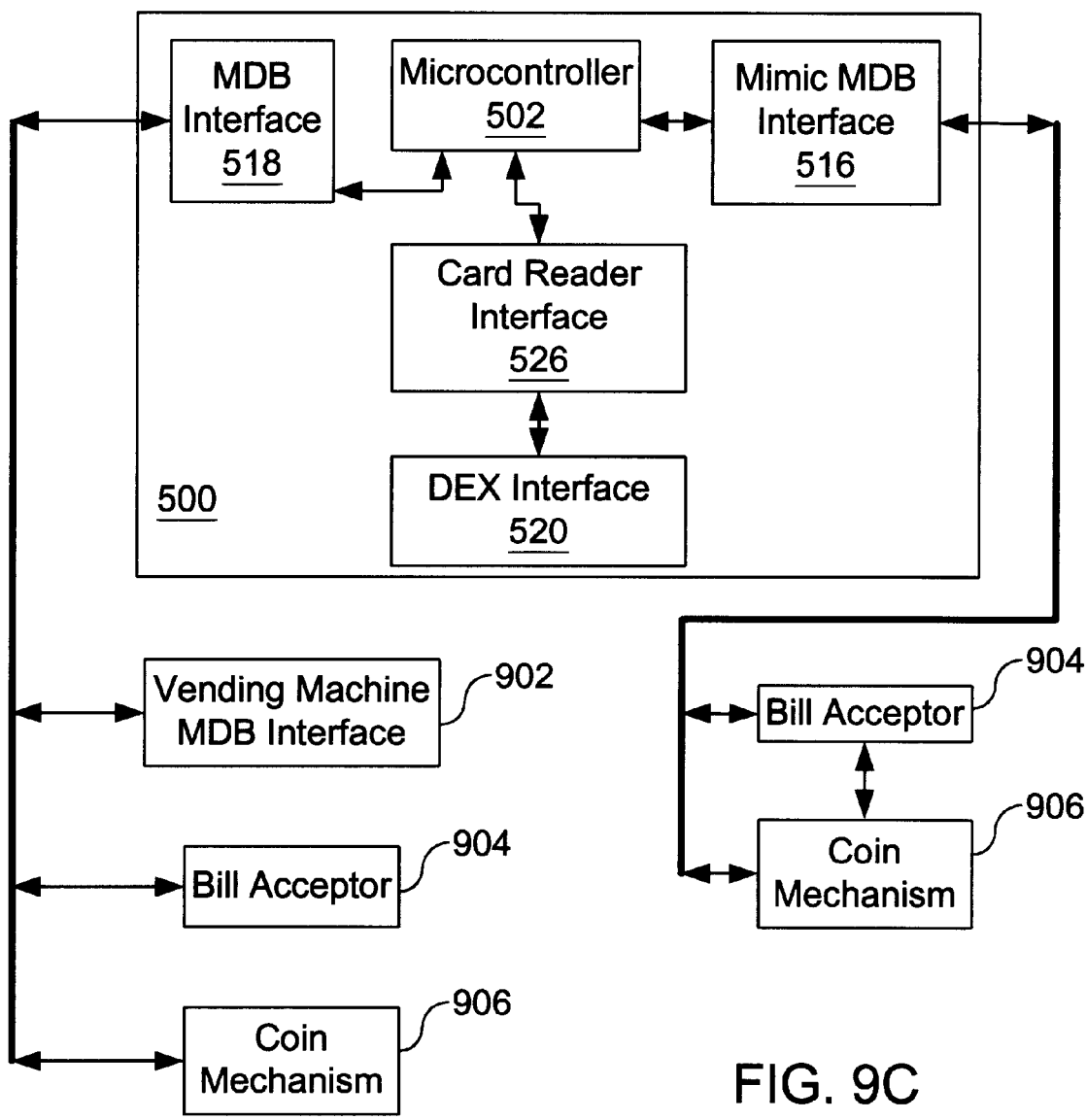
FIG. 9C there is shown an audit-credit-interactive system 500 with card reader and audit functionality embodiment interfacing to a vending machine MDB bus and interfacing to a plurality of peripheral devices by way of a system 500 mimic MDB bus.

Referring to FIG. 9C there is shown a audit-credit-interactive system 500 with card reader and audit functionality embodiment interfacing to a vending machine MDB bus and interfacing to a plurality of peripheral device by way of a audit-credit-interactive system 500 mimic MDB bus. In an exemplary embodiment system 500 combines the functionality of the card reader peripheral and audit or as it is commonly referred to as the online module or telemetry function thus eliminating the need for additional peripheral devices to provide these functions. In addition, the mimic MDB interface 516 can optional support peripheral device,s that are not compatible with the vending equipment's VMC.

FIG. 9C illustrates that with a system 500 interconnected with the vending equipment's MDB interface 902 there is created two alternative bus configurations for the peripheral devices. For example and not limitation the bill acceptor 904, coin mechanism 906, as well as other types of peripheral devices can, based in part on MDB version compatibility, reside on either the vending equipment's MDB interface 902, or the system 500's mimic MDB interface 516.

Figure 10A:
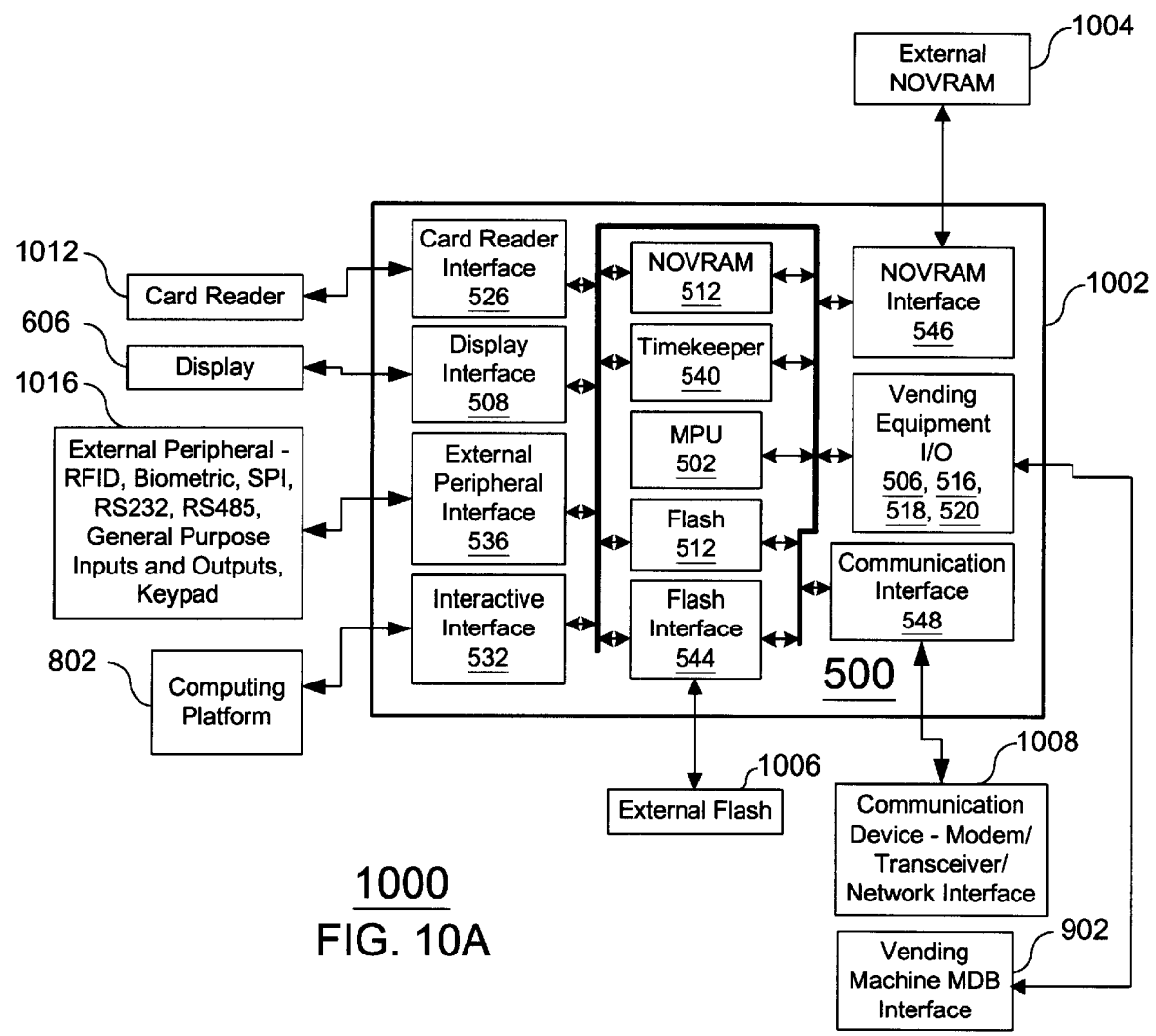
FIGS. 10A–B there is shown an audit-credit-interactive system 500 embodied in a semiconductor package.

Referring to FIG. 10A there is shown an audit-credit-interactive system 500 embodied in a semiconductor package 1002. In an exemplary embodiment a complete system 500 can be manufactured into a single semiconductor. This type of manufacture can have the advantage of small size and low cost. In addition, such a semiconductor version of an audit-credit-interactive system 500 can be advantageous when integration of system 500's functionality into other electronic devices is desirable.

For example and not limitation a bill acceptor, a coin mechanism, or other type of electronic device can have a system 500 embedded into semiconductor 1002 designed into the peripheral device circuitry. In addition to providing system 500 functionality semiconductor 1002 can be soldered or mounted into the peripheral circuit board eliminating the need for additional manufacture and packaging of a system 500.

Figure 10B:
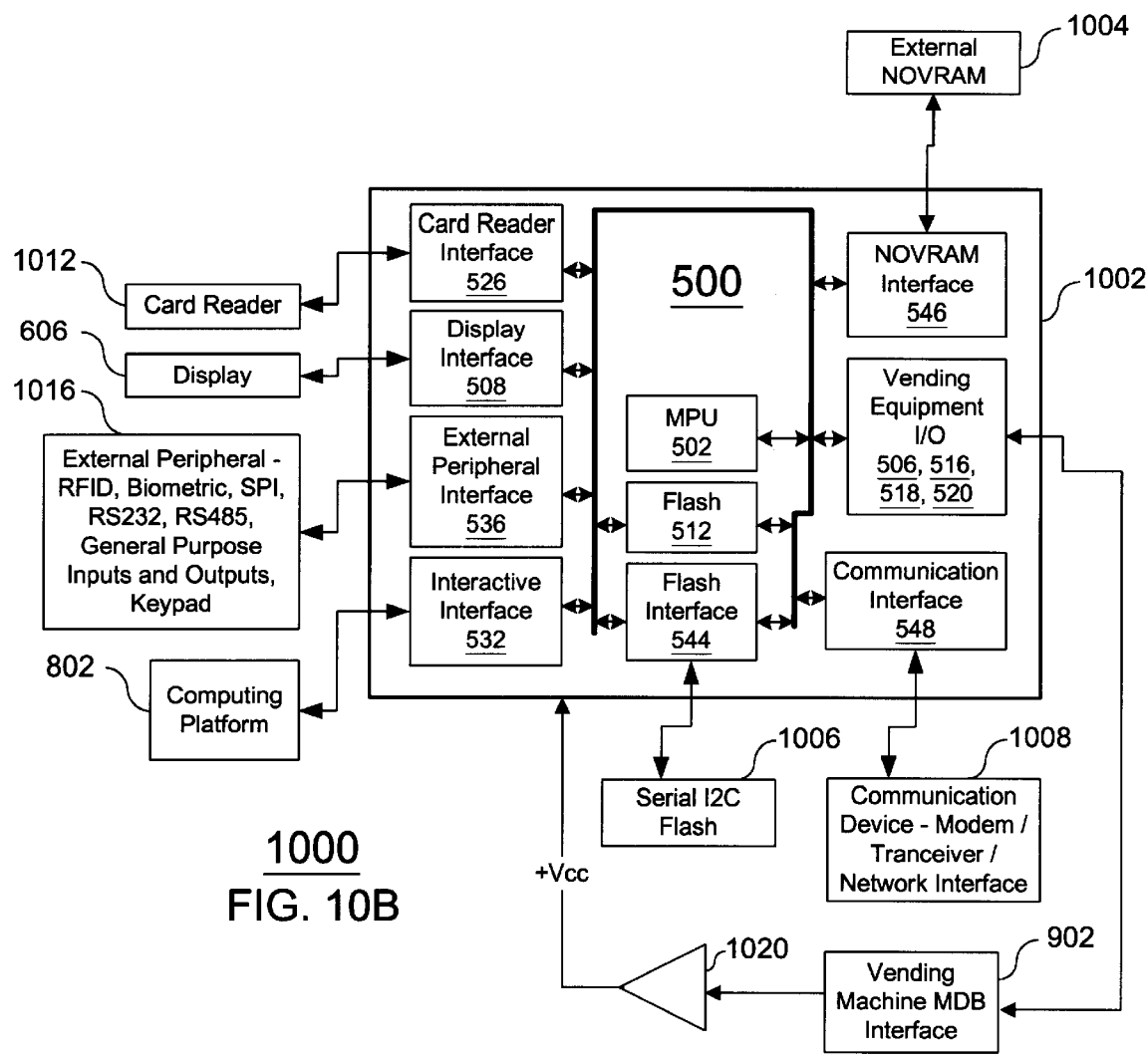

FIGS. 10A–B show a system 500 integrated into semiconductor packaging 1002. Referring to FIG. 10A the system 500 shown includes microcontroller 502 interconnected with card reader interface 526, display interface 508, external peripheral interface 536, interactive interface 532, NOVRAM memory 512, timekeeper 540, flash memory 512, flash memory interface 544, NOVRAM interface 546, communication interface 548, and vending equipment interfaces 506, 516, 518, and 520. Other system 500 features can be included as may be required by the application. In addition, system 500 features shown within semiconductor package 1002 can be eliminated as may be required or desirable based on the application.

Timekeeper 540 can be a real time clock (RTC) for keeping track of date and time functions. Flash interface 544 can be an interface to serial and or I²C electrical erasable read only memory (EEROM) or other flash memory types of devices. NOVRAM interface 546 can be a data connection to an external non-volatile read only memory device such as NOVRAM 1004. NOVRAM 1004 can be of similar form and function as NOVRAM 512.

External interconnections to semiconductor 1002 can include card reader 1012, display 606, external peripheral 1016, computing platform 802, external flash 1006, communication device 1008, interface to vending equipment 1010, and NOVRAM 1004.

Card reader 1012 can be an industry standard bit strobe, and serial style track 1, 2, and 3 card readers. Such card readers include for example and not limitation those manufactured for or by XICO, NEURON, and MAGTEK.

External peripheral 1016 can include RFID readers and writers, biometric devices, common communication ports such as RS232 and RS485, general purpose I/O, keypad, and or other types of peripheral device. External memory 1006 and external memory 1004 can be similar in form and function as memory 512. External communication device 1008 can include a modem, transceiver, network interface, or other type of communication device. Communication device 1008 and communication interface 548 can be similar in form and function to modem 522, transceiver 524, data modem 514, and or network interface 542.

In an exemplary embodiment where possible software executing within semiconductor 1002 can emulate certain system 500 functionality to further reduce the dependence of physical hardware. For example and not limitation the card reader interface may be implemented in software where general purpose I/O lines could be configured to capture card data received from a card reader such as card reader 1012.

Referring to FIG. 10B the system 500 is embedded within semiconductor package 1002. In this embodiment the system 500 relies on software executing in microcontroller 502 to implement and emulate the system 500's functionality. In this embodiment software configures general purpose I/O lines to implement card reader interface 526, display interface 508, external peripheral interface 536, interactive interface 532, NOVRAM interface 546, vending equipment I/O 506, 516, 518, and or 520, and communication interface 548.

One advantage of implementing system 500 in software can be that the system 500 software solution can b, implemented is mass producible generally available microcontroller devices. Such microcontroller devices can include for example and not limitation UBICOM's line of microcontrollers, MOTOROLA, INTEL, MICROCHIP, ZILOG, and other similar or suitable microcontroller or microprocessor devices.

A second advantage of implementing system in software can be that the proprietary nature of the software and its functional capabilities can more easily be concealed and protected when resident and secured within a microcontroller. In addition to the secure ability of the system 500 solutions, implementing a system 500 in a microcontroller brand or series that other design engineers are familiar with can be advantageous in easing the integration of the system 500 semiconductor package 1002 into electrical designs.

Further ease of integration can be achieved by implementing power converter 1020. Power converter 1020 converts input voltage obtained from the vending equipment's MDB bus via the vending machine's MDB interface 902. The output voltage from power converter can be referred to a +VCC and can power the system 500 semiconductor 1002.

One advantage of allowing power convert 1020 to supply power to semiconductor 1002 can be that the semiconductor can be resident on an adapter card and retrofit to existing VMC's by connection to the VMC's MDB interface 902. Through this single connection point the adapter card comprising the semiconductor 1002 can power itself and data communicate with the VMC by way of the VMC MDB interface 902.

Furthermore, the semiconductor 1002 can be integrated into the VMC controller electronics and electrically connected on the circuit board to the VMC MDB interface 902. Simplifying the data and power connections between semiconductor 1002 and the VMC can save time and effort in the integration of the combined VMC/system 500 solution. In addition, the fact that the system 500 can operate mutually exclusive from the VMC can be advantageous in the design of the overall combined VMC/system 500 solution.

Besides combining the system 500 on a chip with a VMC control system the system 500 packaged in semiconductor 1002 can be integrated into a computing platform 802. In this regard the semiconductor 1002 can be integrated into the computing platform 802 electronics and electrically connected by way external peripheral interface 536. In addition, the fact that system 500 can operate mutually exclusive from the computing platform 802 can be advantageous in the design of the overall combined computing platform 802/system 500 solution.

Referring to FIG. 11 there is shown an MDB initialization tuning routine 1100. With the proliferation of different kinds and styles for vending equipment VMC controllers the NAMA MDB and NAMA derivative MDB protocol implementation can vary from VMC to VMC. One of tile most common variations can be interpretation of protocol command functionality, usage, and messaging formatting.

Another source of VMC MDB protocol implementation variations can occur as a result of the VMC computing power and or microprocessor speed or (millions of instructions per second) MIPS capability. Microprocessor speed can influence MDB protocol implementation and message transaction speed in several ways. One such way can be in the MDB interface to the microprocessor.

MDB message transactions are a string of serial bytes. As such bytes must arrive one at a time to the VMC microprocessor. Once a byte arrives it must be fetched from the VMC microprocessor receive buffer and processed. The time required to fetch a byte can vary from VMC to VMC. As such the inter-byte time spacing, which is the amount of time delay inserted between sent bytes could be a critical variable. If for example and not limitation a string of bytes arrive to close together, or in other words the inter-byte time spacing is too short the VMC may not be able to process the bytes and as a result the system 500 could fail to initialize and operate correctly. If for example and not limitation a string of bytes arrive to far apart, or in other words the inter-byte time spacing is too long the VMC may time-out and fail to process the MDB message. As a result the system 500 could fail to initialize and operate correctly.

The MDB protocol involves a master-slave relationship between the master vending equipment's VMC and the slave peripheral devices. In implementing the MDB protocol the master VMC initiates an MDB message command to a slave peripheral device. The slave peripheral device then has a finite amount of time to respond to the VMC command message with a message response. As such the amount of time allotted for the peripheral device to respond with a MDB message response can vary from VMC to VMC. If for example and not limitation the peripheral device responds too quickly with a message response the VMC's microprocessor may not be ready and miss the return message. As a result the system 500 could fail to initialize and operate correctly. If for example and not limitation the peripheral device takes too much time to respond to the message the VMC may time-out waiting for the peripherals response message. As a result the system 500 could fail to initialize and operate correctly.

The MDB initialization tuning routine 1100 determines through successive iterations of the MDB initialization sequence the optimum inter-byte spacing and message response timing. Processing begins in block 1102.

In block 1102 the MDB inter-byte time spacing and the MDB response time are set to a minimum range setting. Processing then moves to block 1104. Appropriate inter-byte time spacing can range from a minimum range of a few microseconds to a maximum range of a several milliseconds. Appropriate message response time also referred to as the response time can range from a minimum range of less than one millisecond to a maximum range of five to ten milliseconds.

In block 1104 the system 500 waits for the VMC to initiate the POLL command. In response to the POLL command the system 500 sends the JUST RESET command. Processing then moves to block 1106.

In block 1106 the system 500 responds to VMC MDB transaction messages with message responses in an attempt to initialize the system 500. Processing then moves to decision block 1108. Initialization of the system 500 occurs by a series of successful VMC and system 500 MDB transaction message exchanges. The system 500 can be considered successfully initialized when the VMC and the system 500 have exchanged configuration messages and the VMC has issued to the system 500 the MDB ENABLE message.

In decision block 1108 a determination is made as to whether the system 500 received the MDB ENABLE command from the VMC and if the system 500's operation state is now enabled. If the resultant is in the affirmative that is the system 500's operation is now ENABLED then the routine is exited. If the resultant is in the negative that is the system 500's operational state is not ENABLED then processing moves to block 1110.

In block 1110 the inter-byte time spacing is incrementally increased and processing moves to decision block 1112.

In decision block 1112 a determination is made as to whether the inter-byte time spacing maximum range has been reached. If the resultant is in the affirmative that is the inter-byte time spacing maximum range has been reached then processing moves to block 1114. If the resultant is in the negative that is the inter-byte time spacing maximum range has not been reached then processing moves to block 1116.

In block 1114 the inter-byte time spacing is set to the initial minimum range setting. In addition, the message response time is incremented. Processing then moves to decision block 1118.

In decision block 1118 a determination is made as to whether the message response time maximum range has been reached. If the resultant is in the affirmative that is the maximum message response time range has been reached then processing moves to block 1116. If the resultant is in the negative that is the maximum message response range has not been reached then processing moves back to block 1104.

In block 1116 a prompt is provided that the MDB communications between the system 500 and the VMC could not be established. The routine is then exited.

Figure 12A:
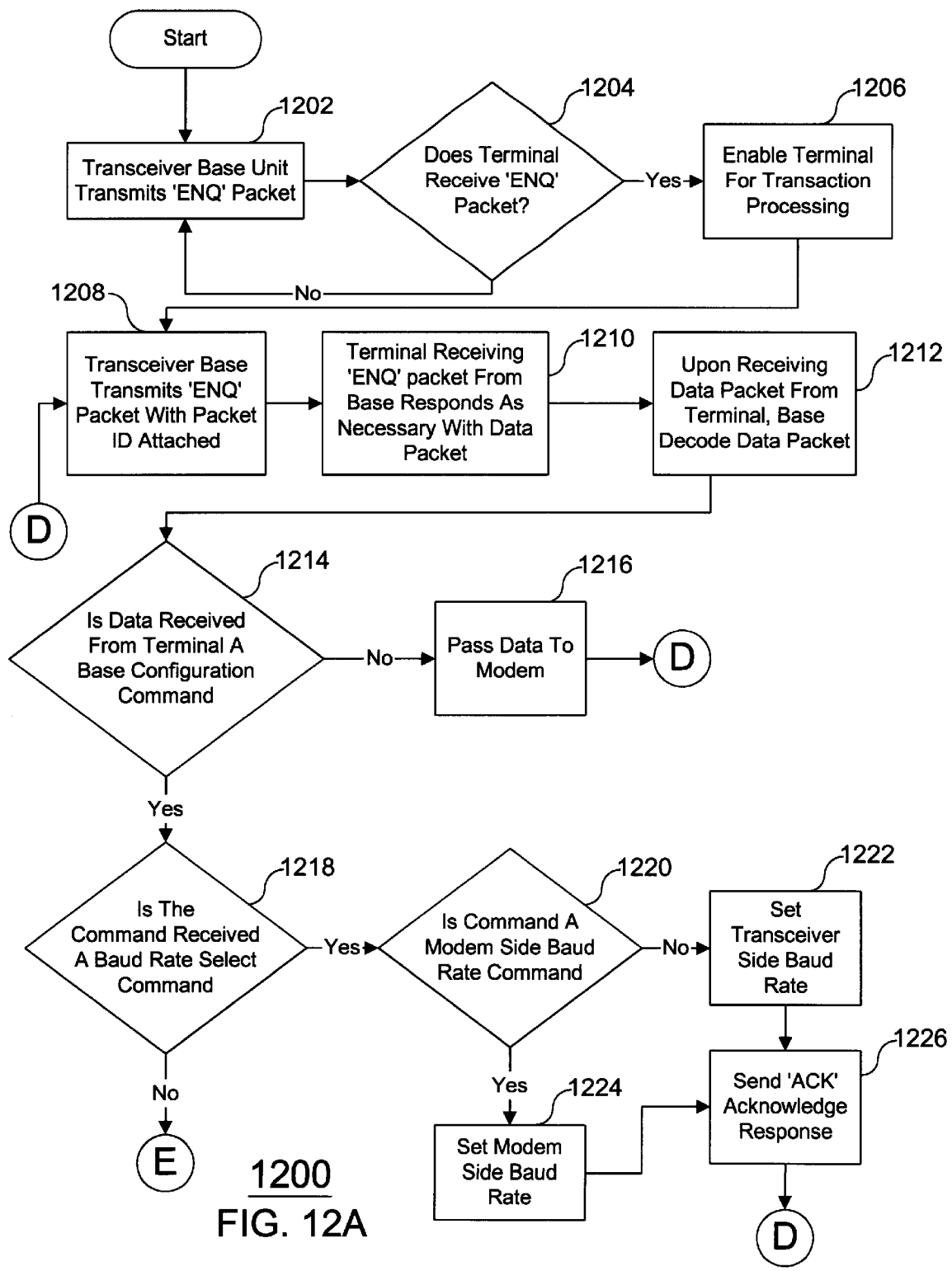
FIGS. 12A–B there is shown a VIU 100 with system 500 and transceiver and modem base unit system 700 wireless protocol data communication routine 1200.
Figure 12B:
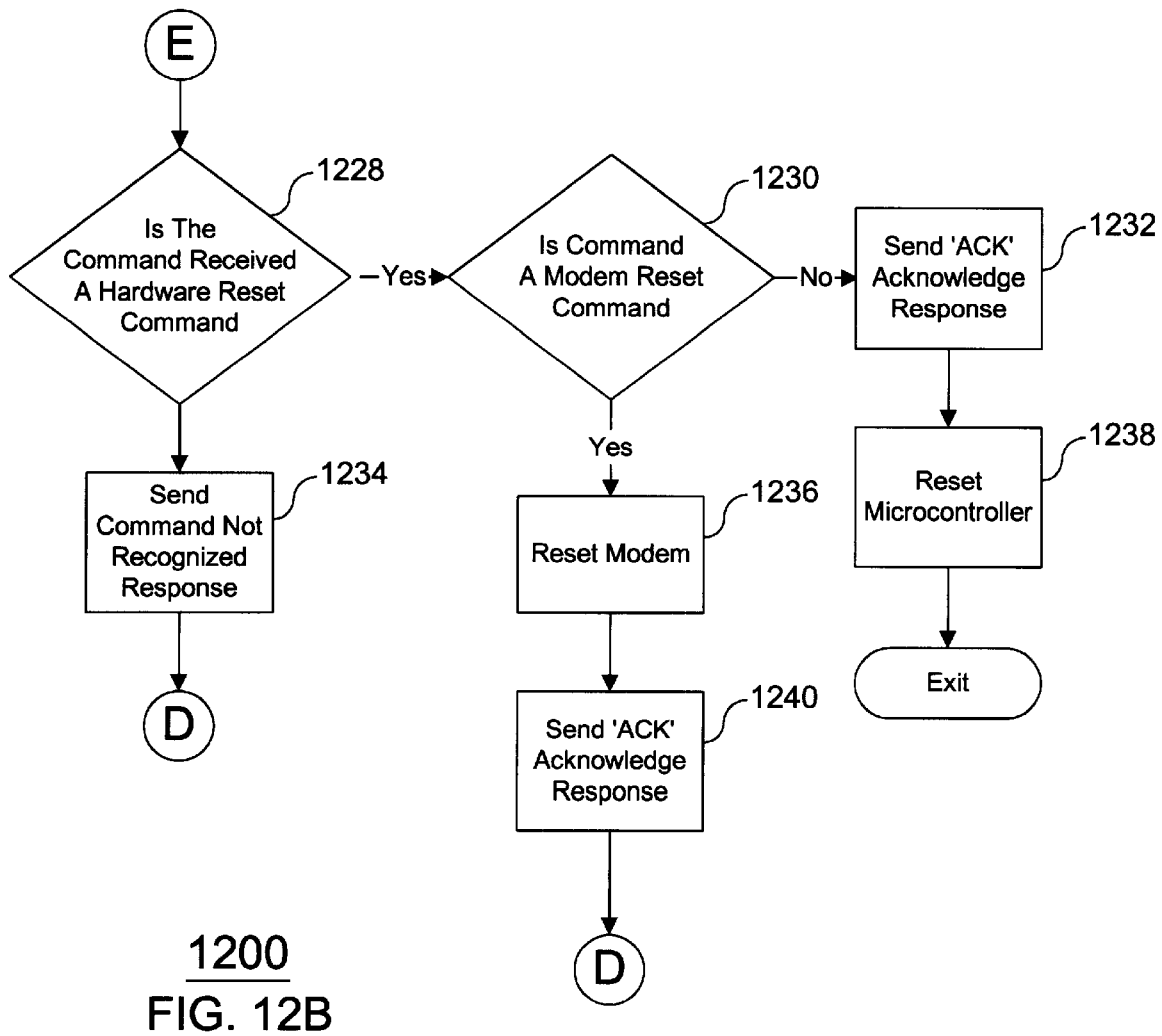

Referring to FIG. 12 there is shown a VIU 100 with system 500 and transceiver and modem base unit system 700 wireless protocol data communication routine 1200. In a typical application involving a VIU 100 comprising audit-credit-interactive system 500 the VIU 100 will be installed in vending equipment. In certain of those installations it may desirable to data communicate wirelessly to a transceiver system 700 instead of trying to hardware the system 500 to a communication line.

In installations where system 500 data communicates to a plurality of remote locations by way of a wireless data connection to transceiver system 700 a protocol can be implemented to insure data integrity, security, and transceiver system 700 correct configurations. Routine 1200 can implement such a protocol between system 500 and transceiver system 700. Processing begins in block 1202.

In block 1202 the transceiver system 700 data communicates wirelessly an ENQ packet. Processing then moves to decision block 1204.

In decision block 1204 a determination is made as to whether the system 500, referred to as the terminal, wirelessly receives the ENQ message sent by the transceiver system 700. If the result is in the affirmative that is the terminal receives the ENQ message then processing moves to block 1206. If the resultant is in the negative that is the terminal did not receive the ENQ message then processing moves back to block 1202.

In block 1206 the terminal is enabled for transaction processing. Processing then moves to block 1208.

In block 1208 the transceiver system 700 referred to as the base unit transmits an ENQ packet with a packet ID attached. Processing then moves to block 1210.

In block 1210 the terminal receives the ENQ and packet ID from the transceiver system 700. In accordance with system 500 data requirements the system 500 then responds as necessary with a data packet. Processing then moves to block 1212.

In block 1212 the transceiver system 700 upon receiving the data packet from the system 500 decodes the data packet. Processing then moves to decision block 1214.

In decision block 1214 the transceiver system 700 makes a determination as to whether the data received from the system 500 is data intended for system 700 configurations. System 700 can be referred to as the base unit or base. If the resultant is in the affirmative that is the data is configuration data for the base unit processing moves to block 1218. If the resultant is in the negative that is the data is not configuration data for the base unit then processing moves to block 1216.

In block 1216 the data received from the system 500 is data communicated or passed to the system 700's modem 704. Processing then moves back to block 1208.

In decision block 1218 a determination is made as to whether the data command received from the system 500 is a baud rate configuration command intended for modem 704 or a baud rate configuration command intended for transceiver 708.

In an exemplary embodiment modem 704 data communicates with microcontroller at a first baud rate to effectuate data communication with a plurality of remote locations. Transceiver 708 data communicates with microcontroller 502 by way of transceiver 524 at a second baud rate to effectuate data communications between system 500 and a plurality of remote locations by way of system 700.

If the resultant in decision block 1218 is in the affirmative that is the data command is a baud rate configuration command then processing moves to decision block 1220. If the resultant is in the negative that is the data command received is not a baud rate configuration command then processing moves to decision block 1228.

In decision block 1220 a determination is made as to whether the command is intended for modem 704. If the resultant is in the affirmative that is the command is intended for modem 704 then processing moves to block 1224. If the resultant is in the negative that is the command is not intended for modem 704 then processing moves to block 1222.

In block 1220 the transceiver 708 baud rate is configured. Processing moves to block 1226.

In block 1224 the baud rate of modem 704 is configured. Processing moves to block 1226.

In block 1226 the transceiver system 700 sends the acknowledge (ACK) message to the system 500 originating the data command. Processing then move backs to block 1208.

In decision block 1228 a determination is made as to whether the received data command is a hardware-reset command. If the resultant is in the affirmative that is the received data command is a hardware-reset command then processing moves to decision block 1230. If the resultant is in the negative that is the received data command is not a hardware-reset command then processing moves to block 1234.

In decision block 1230 a determination is made as to whether the received command is a modem hardware-reset command. If the resultant is in the affirmative that is the received data command is a modem hardware-reset command then processing moves to block 1232. If the resultant is in the negative that is the data command received is not a hardware-reset command then processing moves to block 1236.

In block 1232 the transceiver system 700 sends the ACK message to the system 500 originating the date command. Processing then moves to block 1238.

In block 1238 the microcontroller 702 is reset. The routine is then exited.

In block 1236 the modem 704 is reset. Processing moves to block 1240.

In block 1240 the transceiver system 700 sends the ACK message to the system 500 originating the data command. Processing then move back to block 1208.

In block 1234 the transceiver system 700 sends the COMMAND NOT RECOGNIZED message to the system 500 originating the data command. Processing then move backs to block 1208.

Figure 13:
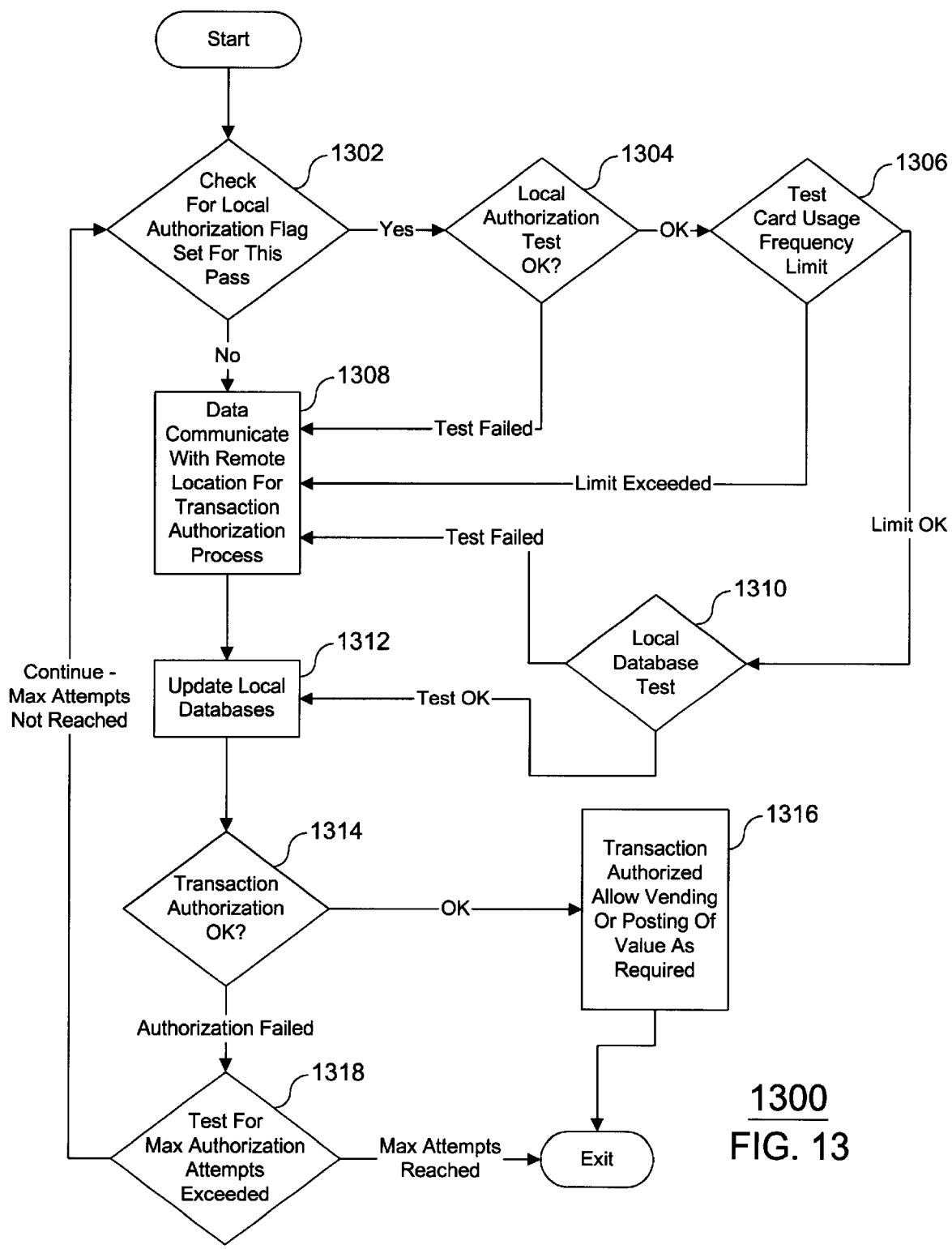
FIG. 13 there is shown a local transaction authorization routine 1300.

Referring to FIG. 13 there is shown a local transaction authorization routine 1300. A conventional card authorization through a remote processing bureau utilizing dial-up landline access to the remote processing bureau can take ten or more seconds to complete. In certain vending venues and or while vending certain type of products a ten or more second delay may be unacceptable. In these instances authorization routine 1300 can be implemented to reduce or eliminate the authorization delay while maintaining a high confidence that the card is valid. A card can be any form of ID including a credit card, private label card, smart card, hotel room card, RFID, biometric, and or other similar or suitable form of ID. Processing begins in decision block 1302.

In decision block 1302 a determination is made as to whether the LOCAL AUTHORIZATION flag is set for this pass. In an exemplary embodiment system 500 can be programmed to locally authorize a card based in part on an iterative process, which allows for the local authorization routine to be invoked, at a minimum, on the first pass and subsequently at any successive pass, up to the last pass. The last pass is predetermined and is referred to as the MAXIMUM AUTHORIZATION ATTEMPTS.

In a first example the local authorization can be invoked on the first pass. In this case no remote location will be contacted unless the local authorization results in a declined card response. In a second example the local authorization flag may be set for the second pass. In this case the system 500 will first try to remotely authorize the card. If the remote processing bureau is unavailable or unable to authorize the card then on the second pass the local authorization routine will be invoked.

If the resultant in decision block 1302 is in the affirmative that is the LOCAL AUTHORIZATION flag is set then processing moves to decision block 1304. If the resultant is in the negative that is the LOCAL AUTHORIZATION flag is not set then processing moves to block 1308.

In decision block 1304 a determination is made as to whether the local authorization test was OK. If the resultant is in the affirmative that is the local authorization test was OK then processing moves to decision block 1306. If the resultant is in the negative that is the local authorization test failed then processing moves to block 1308.

In an exemplary embodiment the local authorization test can include a test of the cards expiration date and the cards module-10 check digit. The test of the expiration date will determine whether or whether not the card is expired based on the current date. The test for the module-10 check digit will determine if the card number sequence is a valid number sequence.

In decision bloc 1306 a determination is made as to whether the CARD USAGE FREQUENCY limit has been reached. The CARD USAGE FREQUENCY is the total amount of time in a predetermined time period the current card has previously been authorized. In an exemplary embodiment the CARD USAGE FREQUENCY can be used to limit the number of times a card will be locally authorized before the system 500 will attempt to authorize the card by way of a processing bureau 804.

If the resultant in decision block 1306 is in the affirmative that is the CARD USAGE FREQUENCY is within the limit then processing moves to decision block 1310. If the resultant is in the negative that is the CARD USAGE FREQUENCY has reached the limit then processing moves to block 1308.

In block 1308 system 500 initiates a data communication for the purpose of authorizing the current card with the processing bureau 804. Processing moves to block 1312.

In block 1312 a local database within system 500 can be updated. This local data can include positive cards, which are cards that have previously been successfully approved. In addition, this local database can include negative cards, which are cards that have previously been declined. Processing then moves to decision block 1314.

In decision block 1310 the card is tested for its appearance in the system 500 local databases. If the resultant is in the affirmative that is the card does not appear in a negative database and or the card appears in the positive database then processing moves to block 1312. If the resultant is in the negative that is the card appears in the negative database and or does not appear in the positive database then processing moves to block 1308.

In decision block 1314 a determination is made as to whether the card has been approved. If the resultant is in the affirmative that is the card has been approved then processing moves to block 1316. If the resultant is in the negative that is the card has been declined than processing moves to decision block 1318.

In decision block 1318 a determination is made as to whether the MAXIMUM AUTHORIZATION ATTEMPTS has been reached. The MAXIMUM AUTHORIZATION ATTEMPTS is the count of the number of iterative authorization passes through routine 1300. If the resultant is in the affirmative that is the MAXIMUM AUTHORIZATION ATTEMPTS has not been reached then processing moves back to decision block 1302. If the resultant is in the negative that is the MAXIMUM AUTHORIZATION ATTEMPTS limit has been reached then the routine is exited the card is reported as declined.

In block 1316 he transaction is reported as authorized and the vending equipment is enabled for operation. The routine is then exited.

Figure 14:
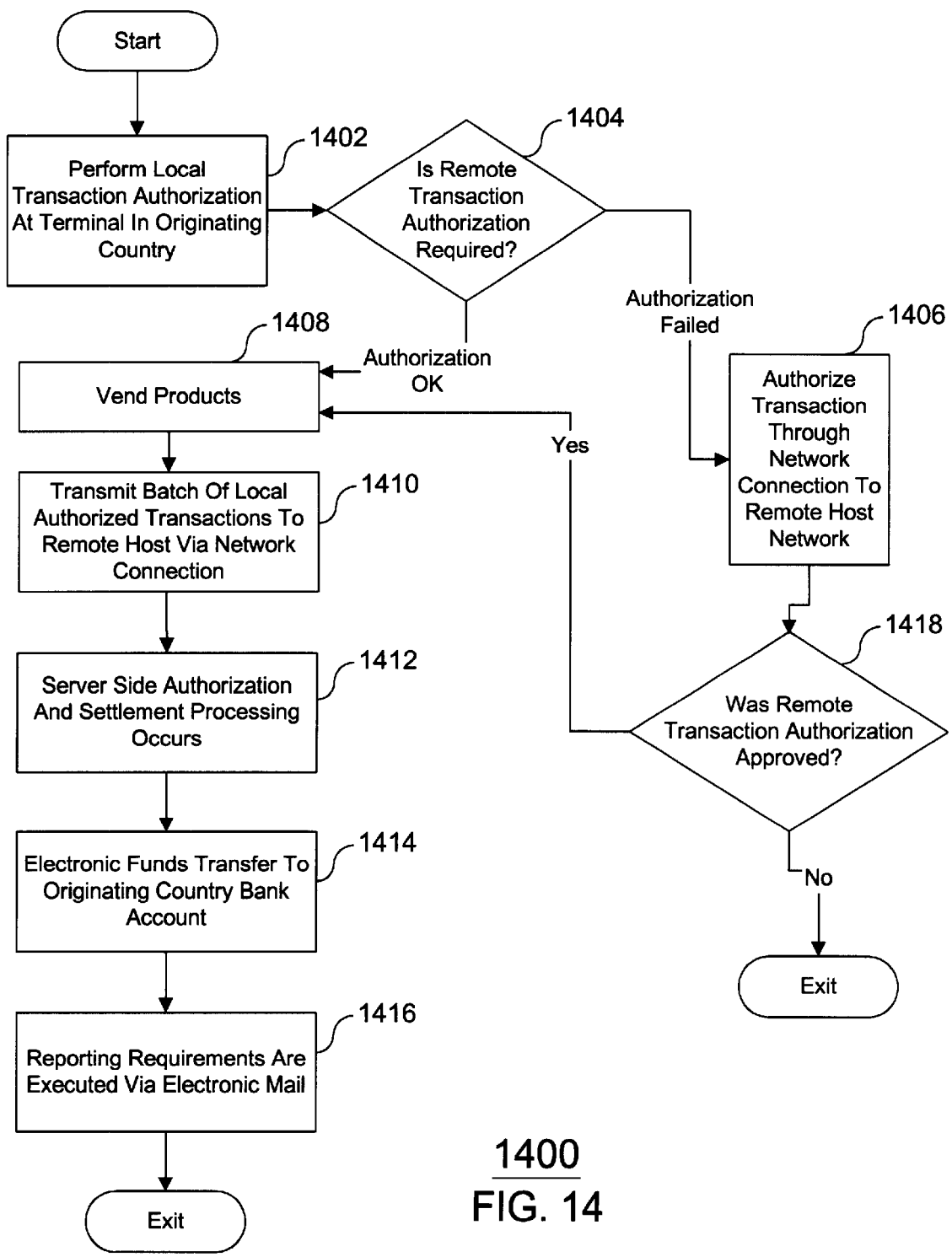
FIG. 14 there is shown an international transaction authorization and settlement routine 1400.

Referring to FIG. 14 there is shown an international transaction authorization and settlement routine 1400. Standard transaction processing fees for low cost sales can be significant. International card processing can incur even more transaction processing fees in the form of currency conversion fee. Currency conversion fees are fees incurred when currency is converted from one countries currency to another. To minimize the standard transaction processing fees and to minimize and or eliminate the currency conversion fees routine 1400 can be implemented. Processing begins in block 1402.

In block 1402 the local authorization routine 1300 is executed. Processing moves to decision block 1404.

In decision block 1404 a determination is made as to whether a remote data communication to a processing bureau 804 is required. If the resultant is in the affirmative that is the local authorization is approved and a remote authorization is not required then processing moves to block 1408. If the resultant is in the negative that is the local authorization was declined or failed and a remote data communication with processing bureau 804 is required then processing moves to block 1406.

In block 1406 authorization through a network connection to a remote host network 808 and or processing bureau 804 is executed. Processing then moves to decision block 1418.

In decision block 1418 a determination is made as to whether the remote authorization was approved. If the resultant is in the affirmative that is the remote authorization was approved then processing moves to block 1408. If the resultant is in the negative that is the remote authorization failed or was declined then the card is declined and the routine is exited.

In block 1408 the vending equipment is enabled and vending can occur. Processing then moves to block 1410.

In block 1410 a batch of locally authorized transactions is data communicated to a remote location (the remote location being another country) by way of a network connection. In this regard locally authorized transactions can be moved from the country in which the vending sale (occurred to the country where the transactions will be processed with a processing center. Processing then moves to block 1412. The transfer of locally authorized transactions can occur at a predetermined time including hourly, daily, weekly, monthly, or other desirable time interval.

In block 1412 the server receiving the locally authorized transactions from a plurality of remotely located system 500 authorizes and settles each locally authorized transaction. The process of settlement effectuates the transfer of fund from the cardholder to the merchant. In this regard the transaction is authorized and settled in the same country avoiding any currency conversion fee. Additionally, since transactions can be aggregated from a plurality of system 500 in a plurality of countries the transaction and currency volumes increase. These increases in transaction volumes coupled with efficient batching of transactions to the processing bureau can result in the lowest possible standard transaction processing fees. Processing then moves to block 1414.

In block 1414 the funds generated from the authorization and settlement of the locally authorized transaction can be electronically transfer back to a bank in the country in which the vending sale occurred, or the country of choice. Such a transfer can be accomplished by an electronic funds transfer (EFT), or other similar or desirable method for transfer funds. The transfer of funds can occur at a predetermined time including hourly, daily, weekly, monthly, or other desirable time interval. Processing then moves to block 1416.

In block 1416 reporting requirements can be effectuated as required and electronically transmitted to the appropriate parties. Such a reporting cycle can be referred to as a remittance cycle and can be utilized by all parties having involvement in the transactions to among other things verify fund transfers, and monitor vending equipment operational efficiencies. The remittance cycle can occur at a predetermined time including hourly, daily, weekly, monthly, or other desirable time interval. The routine is then exited.

Figure 15:
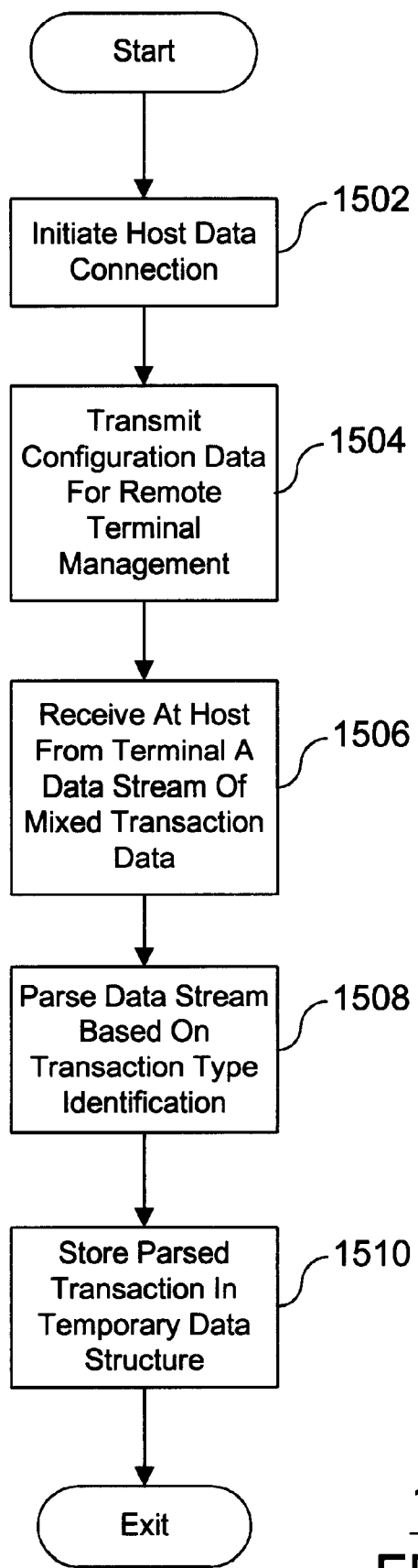
FIG. 15 there is shown a data communication transaction message parsing routine 1500.

Referring to FIG. 15 there is shown a data communication transaction message parsing routine 1500. In an exemplary embodiment system 500 can generate data and transactions relating to vending equipment DEX data, vending equipment MDB data, vend transaction data, financial transaction data, system 500 diagnostic data, and other type of data and transactions. While a system 500 has data communication access to a remote host network center 808 the system 500 can data communicate the mixed batch or varying types and kinds of data to the host network center 808 servers. It is at the host network centers 808 that the data and transaction must be parsed and handled in different methods. Such parsing method can include forwarding data to a subsequent server, storing data in a database, data processing to produce a new result and then acting on the resultant data, storing and forwarding transaction data including card transaction data for authorization and settlement, as well as implementing other methods for handle mixed batch data parsing. Processing begins in block 1502

In block 1502 a host data connection is initiated and established between the system 500 and the host network center 808. Such a data connection can be a dial-up connection, and Internet based connection, or other suitable data connections. Processing then moves to block 1504.

In block 1504 the system 500 terminal configuration data is exchanged between the system 500 and the host network servers. This terminal configuration data effectuates the ability to remotely manage the terminal operational parameters including the terminals firmware version form a remote host network center 808. Processing then moves to block 1506.

In block 1506 the host network server receives a data stream from the system 500. The data stream can comprise a mixed batch of operational data, marketing data, transaction data, and other types of data. Processing then moves to block 1508.

In block 1508 the server implement a series of parsing methods to identify and separate the different kinds of data and transactional information. Processing then move to block 1510.

In block 1510 the host network server stores the parsed data in a temporary data structure wherein each type and kind of data is uniquely identifiable. The data connection is terminated with the system 500 and the routine is exited.

Figure 16A:
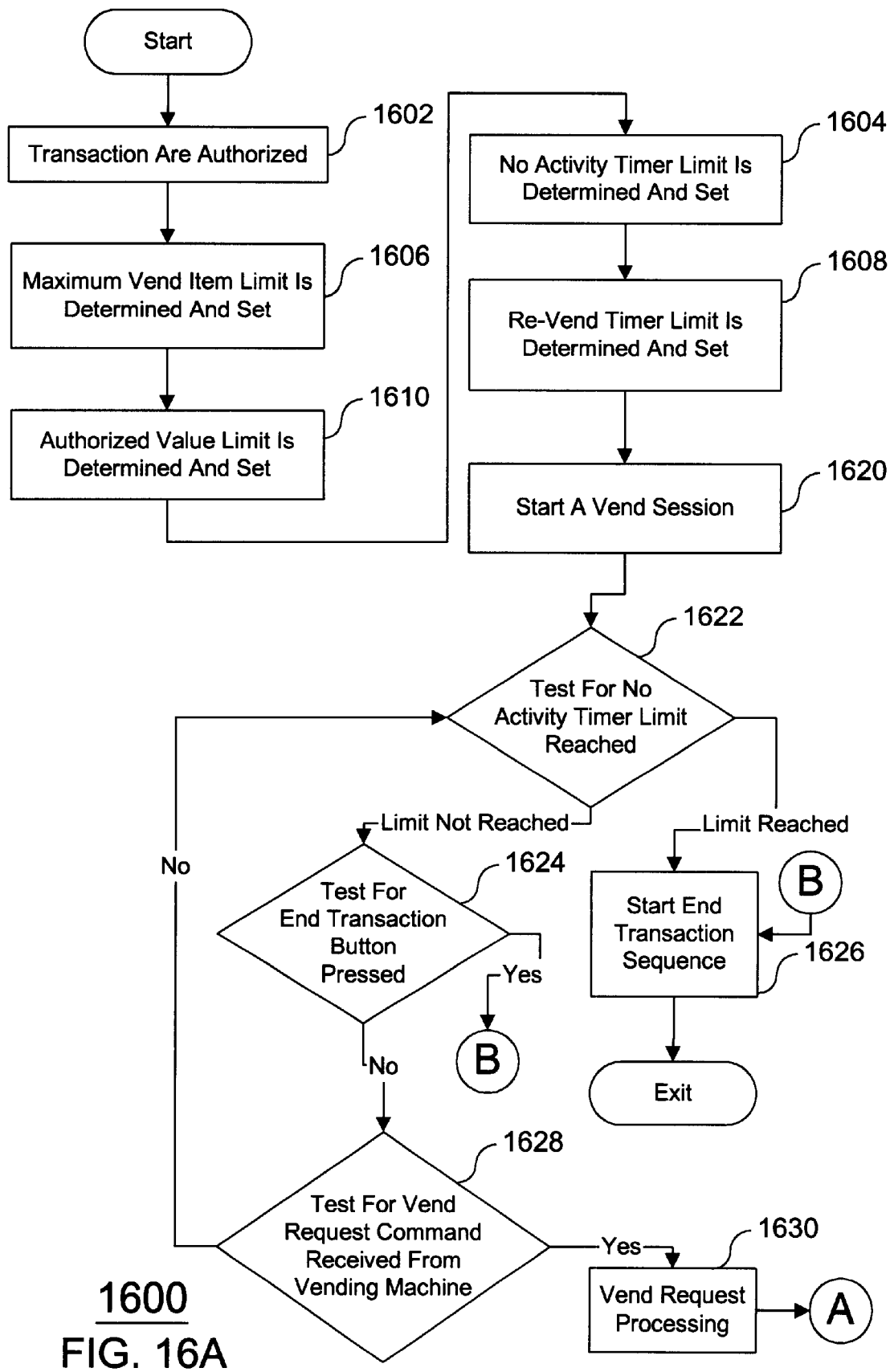
FIGS. 16A–B there is shown a determination of transaction completion routine 1600.
Figure 16B:
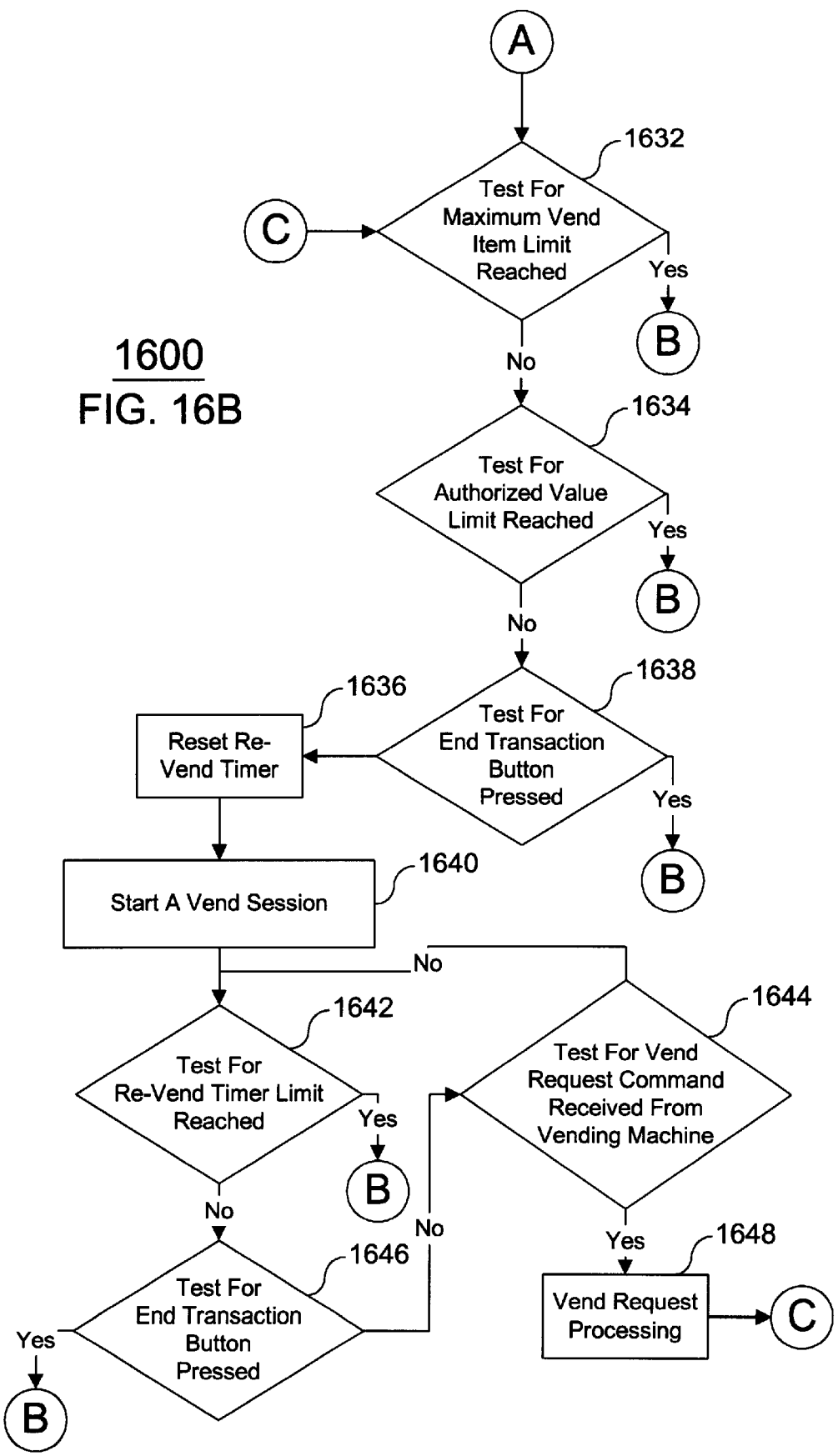

Referring to FIG. 16A–B there is shown a determination of transaction completion routine 1600. In an exemplary embodiment once a transaction has been authorized and approved vending begins. In many vending applications multi-vends per transaction may be desirable. Routine 1600 can implement a method of determining when to allow a user to make an additional purchase and when not to. Processing begins in block 1602.

In block 1602 the transaction is authorized. Transaction authorization can occur as disclosed in routines 1300 and 1400, or by other suitable methods. When a transaction has been approved and the vending equipment is being readied for vending, processing moves to block 1606.

In block 1606 a MAXIMUM VEND ITEM LIMIT is determined and set. The MAXIMUM VEND ITEM LIMIT is the maximum number of items that can be vended on a single authorization. The MAXIMUM VEND ITEM LIMIT can be stored as part of the system 500's terminal configuration file and remotely managed by way of the remote host network center 808. In an exemplary embodiment the MAXIMUM VEND ITEM LIMIT can range from one to ten items. Processing then moves to block 1610.

In block 1610 the AUTHORIZED VALUE LIMIT is determined and set. The AUTHORIZED VALUE LIMIT is the maximum total sale amount a user has been authorized to purchase. The AUTHORIZED VALUE LIMIT can be stored as part of the system 500's terminal configuration file and remotely managed by way of the remote host network center 808. Processing then moves to block 1604.

In block 1604 the NO ACTIVITY TIMER LIMIT is determined and set. The NO ACTIVITY TIMER LIMIT is the maximum amount of time a user has to make the first vend. The NO ACTIVITY TIMER LIMIT can be stored as part of the system 500's terminal configuration file and remotely managed by way of the remote host network center 808. In an exemplary embodiment the NO ACTIVITY TIMER LIMIT can range from less than one minute to several minutes. Processing then moves to block 1608.

In block 1608 the RE-VEND TIMER LIMIT is determined and set. The RE-VEND TIMER LIMIT is the maximum amount of time a user has to make additional vends beyond the first vend. The RE-VEND TIMER LIMIT can be stored as part of the system 500's terminal configuration file and remotely managed by way of the remote host network center 808. In an exemplary embodiment the RE-VEND TIMER LIMIT can range from less than one minute to several minutes. Processing then moves to block 1620.

In block 1620 a vending session is started. Processing moves to decision block 1622.

In decision block 1622 a determination is made as to whether the NO ACTIVITY TIMER LIMIT has been reached. If the resultant is in the affirmative that is the NO ACTIVITY TIMER LIMIT has not reached the limit then processing moves to decision block 1624. If the resultant is in the negative that is the NO ACTIVITY TIME LIMIT has been reached then processing moves to block 1626.

In block 1626 the end session sequence is started. The end session sequence includes waiting for the vending equipment to complete any last vends, ending the vending session, saving sales record data, optionally printing a receipt, and any other end sequence steps that may be required. The routine is then exited.

In decision block 1624 a determination is made as to whether the user has pressed the end transaction button. If the resultant is in the affirmative that is the user has pressed the end transaction button then processing moves to block 1626. If the resultant is in the negative that is the user has not pressed the end transaction button then processing moves to decision block 1628.

In decision block 1628 a determination is made as to whether a VEND REQUEST MDB command has been received from the vending equipment's VMC. If the resultant is in the affirmative that is the VEND REQUEST has been received then processing moves to block 1630. If the resultant is in the negative that is the VEND REQUEST command was not received then processing moves back to decision block 1622.

In block 1630 the VEND REQUEST command is processed and a VEND APPROVED or VEND DENIED response message is data communicated from the system 500 to the requesting VMC. Processing then moves to decision block 1632.

In decision block 1632 a determination is made as to whether the MAXIMUM VEND ITEM LIMIT has been reached. If the resultant is in the affirmative that is the MAXIMUM VEND ITEM LIMIT has been reached then processing moves back to block 1626. If the resultant is in the negative that is the MAXIMUM VEND ITEM LIMIT has not been reached then processing moves to decision block 1634.

In decision block 1634 a determination is made as to whether the AUTHORIZED VALUE LIMIT has been reached. If the resultant is in the affirmative that is the AUTHORIZED VALUE LIMIT has been reached then processing moves back to block 1626. If the resultant is in the negative that is the AUTHORIZED VALUE LIMIT has not been reached then processing moves to decision block 1638.

In decision block 1638 a determination is made as to whether the user has pressed the end transaction button. If the resultant is in the affirmative that is the user has pressed the end transaction button the processing moves back to block 1626. If the resultant is in the negative that is the user has not pressed the end transaction button then processing moves to block 1636.

In block 1636 the RE-VEND TIMER is reset to zero. Processing then moves to block 1640.

In block 1640 a vending session is started. A vending session is started by sending the BEGIN SESSION MDB command to the vending equipment's VMC. Processing moves to decision block 1642.

In decision block 1642 a determination is made as to whether the RE-VEND TIMER has reached the RE-VEND TIMER LIMIT. If the resultant is in the affirmative that is the RE-VEND TIMER has reached the RE-VEND TIMER LIMIT then processing moves back to block 1626. If the resultant is in the negative that is the RE-VEND TIMER has been reached the RE-VEND TIMER LIMIT then processing moves to decision block 1646.

In decision block 1646 a determination is made as to whether the user has pressed the end transaction button. If the resultant is in the affirmative that is the user has pressed the end transaction button then processing moves back to block 1626. If the resultant is in the negative that is the user has not pressed the end transaction button then processing moves to block 1644.

In decision block 1644 a determination is made as to whether a VEND REQUEST MDB command has been received from the vending equipment's VMC. If the resultant is in the affirmative that is the VEND REQUEST has been received then processing moves to block 1648. If the resultant is in the negative that is the VEND REQUEST command was not received then processing moves back to decision block 1642.

In block 1648 the VEND REQUEST command is processed and a VEND APPROVED or VEND DENIED response message is data communicated from the system 500 to the requesting VMC. Processing then moves to back to decision block 1632.

Figure 17:
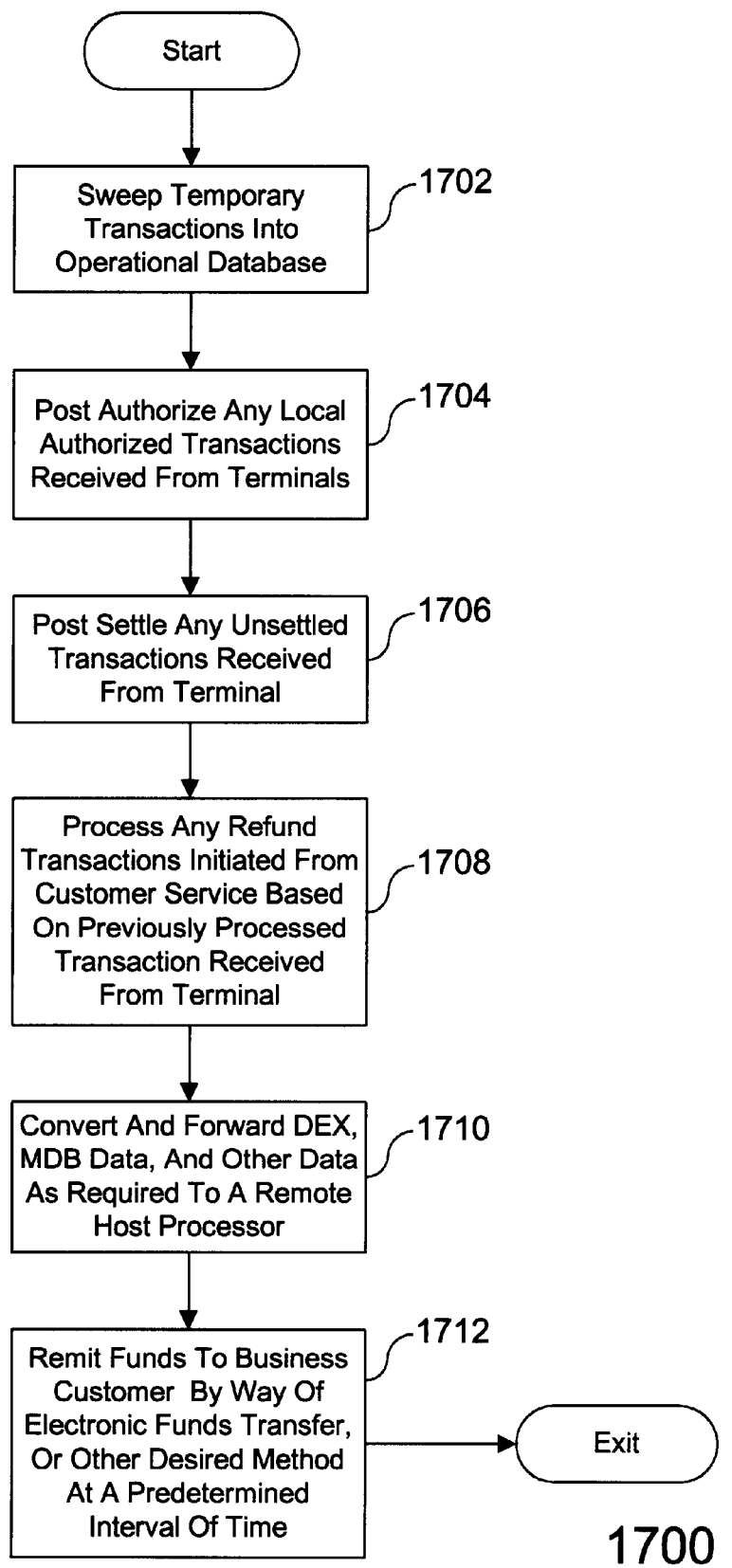
FIG. 17 there is shown a data communication sweeping, processing, and data forwarding routine 1700.

Referring to FIG. 17 there is shown a data communication sweeping, processing, and data forwarding routine 1700. It an exemplary embodiment the host network center 808 accumulates a plurality of different kinds of parsed data transactions in a temporary data structure. Such a parsing and temporary data structure can be implemented as disclosed in routine 1500. To move the data transactions from the temporary data structure a more permanent data structure and or host network sever routine 1700 can be implemented. Processing begins in block 1702.

In block 1702 the transactions stored in the temporary data structure are swept into an operational database. Such an operational database can be implemented as a SQL database, ORACLE database, flat file database, DB2 database, and or a combination of different kinds and types of databases. Processing then moves to block 1704.

In block 1704 locally authorized transactions that have not been previously authorized are authorized with a processing bureau 804. This authorization after the vending sale has occurred can be referred to as post authorization. Processing then moves to block 1706.

In block 1706 any transactions including the previously posted authorized transactions are settled with the processing bureau 804. The process of settlement effectuates the transfer of funds from the cardholder to the merchant. Settlement after the vending sale has occurred can be referred to as post settlement or post settle. Processing then moves to block 1708.

In block 1708 any refund transactions generated by the host network center customer service are processed. Refund transactions can occur when a previously settled transaction requires some portion of the sale amount be refunded to the cardholder. Customer service can generate a refund transaction by querying from an operation database the original transaction and then initiate a refund transaction based in part on the queried customer's original transaction. Processing then moves to block 1710.

In block 1710 data related to vending equipment DEX and MDB detail can be converted as required and data communicated to databases, and or other servers. The process of converting the DEX and MDB data can involve parsing and repackaging the data into a desired data warehousing interface format. Alternatively, the DEX and MDB data can be posted to a server where customers can by way of a network connection to the host network center 808 download the data.

In addition to the convert and forward functionality the data handled can be measured and counted as desired for the purpose of billing for the service of gathering data from a remote system 500 and delivering the data to a customer's desired location. Measurement and counting can include for example and not limitation measuring file and or data size, measuring, the frequency the data is gathered, counting the number of times data is gathered and or forwarded, measuring access to the host network center 808, or by other suitable measurement and counting method and or criteria. Processing moves to block 1712.

In block 1712 the funds collected from the processing of transactions can be remitted to the customer as required by EFT or other desirable method. The funds remitted can have service fees deducted from them such that their EFT amount is less than the total processed transaction amount. In this regard customer will not have to be billed for services. The deducting of service fees from the flow of funds can eliminate the need to invoice a customer for service. The routine is then exited.

Figure 18A:
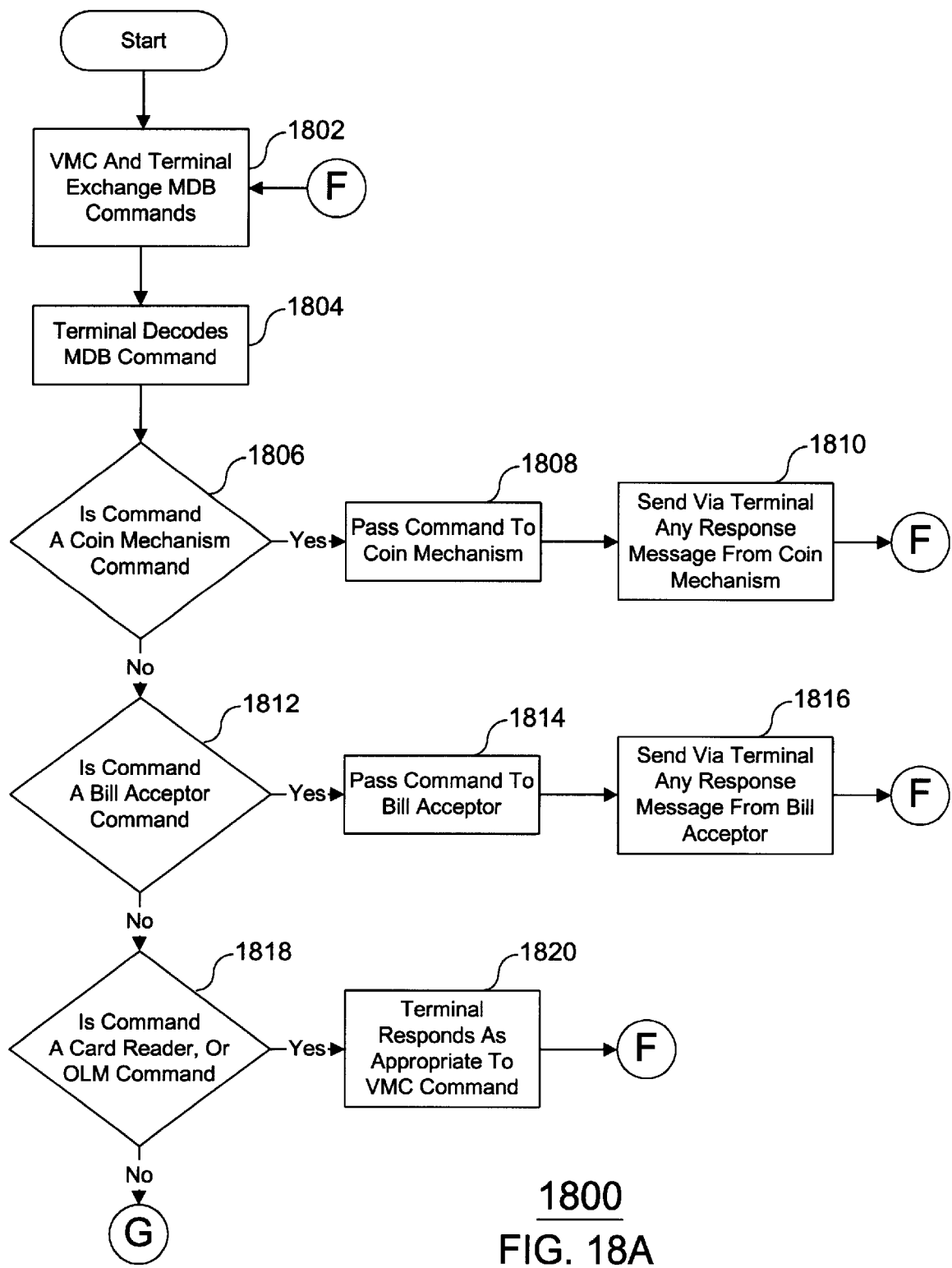
FIGS. 18A–B there is shown a mimic MDB interface port routine 1800.
Figure 18B:
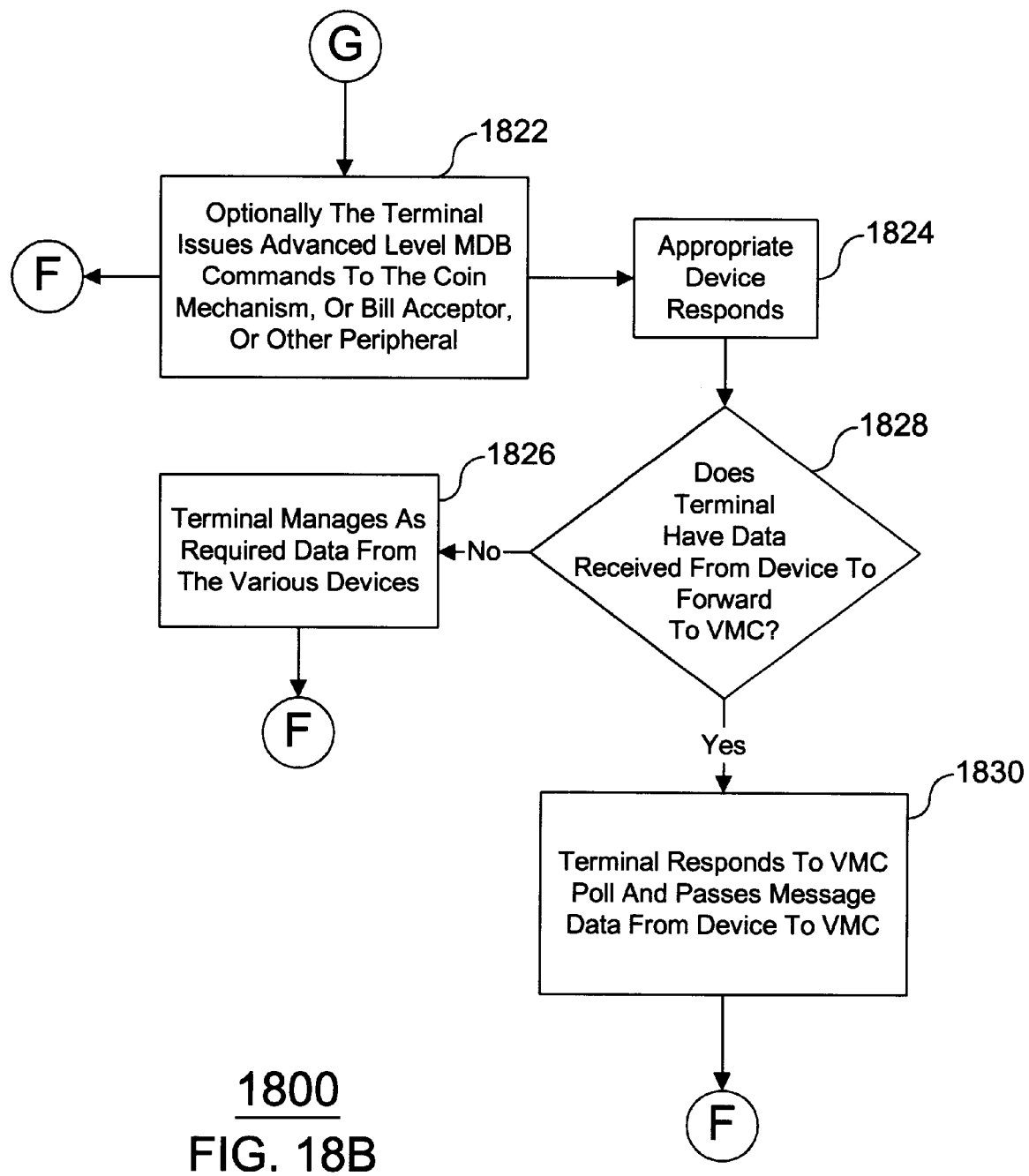

Referring to FIG. 18A–B there is shown a mimic MDB interface port routine 1800. In an exemplary embodiment the system 500 can serve as a MDB protocol conversion gateway. In this regard the system 500 can emulate and interpolate VMC MDB messages for a plurality of peripheral device. In addition, the system 500 can act as a MDB master or MDB slave device allowing the system 500 to support peripheral devices the VMC cannot. Routine 1800 implements the system 500 functionality to support the MDB interface 518 and the mimic MDB interface 516. Processing begins in block 1802.

In block 1802 the VMC and system 500 exchange MDB message commands by way of the VMC MDB interface 902 and the system 500's MDB interface 518. The system 500 can be referred to as terminal 500 or as the terminal. Processing moves to block 1804.

In block 1804 the terminal 500 decodes the MDB command message. Processing moves to decision block 1806.

In decision block 1806 a determination is made as to whether the MDB command message is a coin mechanism command message. If the resultant is in the affirmative that is the MDB command message is a coin mechanism MDB command message then processing moves to block 1808. If the resultant is in the negative that is then MDB command message is riot a coin mechanism MDB command message then processing moves to decision block 1812.

In block 1808 the MDB command message is encoded and forwarded or passed by way of the mimic MDB interface 516 to the coin mechanism. Processing then moves to block 1810.

In block 1810 the system 500 by way of the mimic MDB interface 516 receives any response MDR message from the coin mechanism. As required the system 500 decodes and determines if the response message from the coin mechanism requires encoding and forwarding or passing of the message to the VMC. As determined by the system 500 the message is selectively forwarded to the VMC upon processing returning to block 1802.

In decision block 1812 a determination is made as to whether the MDB command message is a bill acceptor command message. If the resultant is in the affirmative that is the MDB command message is a bill acceptor MDB command message then processing moves to block 1814. If the resultant is in the negative that is the MDB command message is not a bill acceptor MDB command message then processing moves to decision block 1818.

In block 1814 the MDB command message is encoded and forwarded or passed by way of the mimic MDB interface 516 to the bill acceptor. Processing then moves to block 1816.

In block 1816 the system 500 by way of the mimic MDB interface 516 receives any response MDB message from the bill acceptor. As required the system 500 decodes and determines if the response message from the bill acceptor requires encoding and forwarding or passing of the message to the VMC. As determined by the system 500 the message is selectively forwarded to the VMC upon processing returning to block 1802.

In decision block 1818 a determination is made as to whether the MDB command message is a card reader or online module (OLM) command message. If the resultant is in the affirmative that is the MDB command message is a card reader or OLM MDB command message then processing moves to block 1820. If the resultant is in the negative that is the MDB command message is not a card reader or OLM MDB command message then processing moves to block 1822.

In block 1820 the MDB command message is decoded and the appropriate response to the VMC is initiated by the system 500. Processing moves back to block 1802.

In block 1822 the system 500 optionally sends as a master device a MDB command message to the peripherals interconnected with the mimic MDB interface 516. Such peripherals can include coin mechanism, bill acceptor or validator, or other peripherals on the mimic MDB interface 516. If the system 500 does not have a MDB command message to send processing moves back to block 1802. If the system 500 has a command message to send the command message is sent to the desired peripheral device and processing moves to block 1824.

In block 1824 the system 500 receives any device response messages resultant from the sent MDB message. Processing then moves to decision block 1828.

In decision block 1828 a determination is made as to whether any received message or data on the mimic MDB bus needs to be forwarded or passed to the VMC by way of the MDB interface 518. If the resultant is in the affirmative that is the system has a command message or data to send to the VMC processing moves to block 1830. If the resultant is in the negative that is the system 500 does not has a command message or data to send to the VMC processing moves to block 1826.

In block 1826 the terminal system 500 can manage the data received from the peripheral device as required. Processing moves back to block 1802.

In block 1830 the terminal system 500 responds to the VMC POLL command message and responds by passing the command message and or data from the peripheral device to the VMC. Processing moves back to block 1802.

While this invention has been described with reference to specific embodiments, it is not necessarily limited thereto. Accordingly, the appended claims should be construed to encompass not only those forms and embodiments of the invention specifically described above, but to such other forms and embodiments, as may be devised by those skilled in the art without departing from its true spirit and scope.

What is claimed is:

1. An audit-credit-interactive system, said system comprising:
    a microcontroller;
    a vending machine interface interconnected with said microcontroller, said audit-credit-interactive system, by way of said vending machine interface, interconnects to and data communicates with a vending machine controller, said vending machine controller is interconnected to and controls a vending machine; and
    an interactive interface interconnected with said microcontroller, said interactive interface interconnects said audit-credit-interactive system to a computing platform, said computing platform, by way of said interactive interface and based in part on data communicated between said audit-credit-interactive system and said vending machine controller, monitors said vending machine activity, and selectively controls said vending machine vending cycles.

2. The audit-credit-interactive system in accordance with claim 1, wherein said vending machine interface is interconnected to at least one of the following: said vending machine controller multi-drop-bus interface (MDB), or said vending machine controller data exchange interface (DEX).

3. The audit-credit-interactive system in accordance with claim 1, wherein said computing platform is at least one of the following: an online module, a card reader, a cashless payment device, an audit device, a coin mechanism, a bill validator, a personal computer, a communication module, or a microprocessor based system.

4. The audit-credit-interactive system in accordance with claim 1, wherein said computing platform monitors a data communication originating from said audit-credit-interactive system to determine the operational state of a peripheral device interconnected to said vending machine controller.

5. The audit-credit-interactive system in accordance with claim 4, wherein said peripheral device is at least one of the following: said audit-credit-interactive system, an online module, a card reader, a cashless payment device, an audit device, a coin mechanism, or a bill validator.

6. The audit-credit-interactive system in accordance with claim 1, wherein said audit-credit-interactive system is at least one of the following: an online module, a card reader, a cashless payment device, an audit device, a coin mechanism, or a bill validator.

7. The audit-credit-interactive system in accordance with claim 1, wherein said computing platform monitors a data communication originating form said audit-credit-interactive system to determine the message prompts to be displayed to a user.

8. The audit-credit-interactive system in accordance with claim 1, wherein said interactive interface is a communication port.

9. The audit-credit-interactive system in accordance with claim 8, wherein said communication port is at least one of the following: an RS232 port, an RS485 port, a serial peripheral interface (SPI) port, or general purpose input output control line port.

10. The audit-credit-interactive system in accordance with claim 1, further comprising:

a communication interface interconnected with said microcontroller for effectuating data communications to a plurality of remote locations.

11. The audit-credit-interactive system in accordance with claim 10, wherein said communication interface is at least one of the following: a modem, a wireless modem, a data link to a communication module, or a transceiver.

12. The audit-credit-interactive system in accordance with claim 1, further comprising:

a network interface interconnected with said microcontroller for effectuating network data communications.

13. The audit-credit-interactive system in accordance with claim 12, wherein said network interface is at least one of the following: an ethernet interface, or a firewire interface.

14. The audit-credit-interactive system in accordance with claim 1, further comprising:

a mimic MDB interface interconnected with said microcontroller for data communicating with a plurality of peripheral devices, said plurality of peripheral device being interconnected with said mimic MDB interface.

15. The audit-credit-interactive system in accordance with claim 14, wherein said plurality of peripheral devices includes at least one of the following: a coin mechanism, a bill validator, an online module, a communication mixture, or a card reader.

16. The audit-credit-interactive system in accordance with claim 1, wherein said audit-credit-interactive system is retrofit to said vending machine.

17. An audit-credit-interactive system for interconnection with a vending machine, said vending machine having a vending machine controller, said audit-credit-interactive system being electrically connected to said vending machine controller comprising;

a microcontroller;

a vending machine interface interconnected with said microcontroller for data communicating with said vending machine controller; and a mimic MDB interface interconnected with said microcontroller for data communicating with a plurality of peripheral devices, said plurality of peripheral devices being interconnected with said mimic MDB interface.

18. The audit-credit-interactive system in accordance with claim 17, wherein said vending machine interface is interconnected to at least one of the following: said vending machine controller multi-drop-bus interface (MDB), or said vending machine controller data exchange interface (DEX).

19. The audit-credit-interactive system in accordance with claim 17, wherein a first plurality of data is communicated between said vending machine controller and said vending machine interface, and a second plurality of data is communicated between said mimic MDB interface and at least one of said plurality of peripheral devices;

wherein, said audit-credit-interactive system effectuates data communication between said vending machine controller and at least one of said plurality of peripheral devices by way of data processing said first plurality of data and said second plurality of data to provide a common communication protocol between said vending machine controller and at least one of said plurality of peripheral devices.

20. The audit-credit-interactive system in accordance with claim 17, wherein said audit-credit-interactive system is a data processing gateway between said vending machine controller and said plurality of peripheral devices.

21. The audit-credit-interactive system in accordance with claim 17, wherein said plurality of peripheral devices is at least one of the following: said audit-credit-interactive system, an online module, a card reader, a cashless payment device, an audit device, a communication module, a coin mechanism, or a bill validator.

22. The audit-credit-interactive system in accordance with claim 17, wherein said audit-credit-interactive system is at least one of the following: an online module, a card reader, a cashless payment device, an audit device, a coin mechanism, or a bill validator.

23. The audit-credit-interactive system in accordance with claim 17, further comprising:

an interactive interface interconnected with said microcontroller for interconnecting said audit-credit-interactive system to a computing platform, wherein said computing platform data communicates with said audit-credit-interactive system for the purpose of monitoring and selectively controlling said vending machine.

24. The audit-credit-interactive system in accordance with claim 23, wherein said computing platform is at least one of the following: an online module, a card reader, a cashless payment device, an audit device, a coin mechanism, a bill validator, a personal computer, a communication module, or a microprocessor based system.

25. The audit-credit-interactive system in accordance with claim 23, wherein said computing platform monitors a data communication originating from said audit-credit-interactive system to determine the operational state of a device interconnected to said vending machine controller.

26. The audit-credit-interactive system in accordance with claim 17, further comprising:

a communication interface interconnected with said microcontroller for effectuating data communications to a plurality of remote locations.

27. The audit-credit-interactive system in accordance with claim 26, wherein said communication interface is at least one of the following: a modem, a wireless modem, a data link to a communication module, or a transceiver.

28. The audit-credit-interactive system in accordance with claim 17, further comprising:

a network interface interconnected with said microcontroller for effectuating network data communications.

29. The audit-credit-interactive system in accordance with claim 28, wherein said network interface is at least one of the following: an ethernet interface, or a firewire interface.

30. The audit-credit-interactive system in accordance with claim 17, wherein said audit-credit-interactive system is retrofit to said vending machine.

\* \* \* \* \*

UNITED STATES PATENT AND TRADEMARK OFFICE
CERTIFICATE OF CORRECTION

PATENT NO.    : 6,505,095 B1
DATED         : January 7, 2003
INVENTOR(S)   : Kolls It is certified that error appears in the above-identified patent and that said Letters Patent is hereby corrected as shown below:

Column 2,
Line 1, replace the "Once" with the word -- One --.

Column 6,
Line 26, replace the reference number "1112" with the reference number -- 112 --.
Line 57, replace the word "hoot" with the word -- host --.

Column 9,
Lines 41 and 49, replace the word "interlace" with the word -- interface --.

Column 11,
Line 16, replace the word "tropically" with the word -- typically --.

Column 13,
Line 50, replace the word "now" with the word -- flow --.

Column 21,
Line 29, replace the word "FEND" with the word -- FIND --.

Column 23,
Line 28, replace the word "aid" with the word -- and --.
Line 63, replace the word "tie" with the word -- the --.

Column 25,
Line 51, replace the word "us;ed" with -- used --.

Column 28,
Line 63, replace the text "1he" with the word -- The --.

Column 29,
Line 7, replace the word "film" with the word -- from --.

Column 30,
Line 2, replace the word "to" with the word --of --.

Column 32,
Line 17, replace the text "b," with the word -- be --.

UNITED STATES PATENT AND TRADEMARK OFFICE
CERTIFICATE OF CORRECTION

PATENT NO. : 6,505,095 B1
DATED : January 7, 2003
INVENTOR(S) : Kolls

It is certified that error appears in the above-identified patent and that said Letters Patent is hereby corrected as shown below:

Column 33,
Line 3, replace the word "tile" with the word -- the --.

Column 34,
Line 45, replace the word "hardware" with the word -- hardwire --.

Column 36
Line 65, replace the word "bloc" with the word -- block --.

Column 37,
Line 47, replace the word "he" with the word -- the --.

Column 38,
Line 21, replace the text "(occured" with the word -- occured --.

Column 42,
Line 27, replace the text "measuring, the" with the text -- measuring the --.
Line 65, replace the word "riot" with the word -- not --.

Column 43,
Line 2, replace the text "MDR" with the text -- MDB --.

Column 45,
Line 26, replace the word "mixture" with the word -- module --.

Signed and Sealed this

Twenty-ninth Day of April, 2003

JAMES E. ROGAN
*Director of the United States Patent and Trademark Office*

(12) EX PARTE REEXAMINATION CERTIFICATE (6986th)
United States Patent
Kolls

(10) Number: US 6,505,095 C1
(45) Certificate Issued: Aug. 11, 2009

(54) SYSTEM FOR PROVIDING REMOTE AUDIT, CASHLESS PAYMENT, AND INTERACTIVE TRANSACTION CAPABILITIES IN A VENDING MACHINE

(75) Inventor: H. Brock Kolls, Pottstown, PA (US)

(73) Assignee: USA Technologies, Inc., Wayne, PA (US)

Reexamination Request:
No. 90/008,448, Mar. 23, 2007

Reexamination Certificate for:
Patent No.: 6,505,095
Issued: Jan. 7, 2003
Appl. No.: 09/884,755
Filed: Jun. 19, 2001

Certificate of Correction issued Apr. 29, 2003.

(51) Int. Cl.
*G07F 5/00* (2006.01)
*G07F 9/02* (2006.01)
*G07F 5/18* (2006.01)
*G07F 9/00* (2006.01)

(52) U.S. Cl. .......................................... 700/244; 700/236
(58) Field of Classification Search .................. None
See application file for complete search history.

(56) References Cited

U.S. PATENT DOCUMENTS

| | | | |
|---|---|---|---|
| 2,703,048 A | 3/1955 | Gandert et al. | |
| 4,272,757 A | 6/1981 | McLaughlin et al. | |
| 4,366,481 A | 12/1982 | Main et al. | |
| 4,485,300 A | 11/1984 | Peirce | |
| 4,611,205 A | 9/1986 | Eglise | |
| 4,737,967 A | 4/1988 | Cahalan | |
| 4,780,806 A | 10/1988 | Wada et al. | |
| 4,812,628 A | 3/1989 | Boston et al. | |
| 4,970,655 A * | 11/1990 | Winn et al. .................. | 700/235 |
| 4,999,672 A | 3/1991 | Rice, Jr. et al. | |
| 5,077,582 A | 12/1991 | Kravette et al. | |
| 5,091,713 A | 2/1992 | Horne et al. | |
| 5,132,915 A | 7/1992 | Goodman | |
| 5,150,817 A | 9/1992 | Livingston | |
| 5,159,560 A | 10/1992 | Newell et al. | |
| 5,206,488 A | 4/1993 | Teicher | |
| 5,225,977 A | 7/1993 | Hooper et al. | |
| 5,273,183 A | 12/1993 | Tuttobene | |
| 5,285,382 A | 2/1994 | Muehlberger et al. | |
| 5,337,253 A | 8/1994 | Berkovsky et al. | |
| 5,440,108 A | 8/1995 | Tran et al. | |
| 5,442,568 A | 8/1995 | Ostendorf et al. | |

(Continued)

FOREIGN PATENT DOCUMENTS

| | | |
|---|---|---|
| EP | 0 986 033 A2 | 3/2000 |
| EP | 1 096 408 A2 | 5/2001 |
| GB | 2 172 720 A | 9/1986 |

(Continued)

OTHER PUBLICATIONS

Multi–Drop Bus/Internal Communication Protocol (MDB/ICP) version 2.0 supported by National Automatic Merchandising Association (NAMA) dated Oct. 4, 2000.

(Continued)

*Primary Examiner*—Sam Rimell

(57) ABSTRACT

The present invention relates to a system that is scalable and configurable to include vending equipment audit capabilities, a card reader assembly having a card reader processor interface board for accepting card identification data as payment for items vended, an interactive interface and protocol for interconnecting the system to a computing platform, and support for a plurality of communication options that include wired, point-to-point wireless, and wireless WAN solutions. In addition, the present invention also relates to a system and method of effectuating a payment device for accepting card ID data, authorizing the validity of the card ID data, facilitating a vending transaction, settling the transaction to effect payment for the vended goods and services, gathering DEX and MDB audit data from the vending equipment, and data communicating with a plurality of remote locations.

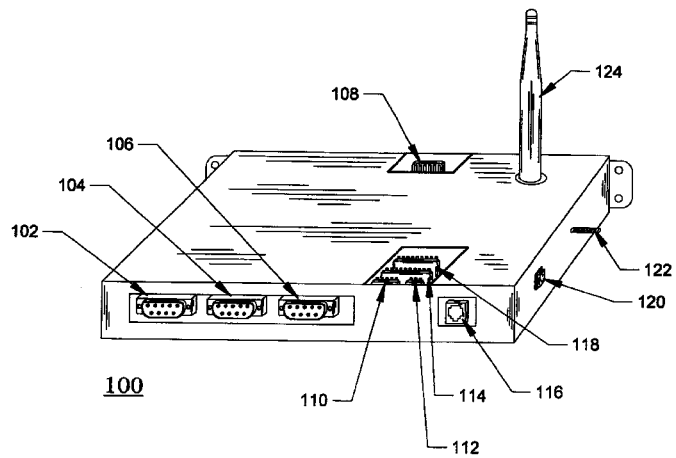

U.S. PATENT DOCUMENTS

| | | |
|---|---|---|
| 5,450,938 A | 9/1995 | Rademacher |
| 5,464,087 A | 11/1995 | Bounds et al. |
| 5,591,949 A | 1/1997 | Bernstein |
| 5,596,501 A | 1/1997 | Comer et al. |
| 5,608,643 A | 3/1997 | Wichter et al. |
| 5,619,024 A | 4/1997 | Kolls |
| 5,628,351 A | 5/1997 | Ramsey et al. |
| 5,710,887 A | 1/1998 | Chelliah et al. |
| 5,728,999 A | 3/1998 | Teicher |
| 5,734,150 A | 3/1998 | Brown |
| 5,764,639 A | 6/1998 | Staples et al. |
| 5,769,269 A | 6/1998 | Peters |
| 5,791,449 A | 8/1998 | Deaville et al. |
| 5,844,808 A | 12/1998 | Konsmo et al. |
| 5,850,442 A | 12/1998 | Muftic |
| 5,854,581 A | 12/1998 | Mori et al. |
| 5,924,081 A | 7/1999 | Ostendorf et al. |
| 5,930,771 A | 7/1999 | Stapp |
| 5,952,638 A | 9/1999 | Demers et al. |
| 5,955,718 A | 9/1999 | Levasseur et al. |
| 5,959,869 A | 9/1999 | Miller et al. |
| 5,963,452 A | 10/1999 | Etoh et al. |
| 5,983,200 A | 11/1999 | Slotznick |
| 5,988,346 A | 11/1999 | Tedesco et al. |
| 5,997,170 A | 12/1999 | Brodbeck |
| 6,000,522 A | 12/1999 | Johnson |
| 6,038,551 A | 3/2000 | Barlow et al. |
| 6,109,524 A | 8/2000 | Kanoh et al. |
| 6,115,649 A | 9/2000 | Sakata |
| 6,116,505 A | 9/2000 | Withrow |
| 6,119,053 A | 9/2000 | Taylor et al. |
| 6,123,223 A | 9/2000 | Watkins |
| 6,181,981 B1 | 1/2001 | Varga et al. |
| 6,234,389 B1 | 5/2001 | Valliani et al. |
| 6,250,452 B1 | 6/2001 | Partyka et al. |
| 6,272,117 B1 | 8/2001 | Choi et al. |
| 6,272,395 B1 | 8/2001 | Brodbeck |
| 6,285,856 B1 | 9/2001 | Aguayo et al. |
| 6,295,482 B1 | 9/2001 | Tognazzini |
| 6,308,111 B1 | 10/2001 | Koga |
| 6,314,169 B1 | 11/2001 | Schelberg |
| 6,321,985 B1 | 11/2001 | Kolls |
| 6,339,731 B1 | 1/2002 | Morris et al. |
| 6,367,696 B1 | 4/2002 | Inamitsu et al. |
| 6,390,269 B1 | 5/2002 | Billington et al. |
| 6,397,126 B1 | 5/2002 | Nelson |
| 6,427,912 B1 | 8/2002 | Levasseur |
| 6,430,268 B1 | 8/2002 | Petite |
| 6,446,049 B1 | 9/2002 | Janning et al. |
| 6,457,038 B1 | 9/2002 | Defosse |
| 6,462,644 B1 | 10/2002 | Howell et al. |
| 6,473,283 B1 | 10/2002 | Melvin et al. |
| 6,487,540 B1 | 11/2002 | Smith et al. |
| 6,505,095 B1 | 1/2003 | Kolls |
| 6,571,150 B2 | 5/2003 | Arai et al. |
| 6,574,603 B1 | 6/2003 | Dickson et al. |
| 6,595,416 B1 | 7/2003 | Newsome et al. |
| 6,757,585 B2 | 6/2004 | Ohtsuki et al. |
| 6,771,981 B1 | 8/2004 | Zalewski et al. |
| 6,772,048 B1 | 8/2004 | Leibu et al. |
| 6,804,252 B1 | 10/2004 | Johnson |
| 6,814,518 B2 | 11/2004 | Luciano et al. |
| 6,839,775 B1 | 1/2005 | Kao et al. |
| 6,854,642 B2 | 2/2005 | Metcalf et al. |
| 6,859,761 B2 | 2/2005 | Bensky et al. |
| 6,934,594 B2 | 8/2005 | Loring et al. |
| 6,945,457 B1 | 9/2005 | Barcelou |
| 7,013,337 B2 | 3/2006 | Defosse et al. |
| 7,031,804 B2 | 4/2006 | Brooke |
| 7,032,038 B1 | 4/2006 | Squires |
| 7,053,773 B2 | 5/2006 | McGarry et al. |
| 7,054,909 B1 | 5/2006 | Ohkubo et al. |
| 7,058,603 B1 | 6/2006 | Rhiando |
| 7,076,329 B1 | 7/2006 | Kolls |
| 7,089,322 B1 | 8/2006 | Stallmann |
| 7,096,191 B2 | 8/2006 | Nakajima |
| 7,110,954 B2 | 9/2006 | Yung et al. |
| 7,131,575 B1 | 11/2006 | Kolls |
| 7,203,486 B2 | 4/2007 | Patel |
| 2001/0025349 A1 | 9/2001 | Sharood et al. |
| 2001/0034566 A1 | 10/2001 | Offer |
| 2001/0037291 A1 | 11/2001 | Allen |
| 2001/0042121 A1 | 11/2001 | Defosse et al. |
| 2002/0072976 A1 | 6/2002 | Virtanen et al. |
| 2002/0077724 A1 | 6/2002 | Paulucci et al. |
| 2002/0084322 A1 | 7/2002 | Baric |
| 2002/0099608 A1 | 7/2002 | Pons et al. |
| 2002/0107742 A1 | 8/2002 | Magill |
| 2002/0156727 A1 | 10/2002 | LeVake et al. |
| 2002/0165788 A1 | 11/2002 | Bates et al. |
| 2002/0188378 A1 | 12/2002 | Sufer |
| 2003/0030539 A1 | 2/2003 | McGarry et al. |
| 2003/0055735 A1 | 3/2003 | Cameron et al. |
| 2003/0050841 A1 | 6/2003 | Preston et al. |
| 2003/0149827 A1 | 8/2003 | Smolen et al. |
| 2003/0158625 A1 | 8/2003 | Carstens et al. |
| 2003/0178487 A1 | 9/2003 | Rogers |
| 2003/0204391 A1 | 10/2003 | May et al. |
| 2005/0088279 A1 | 4/2005 | Denison et al. |
| 2005/0285716 A1 | 12/2005 | Denison et al. |

FOREIGN PATENT DOCUMENTS

| | | |
|---|---|---|
| JP | 02-012394 | 1/1990 |
| JP | 03-273468 | 12/1991 |
| JP | 04-077892 | 3/1992 |
| JP | 04-149796 | 5/1992 |
| JP | 05-143843 | 6/1993 |
| WO | WO 96/15505 | 5/1996 |
| WO | WO 96/18980 | 6/1996 |
| WO | WO 97/10576 | 3/1997 |
| WO | WO 97/45796 | 12/1997 |
| WO | WO 99/50800 | 10/1999 |

OTHER PUBLICATIONS

The European Vending Association Data Transfer Standard, European Vending Association, Jul. 1999, pp. .3–E.3, Version, 5.0.

Office Action dated Sep. 16, 2008, U.S. Appl. No. 10/153,478, filed May 22, 2002.

Office Action dated Jan. 8, 2008, U.S. Appl. No. 10/153,478, filed May 22, 2002.

Office Action dated Sep. 7, 2007, U.S. Appl. No. 10/153,478, filed May 22, 2002.

Office Action dated Feb. 21, 2007, U.S. Appl. No. 10/153,478, filed May 22, 2002.

Office Action dated Aug. 10, 2006, U.S. Appl. No. 10/153,478, filed May 22, 2002.

Office Action dated Mar. 23, 2006, U.S. Appl. No. 10/153,478, filed May 22, 2002.

Office Action dated Jun. 12, 2008, U.S. Appl. No. 11/348,744, filed Feb. 7, 2006.

Office Action dated Oct. 30, 2008, U.S. Appl. No. 10/245,256, filed Sep. 17, 2002.

Office Action dated Oct. 28, 2008, U.S. Appl. No. 10/266,343, filed Oct. 8, 2002.

Office Action dated May 7, 2004, U.S. Appl. No. 10/277,458, filed Oct. 22, 2002.

Office Action dated Aug. 11, 2004, U.S. Appl. No. 10/277,458, filed Oct. 22, 2002.
Office Action dated Nov. 16, 2004, U.S. Appl. No. 10/277,458, filed Oct. 22, 2002.
Office Action dated Apr. 22, 2005, U.S. Appl. No. 10/277,458, filed Oct. 22, 2002.
Office Action dated Oct. 5, 2005, U.S. Appl. No. 10/277,458, filed Oct. 22, 2002.
Office Action dated Jan. 27, 2006, U.S. Appl. No. 10/277,458, filed Oct. 22, 2002.
Office Action dated Feb. 24, 2006, U.S. Appl. No. 10/277,458, filed Oct. 22, 2002.
Office Action dated Sep. 26, 2006, U.S. Appl. No. 10/277,458, filed Oct. 22, 2002.
Office Action dated May 25, 2007, U.S. Appl. No. 10/277,458, filed Oct. 22, 2002.
Office Action dated Aug. 7, 2007, U.S. Appl. No. 10/277,458, filed Oct. 22, 2002.
Office Action dated Feb. 13, 2008, U.S. Appl. No. 10/277,458, filed Oct. 22, 2002.
Office Action dated Nov. 14, 2008, U.S. Appl. No. 10/277,458, filed Oct. 22, 2002.
Office Action dated Oct. 28, 2008, U.S. Appl. No. 10/263,515, filed Oct. 3, 2002.
Office Action dated Jul. 9, 2008, U.S. Appl. No. 10/083,032, filed Feb. 26, 2002.
Office Action dated Nov. 13, 2007, U.S. Appl. No. 10/083,032, filed Feb. 26, 2002.
Office Action dated Feb. 27, 2007, U.S. Appl. No. 10/083,032, filed Feb. 26, 2002.
Office Action dated Aug. 13, 2008, U.S. Appl. No. 10/100,680, filed Mar. 18, 2002.
Office Action dated Jan. 9, 2008, U.S. Appl. No. 10/100,680, filed Mar. 18, 2002.
Office Action dated Apr. 17, 2007, U.S. Appl. No. 10/100,680, filed Mar. 18, 2002.
Office Action dated Jan. 2, 2008, U.S. Appl. No. 10/118,123, filed Apr. 8, 2002.
Webster et al.; Controlling A Java Enabled Pepsi® Vending Machine Over The World Wide Web; Date: Nov. 29–Dec. 3, 1999; Industrial Electronics Society, 1999. IECON '99 Proceedings, The 25$^{th}$ Annual Conference of the IEEE; vol. 1, 29 Page(s): 86–90 vol. 1.
Kimura et al.; Ecological Improvement Of the Vending Machine Using LCA Method; Date: Dec. 11–15, 2001; Environmentally Conscious Design And Inverse Manufacturing, 2001. Proceedings EcoDesign 2001: Second International Symposium On pp. 341–346.
Newmarch et al.; Using The Web And Jini To Link Vending Machines And Enterprise Systems; Date: Oct. 30–Nov. 4, 2000; Technology of Object–Oriented Languages And Systems, 2000. Tools–Asia 2000. Proceedings. 36$^{th}$ International Conference on pp. 260–264.
Moon et al.; An Event Channel–Based Embedded Software Architecture For Developing Telemetric And Teleoperation Systems On The WWW; Date: Jun. 2–4, 1999; Real–Time Technology and Applications Symposium, 1999. Proceedings of the Fifth IEEE; pp. 224–233.
U.S. Appl. No. 60/264,752, filed Jan. 29, 2001, Danis.
U.S. Appl. No. 60/350,180, filed Oct. 26, 2001, LeVake.
U.S. Appl. No. 60/311,519, filed Aug. 9, 2001, Powell.
"Put it on my card please," CMA, Hamilton: Apr. 1998, vol. 72, Iss. 3, p. 18 (5 pages).
Problem Solving with C++. . . +, Reading: Addison–Wesley Longman Inc.: 1999, pp. 406–413.
"Cashless Newsracks," Editor & Publisher, Jun. 12, 1993, vol. 126, Iss. 24, p. 62, 2 pages.
"USA Technologies Takes Unique Swipe Card Device Off Shore," Business Wire, Aug. 31, 2000.

* cited by examiner

US 6,505,095 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 17 are determined to be patentable as amended.

Claims 2 and 18, dependent on an amended claim, are determined to be patentable.

New claims 31–43 are added and determined to be patentable.

Claims 3–16 and 19–30 were not reexamined.

1. An audit-credit-interactive system, said system comprising:
    a microcontroller;
    a vending machine interface interconnected with said microcontroller, said audit-credit-interactive system, by way of said vending machine interface, interconnects to and data communicates with a vending machine controller *in accordance with a multi drop bus (MDB) protocol*, said vending machine controller is interconnected to and controls a vending machine; and
    an interactive interface interconnected with said microcontroller, said interactive interface interconnects said audit-credit-interactive system to a computing platform, said computing platform, by way of said interactive interface and based in part on data communicated between said audit-credit-interactive system and said vending machine controller, [monitors] *programmed to monitor* said vending machine activity, and selectively [controls] *control* said vending machine vending cycles.

17. An audit-credit-interactive system for interconnection with a vending machine, said vending machine having a vending machine controller, said audit-credit-interactive system being electrically connected to said vending machine controller comprising;
    a microcontroller;
    a vending machine interface interconnected with said microcontroller *and configured to be interconnected with said vending machine controller, said vending machine interface* for [data] communicating [with] *data between said microcontroller and* said vending machine controller; and
    a mimic MDB interface interconnected with said microcontroller for data communicating with a plurality of peripheral devices, said plurality of peripheral devices being interconnected with said mimic MDB interface.

*31. The system of claim 17, wherein said microcontroller electrically interconnects said vending machine interface with said mimic MDB interface such that the peripheral devices connected to said mimic MDB interface are operable to communicate with the vending machine controller when the vending machine interface is interconnected to said vending machine controller.*

*32. The system of claim 17, wherein the mimic MDB interface is configured to communicate with the plurality of peripherals using different communication protocols such that the mimic MDB interface translates each of the different communication protocols to a common communication protocol for communication with the microprocessor.*

*33. An audit-credit-interactive system, said system comprising:*
    *a microcontroller;*
    *a vending machine interface interconnected with said microcontroller, said audit-credit-interactive system, by way of said vending machine interface, interconnects to and data communicates with a vending machine controller in accordance with a multi drop bus (MDB) protocol, said vending machine controller is interconnected to and controls a vending machine; and*
    *an interactive interface interconnected with said microcontroller, said interactive interface interconnects said audit-credit-interactive system to a computing platform, said computing platform, by way of said interactive interface and based in part on data communicated between said audit-credit-interactive system and said vending machine controller, monitors said vending machine activity, and selectively controls said vending machine vending cycles, said computing platform programmed to issue a command for execution by the vending machine controller and to receive a confirmation from the vending machine controller of the execution of said command by way of said microcontroller.*

*34. The system of claim 33, wherein the computing platform includes an other microcontroller configured to issue the command and receive the confirmation by way of said microcontroller.*

*35. The system of claim 33, wherein the computing platform further includes an indicator that visually indicates the confirmation has been received from the vending machine controller by way of said microcontroller.*

*36. The system of claim 35, wherein the command issued by the computing platform instructs the vending machine controller to terminate an active vending cycle and the computing platform receives the confirmation of the termination of the active vending cycle from the vending machine controller by way of said microcontroller.*

*37. The system of claim 33, wherein:*
    *the computing platform includes an other microcontroller;*
    *the other microcontroller issues the command to the microcontroller of said audit-credit-interactive system; and*
    *the microcontroller processes the command and provides processed command results to the other microcontroller.*

*38. The system of claim 33, further comprising:*
    *a memory interconnected with said microcontroller, wherein vending transaction data received from said vending machine controller via the vending machine interface is stored by the microcontroller in said memory and the stored vending transaction data is sent by the microcontroller to the computing platform in response to a change in the stored vending transaction data.*

39. The system of claim 33, further comprising:

an input unit for inputting the command, as a termination command, to the computing platform, responsive to user input, wherein the vending machine controller receives the termination command via the computing platform instructing the vending machine controller to terminate a current vending transaction after the current vending transaction is complete.

40. The system of claim 33, wherein the microcontroller receives the command issued by the computing platform, translates the command to a protocol of the vending machine controller and sends the translated command to the vending machine controller.

41. The system of claim 33, wherein the microcontroller is selectively slaved to the computing platform.

42. An audit-credit-interactive system, said system comprising:

a microcontroller;

a vending machine interface interconnected with said microcontroller, said audit-credit-interactive system, by way of said vending machine interface, interconnects to and data communicates with a vending machine controller, said vending machine controller is interconnected to and controls a vending machine; and an interactive interface interconnected with said microcontroller, said interactive interface interconnects said audit-credit-interactive system to a computing platform, said computing platform, by way of said interactive interface and based in part on data communicated between said audit-credit-interactive system and said vending machine controller, programmed to monitor said vending machine activity, and issue commands to said microcontroller to selectively control said vending machine vending cycles.

43. An audit-credit-interactive system, said system comprising:

a microcontroller;

a vending machine interface interconnected with said microcontroller, said audit-credit-interactive system, by way of said vending machine interface, interconnects to and data communicates with a vending machine controller, said vending machine controller is interconnected to and controls a vending machine; and an interactive interface interconnected with said microcontroller, said interactive interface interconnects said audit-credit-interactive system to a computing platform, said computing platform, by way of said interactive interface and based in part on data communicated between said audit-credit-interactive system and said vending machine controller, monitors said vending machine activity, and selectively controls said vending machine vending cycles, said computing platform programmed to issue a command to said microcontroller for execution by the vending machine controller and to receive a confirmation from the vending machine controller of the execution of said command by way of said microcontroller.

\* \* \* \* \*